United States Patent [19]
Karabed et al.

[11] Patent Number: 5,317,505
[45] Date of Patent: May 31, 1994

[54] GAME CONTROLLER CAPABLE OF STORING AND EXECUTING STORED SEQUENCES OF USER PLAYING BUTTON SETTINGS

[76] Inventors: Raznik Karabed, 797 Honeywood Ct.; Siamack Nemazie, 1253 Qual Creek Cir., both of San Jose, Calif. 95120; Edmond Sardariani, 3152 Evelyn St., Lacresenta, Calif. 91214

[21] Appl. No.: 630,170

[22] Filed: Dec. 19, 1990

[51] Int. Cl.$^5$ ................................................ G06F 3/02
[52] U.S. Cl. ................................ 364/410; 273/148 B; 273/433; 345/156
[58] Field of Search ............................ 364/410-412; 340/709-711, 706 X; 341/23; 273/856, 148 B, 433, 437

[56] References Cited
U.S. PATENT DOCUMENTS 4,763,252 8/1988 Rose ......................................... 341/23
4,964,075 10/1990 Shaver et al. ........................... 341/23

*Primary Examiner*—Gail O. Hayes

[57] ABSTRACT

The user controller for a video game has a set of auxiliary buttons from which a user may input requests to store, request and execute stored sequences of user playing button settings. The auxiliary buttons are programmable and could be assigned to arbitrary special moves matching the needs of different games or of different stages of one game. The controller can store any arbitrary sequence of user play button settings to relieve the user from having to repeat inputting the sequence. The user may also add to a stored sequence during execution on the fly to form a merged sequence which may be stored. The controller also permits the user to override a stored sequence during execution. Special moves possible include a sequence of fast paced reproductions of predetermined moves. The controller also disregards unintended idle settings to provide more realistic rendition of stored sequences.

39 Claims, 29 Drawing Sheets

GAME CONTROLLER CAPABLE OF STORING AND EXECUTING STORED SEQUENCES OF USER PLAYING BUTTON SETTINGS

BACKGROUND OF THE INVENTION

This present invention is directed to video game controllers, and more particularly to game controllers that store and execute arbitrary sequence of moves. (Even more particularly, it relates to game controllers which employ efficient storing methods).

Widely available Video Game Systems (VGS) comprise a Video Game Processing Unit (PU) and a User Controller (UC) having a set of user play buttons. The UC provides information about each user play button setting to PU.

A play button is said to be in its Idle state or setting if it is in its default or original position, and it is said to be in an Active state or setting if it is being set by the user. More generally, the user play buttons are in an idle setting if all the buttons are in idle states. And, the user play buttons are in a Single or a Multiple setting, if respectively, one or more of the buttons are in active states. The single setting of the user play buttons is aslo refered to as a trivial setting.

A Move is a change in game status or game position, on or off the screen. While playing a game, user asks for changes in the game position or status from PU using the user play buttons. Each single setting of the user play buttons is a Request for a certain change in the game status according to specific rules or instructions of the game.

A move requested by such a single setting of the user play buttons is called a Simple Single Move. As for the multiple settings of the user play buttons, in general, each is equivalent to a simultaneous request for changes or moves corresponding to the active buttons in the play buttons. Thus, by making both "move right" and "jump" requests, the screen character can be made to perform both movements at the same time.

In many games, to enlarge the dynamics of the play, in addition to the above moves, there are certain Special Moves introduced. The special moves differ from each other and from the above mentioned moves in the way they are to be requested.

A common special move is one which is requested by a multiple setting of the user play buttons. We call this a Simple Multiple Move. Note that it is understood based on game instructions that a multiple setting of the user buttons associated with a simple multiple move does not constitute a simultaneous request for moves corresponding to active buttons in the multiple setting. But instead is a request for the designated simple multiple move. Thus, for example in "Super Mario 3", a popular game designed for Nintando video game systems, by requesting both "move right" and "twist" moves, the character would accelerate.

Another special move, typically used, is one for which the request is a short sequence of simple and/or multiple settings of the user play buttons. We will refer to this as a Combination Move. Yet another special move is a "Combination with Last Play Buttons Hold" move. Here to maintain the move the user is required to hold the last button setting of the requesting sequence.

In addition to and sometimes in connection with all the moves noted above, there are the so called "Time Dependent" moves. In a time dependent move the change could evolve in size as a function of the time its requesting user button setting is sustained.

As already mentioned, special moves differ from simple or multiple moves in the way they are requested. Even though, these moves provide more dynamics to the play, their requests, nonetheless, due to limited play buttons on the user controller, could take on many different and often complicated forms as seen from the above few examples.

To make matters worse, the user button settings associated with these special moves are usually difficult to manage and can be frustrating to players. This is because the easier settings are justly set apart for use in connection with the more frequently used simple and multiple moves, so that the special moves are less convenient to the user and hence harder to request.

No satisfactory approach to alleviation of these problems, other than to encourage players to "practice" the special moves is known. Among available video game user controllers, one advertised as programmable (to store passwords), could save a sequence of single (trivial) settings of the user buttons, and upon request reproduces each single user setting in the same order as saved, for a predetermined duration, following each with the idle setting. This feature though useful for storing and retrieving passwords does not address or solve the more complex problem of storing and/or execution of any of the discussed special moves. The storage and reproduction of the special moves, in general require, not only true reproduction of arbitrary settings of the user play buttons, but also close or exact time span of each. A practical solution to this problem, for the special moves with moderately long sequences, would require finding an efficient data compression technique.

OBJECTS AND ADVANTAGES

Accordingly several objects and advantages of our invention are providing a user controller having a set of auxiliary buttons, each having the capacity to be used to
 a) request a simple multiple move;
 b) request a combination move;
 c) request and sustain a combination move with last button hold;
 d) request a time dependent simple multiple move;
 f) request a combination move with time dependent user play button settings;
 g) request and sustain a combination move with last button hold with time dependent play button settings; and
 h) request a general special move.

Another intention of the invention is to make the auxiliary buttons programmable so that they could be assigned to arbitrary special moves matching the needs of different games or of different stages of one game.

Further purposes of our invention are to provide a user controller having the ability:

1) not only to reproduce special moves but also to reproduce exactly any arbitrary sequence of user play buttons settings, thus relieving the user from having to repeat sequences of play settings which might be cumbersome; and 2) to noiselessly condense information about the settings of arbitrary user play buttons which it stores, so that it can store and reproduce relatively longer sequences.

Furthermore we claim the following additional objects and advantages: to provide a UC able:

a) to produce a merged request corresponding to a stored together with a current user key settings, allowing the user to (insert) add to the executing request;

b) to resolve conflicts in merged stored and user requests. Permitting the user to override an executing request;

c) to while producing a stored sequence of requests, update each request based on the user additions and overrides of the time;

d) to cyclically produce a sequence of requests corresponding to a stored sequence of user buttons settings;

e) to generate a sequence of fast pace reproductions of requests corresponding to a stored sequence of user buttons settings. This is a useful feature, when a faster reproduction is more important than the true reproduction.

f) to permit altering and/or extending a stored sequence of requests according to later user buttons settings; and g) to save a sequence of requests, each request matching either to current user buttons setting or to a request in a user invoked stored sequence or to the merged request of the two, as the situation might be. This enables the user to save a played game in which he/she might exercise not only the play buttons but also stored sequences.

This invention is based on the observation that by providing the capability for recording non-trivial (such as simple multiple moves) and a combination move which includes a non-trivial move, the many difficulties described above in conventional systems are alleviated. Furthermore, time dependent input information is monitored and unintended idle settings are discarded to provide more realistic rendition of stored sequences.

One aspect of the invention is directed towards a user controller device for use with a game processing unit and for providing information to the unit for playing a game. The device comprises input means having a plurality of inputs for detecting user requests for recording a sequence of one or more user input settings, such settings including at least one non-trivial input setting. The device further includes means for storing the sequence and execution means to provide to the game processing unit information based on the stored data. The method of this invention enables a user to control a processing unit for playing a game. The method includes detecting user requests for recording a sequence of one or more user input settings, such settings including at least one non-trivial input setting, and storing the sequence.

Another aspect of the invention is directed towards a user controller device for use with a game processing unit and for providing information to the unit for playing a game. The device includes input means having a plurality of input for detecting user requests for executing a sequence of one or more user input settings. The device further includes non-volatile means for storing sequence to be executed, where the storing means is removable. The device further includes execution means to provide to the game processing unit information based on the stored data.

Another aspect of the invention is directed towards a controller device for operating a game. The device includes a game processing unit and input means having a plurality of inputs for detecting input requests for recording a sequence of one or more user input settings. The settings include at least one non-trivial input setting. The device includes means for storing the sequence and execution means to provide to the game processing unit information based on the stored data for operating the game.

The foregoing, together with other objects, features and advantages, will be more apparent after referring to the following specification and accompanying drawings.

LIST OF REFERENCE NUMERALS

Figure 1:
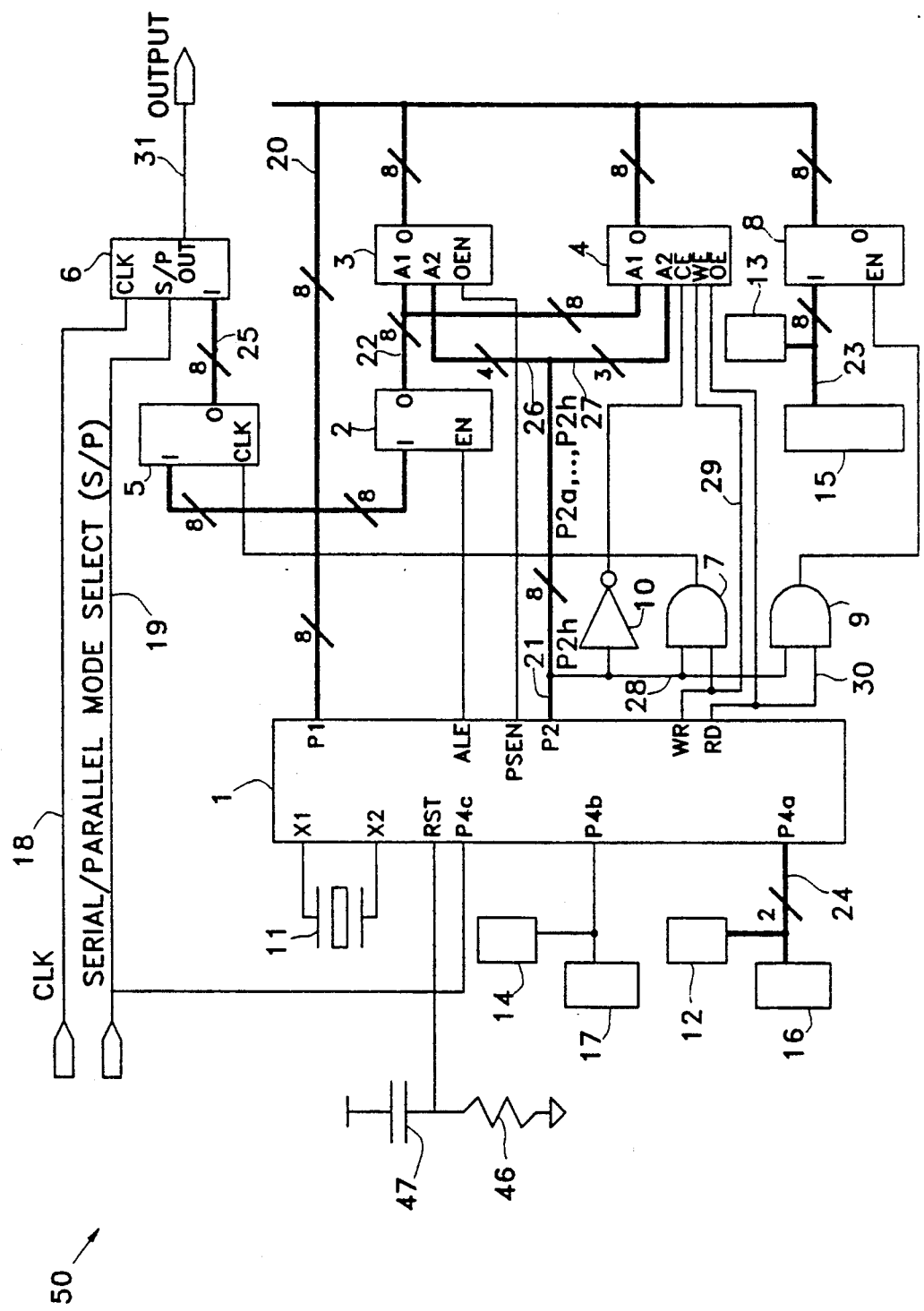
FIG. 1 is a block diagram of the hardware architecture that incorporates the first embodiment of the invention.

1: Microcomputer
Stored Program Central Processing Unit (CPU), with Random Access Memory (RAM), and general purpose Input/Output (I/O) ports.

2: Address Latch
Latch to de-multiplex the CPU multiplexed address-/data bus.

3: Program Memory
Programmable Read Only Memory (PROM), that holds the program to be executed by the CPU.

4: Data Memory
Random Access Memory (RAM) which holds the CPU

5: Output Holding Register
Register to hold the output data, to be serialized.

6: Serializer
Parallel to serial shift register.

7: Output Latch Clock Generator
Decoder to drive the output holding register clock port.

8: Input data tri-state buffer

9: Tri-state Buffer enable generator
Decoder to drive the input data tri-state buffer enable port.

10: Inverting Buffer 1

Inverting buffer driving data memory CE port.
11: Crystal Oscillator
Providing clock to the CPU.
12: Resistor Network 1
Current limiting resistors.
13: Resistor Network 2
Current limiting resistors.
14: Resistor 1
Current limiting resistors.
15: User play status interface means
16: User Auxiliary request means
17: Mode Select means
18: External clock
Input provided by Video Game System Processing Unit (PU).
19: Serial/Parallel Mode Select
Defines the mode of operation of the serializer (6).
20: Address/Data Bus
Multiplexed address/data 8-bit bus from the CPU (1).
21: High Address Bus
Address bus which is the output of CPU (1) port 2.
22: Low Address Bus
Demultiplexed address bus which is the output of the address latch (2).
23: Control Bus1
24: Control Bus2
25: Parallel output Bus
26: Address Bus1
27: Address Bus2
28: High Address Line
29: WR Strobe line
30: RD Strobe line
31: Output
Output provided to the Video Game System Processing Unit (PU).
32: User function modification request means (16) is connected to a port P4A of the CPU (1) with a two bit control bus2 (24). A current limiting resistor network 1 (12) is connected to the said bus (24) as in FIG. 1.

A user mode select means (17), is used for receiving user requests by pressing PS which is a two state on/off switch. Means (17) is connected to a port P4B of the said CPU (1). A current limiting resistor 1 (14) is connected to the said port P4B.

A crystal oscillator (11) is wired to ports X1 and X2 of the said CPU (1).

A RST (reset) port of the CPU (1) is connected to a resistor 3 (46), and a capacitor (47). The other terminal of resistor 3 is grounded, and the other terminal of the capacitor is connected to power.

An eight bit address/data bus (20) is attached to the following elements: an eight bit port P1 of the said CPU (1), an eight bit input port, I, of an address latch (2), an eight bit port, I, of an output holding register (5), an eight bit output port, O, of the tri-state buffer (8), an eight bit output port, O, of a program memory (3), and an eight bit port, O, of a data memory (4).

An eight bit high address bus (21) is connected to an eight bit port P2=(P2a, P2b, P2c, P2d, P2e, P2f, P2g, P2h) of the said CPU (1).

A three bit address bus2 (27) connects a three bit port A2 of the said data memory (4) to three lines of the said high address bus (21) that connect to ports P2a, P2b, and P2c of the said CPU (1).

A four bit address bus1 (26) connects a four bit port A2 of the said program memory (3) to four lines of the said high address bus (21) that connect to ports P2a, P2b, P2c, and P2d of the said CPU (1).

A low address bus (22) is joined to an eight
33: User long replay status means
34: User long replay Alter/Off/Program means
35: Control Bus3
36: Control Bus4
37: Resistor Network 3
Current limiting resistors.
38: Resistor Network 4
Current limiting resistors.
39: Resistor 2
Current limiting resistors.
40: Mode select1 means
41: Mode select2 means
42: Resistor Network 5
Current limiting resistors.
43: Resistor Network 6
Current limiting resistors.
44: Control Bus5
45: Control Bus6
46: Resistor 3
47: Capcitor
49: Video Game Processing Unit (PU)

DESCRIPTION OF THE INVENTION

Referring to FIG. 1, the hardware architecture of the first embodiment, will be described below.

Figure 2:
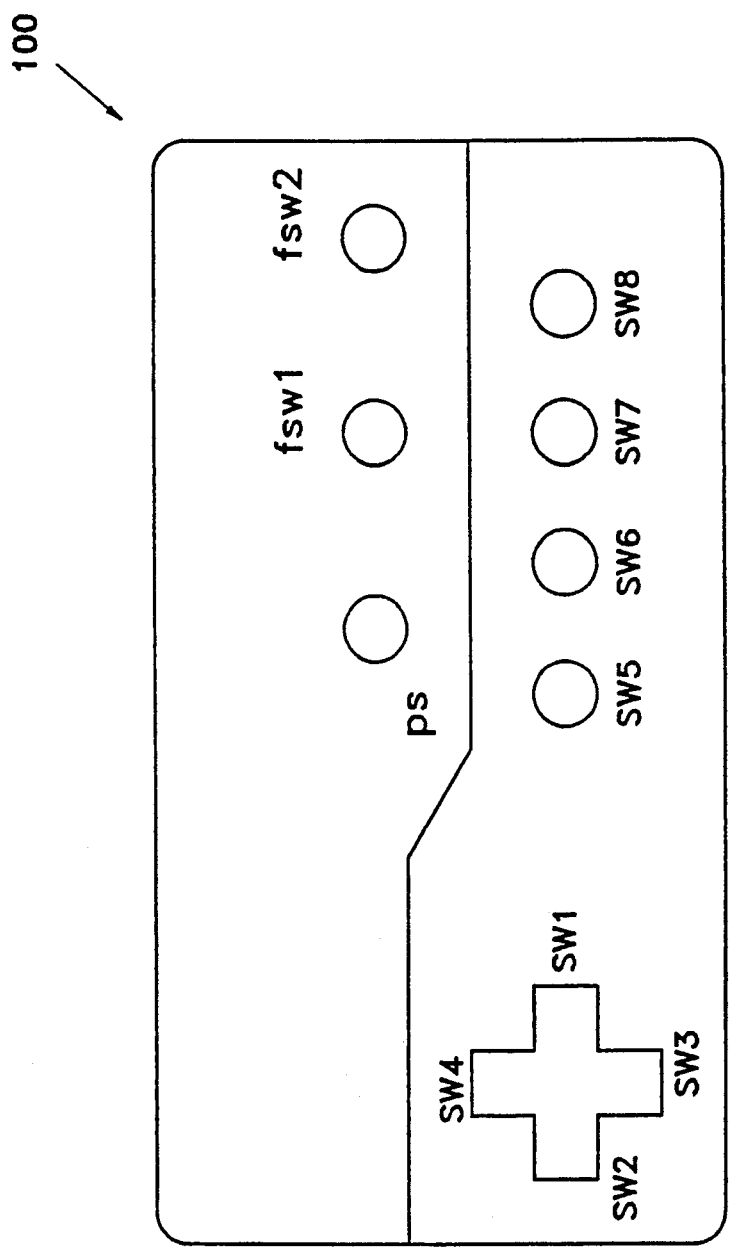
FIG. 2 is a pictorial top view of a user controller switches in the first embodiment of the invention.

A user play status interface means (15) is used for receiving user requests by setting sw1–sw8 of FIG. 2, which are a set of eight 2 state on/off switches. The interface is connected to an input data tri-state buffer (8) with an eight bit control bus1 (23). A current limiting resistor network 2 (13) is connected to the said bus (23) as in FIG. 1.

A user auxiliary request means (16) is used for receiving user requests by pressing fsw1, fsw2, which are a set of two 2 state on/off switches. Means bit output port O of the said address latch (2). The said low address bus (22) is also connected to an eight bit port A1 of the said program memory (3), and an eight bit port A1 of the said data memory (4).

An eight bit parallel output bus (25) connects an eight bit port O of the said output holding register (5) to an eight bit port I of a serializer (6).

An external clock (18) is wired to a port CLK of the said serializer (6). A Serial/Parallel mode select line (19) is wired to a port S/P of the said serializer (6), and to a port P4c of the said CPU (1). A port OUT of the said serializer (6) is wired to an OUTPUT line (31).

A high address line (28) connects an input of an output latch clock generator (7) to the port P2h of the said CPU (1). A WR strobe line (29) connects the other input of the said output latch clock generator (7) to the port WR of the said CPU (1). The output of the said output latch clock generator (7) is connected to a port CLK of the said output holding register (5).

The high address line (28) connects an input of a tri-state buffer enable generator (9) to the port P2h of the said CPU (1). A RD strobe line (30) connects the other input of the said tri-state buffer enable generator (9) to the port RD of the said CPU (1). The output of the said tri-state buffer enable generator (9) is connected to a port EN of the said input data tri-state buffer (8).

The high address line (28) is also connected to an input of an inverting buffer 1 (10). The output of the said inverting buffer 1 (10) is connected to a port CE of the said data memory (4).

A port ALE of the said CPU (1) is connected to a port EN of the said address latch (2). A port PSEN of the said CPU (1) is connected to a port OEN of the said program memory (3). The WR strobe line (29) also connects the WR port of the CPU (1) to a port WE of the said data memory (4). The RD strobe line (30) also connects the RD port of the CPU (1) to a port OE of the said data memory (4).

Figure 18:
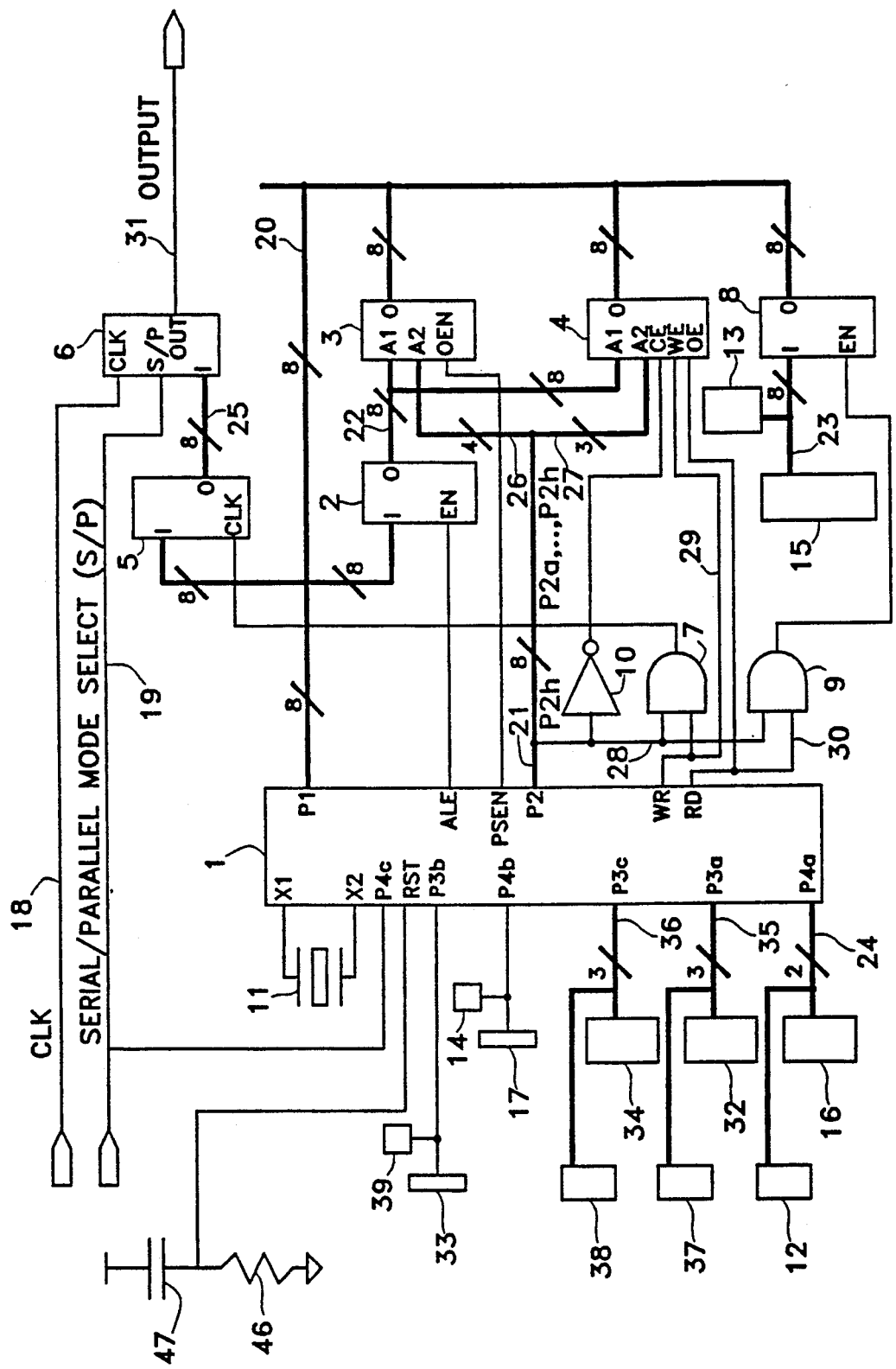
FIG. 18 is a block diagram of the hardware architecture that incorporate the second embodiment of the invention.

Referring to FIG. 18; the hardware architecture of the second embodiment, the additions to the hardware architecture of the first embodiment as shown in FIG. 1, will be described below.

A User function modification request means (32), a set of three 2 state on/off switches are connected to a port P3a of the said CPU (1) with a three bit control bus3 (35). A current limiting resistor network 3 (37) is connected to the said bus (35) as in FIG. 18.

A User long replay status means (33), a 2 state on/off switch is connected to a port P3b of the said CPU (1). A current limiting resistor 2 (39) is connected to the said port P3b as in FIG. 18.

A User long replay Alter/Off/Program means (34), a set of three, 2 state on/off switches is connected to a port P3c of the said CPU (1) with a three bit control bus4 (36). A current limiting resistor network 4 (38) is connected to the said bus (36) as in FIG. 18.

Figure 19:
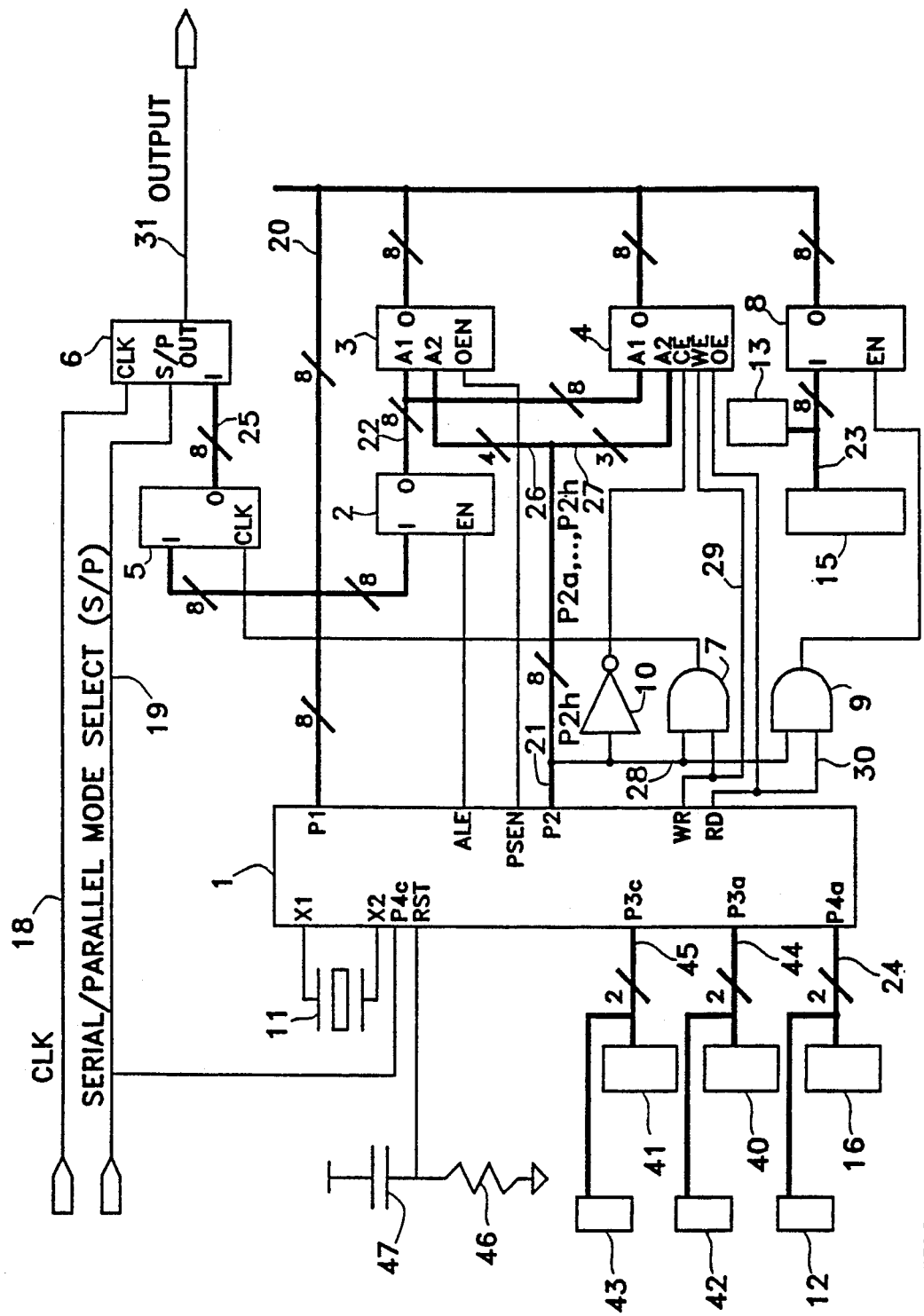
FIG. 19 is a block diagram of the hardware architecture that incorporate the third embodiment of the invention.

Referring to FIG. 19; the hardware architecture of the third embodiment, the minor changes to the hardware architecture of the first embodiment as shown in FIG. 1, is limited to the eliminating the mode select assembly (17, 14), and adding, a mode select1 assembly (40, 42), and a mode select2 assembly (41, 43). The connection of the said mode select1 and mode select2 assemblies will be described below.

A mode select1 means (40), a set of two, 2 state on/off switches is connected to a port P3a of the said CPU (1) with a two bit control bus5 (44). A current limiting resistor network 5 (42) is connected to the said bus (44) as in FIG. 19.

A mode select2 means (41), a set of two, 2 state on/off switches is connected to a port P3c of the said CPU (1) with a two bit control bus6 (45). A current limiting resistor network 6 (43) is connected to the said bus (45) as in FIG. 19.

Figure 26:
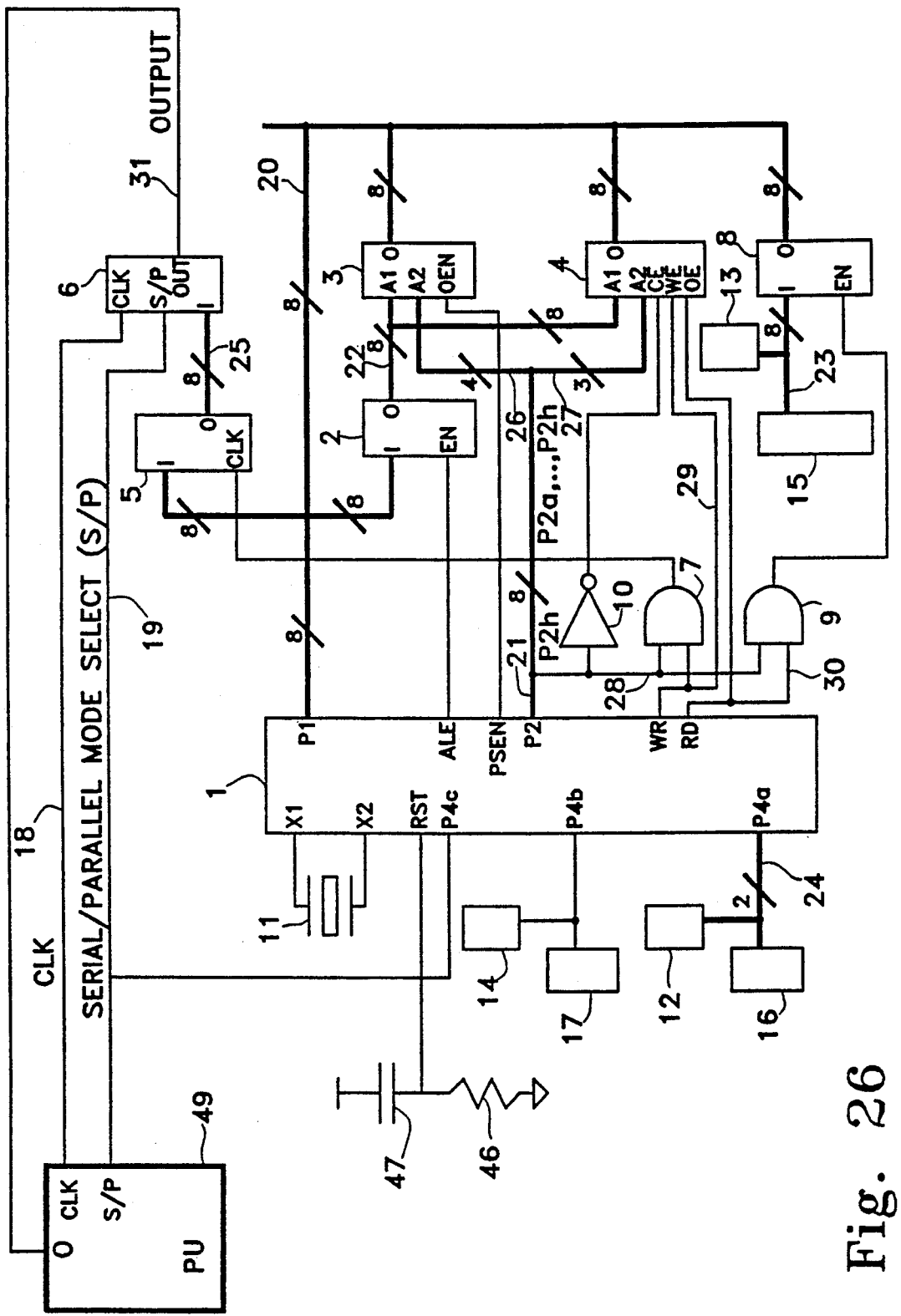
FIG. 26 is a block diagram of the hardware architecture that incorporates the integration of PU and UC.

Referring to FIG. 26, the hardware architecture that incorporates the integration of PU and user controller, the minor changes to the hardware architecture of the first embodiment as shown in FIG. 1, is the addition of a game processing unit (49) and the connection of the ports CLK, S/P, and O of the game processing unit to lines CLK (18), Serial Parallel mode select (19), and Output (31), respectively.

A high level operation of system 50, the hardware of a Recording Game Controller of first embodiment in FIG. 1, will now be described in reference to the control and play switches shown in FIG. 2. FIG. 2 is a schematic view of a user interface keyboard portion of the Recording Game Controller of the first embodiment illustrating the different control and play switches which may be set by the user. The play switches sw1 through sw8 may be similar to those on conventional video game user interface keyboards, such as that of the Nintendo ® system. The invention teaches the addition of control switches ps, fsw1, fsw2 for recording and playing back the recorded moves or combination moves.

The various circuit blocks of FIG. 1 are used to perform the different video game controller functions described herein. Central processing unit (1) may be one available commercially, such as Intel 8051. The software described below in reference to the flowcharts in the figures of this application is stored in program memory (3); such software is read and carried out by CPU(1). The combination moves desired by the user may be recorded in data memory (4) by setting certain switches, such as fsw1 and fsw2 of FIG. 2. While in the preferred embodiment, data memory is a separate device from CPU (1), it will be understood that the data memory may form a part of the CPU memory; however, in such event, the CPU(1) will need to be customized. Therefore the embodiment of FIG. 1 is optimized in terms of hardware costs, since it uses commercially available components.

In operation, the CPU(1) reads instructions from memory (3) through bus 20 and port P1. The CPU then generates various signals for operating the system 50. When the user is not recording any moves, the user is primarily setting the switches sw1-sw8; such settings are detected by interface (15) and supplied to bus 20 through buffer (8). Buffer (8) is enabled by the output of gate (9), which supplies a digital signal of value "1" to enable the buffer (8) when the CPU sends a read signal "RD" to gate (9) and when the most significant bit P2h of bus 21 is high. The CPU reads the settings input by the user indicated on bus 20 through port P1 and sends outputs to the output holding register (5) where the outputs are serialized by serializer (6) before the outputs are sent to the PU through output (31). Clock (18) and signal S/P (19) are signals from the PU for operating the serializer.

When the user is recording moves, the user should first set the ps switch, which is detected by interface (17) and supplied to port P4b of the CPU. Next the user should select one of the few switches by pressing and releasing fsw1 or fsw2, which is detected by interface (16) and supplied to bus (24), which is accessed by the CPU through port P4a. From this point on, the user is primarily setting the switches sw1-sw8 to be recorded, as before such settings are detected by the interface (15) and supplied to bus (20) through buffer (8). As above the CPU reads the user input settings indicated on bus (20) and outputs to the output holding register (5). However, additionally the CPU stores information on the user settings in the data memory (4), which is a set of ordered registers. To write an information in a data memory register, the CPU sets the address of the register on buses (22) and (21) with the most significant bit P2h high), outputs the information on bus (20), and sends a write signal "WR". The CPU doees not use a data memory register for each user input setting, instead to efficiently store a sequence of user settings, roughly, it uses one register of the data memory to write a user input setting and another register to write the duration of that setting.

When the user is replaying a recording sequence stored under an fsw, the user should first deactivate the ps switch, next the user should press and release the fsw switch. From this point on, the user is primarily waiting for the CPU to complete the playback. The CPU reads the information on the stored sequence from the data memory and reconstructs the sequence, and sends outputs to the output holding register (5) where the outputs are serialized by serializer (6).

OPERATION OF THE INVENTION

The following description concerns video game systems having a processing unit and a user controller, wherein the user controller comprises, a set of eight, 2 state electric play switches or buttons sw1, sw2, ..., and sw8. Each play switch swi having a first state corresponding to a high voltage on its output line, and equivalent to an idle switch setting. This first state will be denoted by the symbol "1". And a second state corresponding to a low voltage on the output line, and equivalent to an active setting by the user. This second state will be denoted by the symbol "0".

The status of the play switches at any given time t can be summarized by a binary status vector (b1, b2, ..., b8), wherein each bi takes values 0 or 1, and is similar to the state of the play switch swi. We call this vector the User Play Status Vector and refer to it by UPSV.

It is further assumed, that the status vector is updated by the user controller at every discrete time $t_i$. The sequence of times $\{t_i\}i$ is provided to the UC by the game processing unit through the signal S/P (19) in FIG. 1. We call this sequence $\{t_i\}i$. The Discrete User Status Sampling Time Sequence. The game processing unit, in turn, receives the information UPSV($t_i$), the user play status vector at time $t_i$, from the user controller, through output (31) in FIG. 1.

These specific restrictions to the illustrated examples, nevertheless, are not to considered limiting. Only the appended claims define the true spirit and scope of the invention.

Referring more particularly to the drawings and to FIG. 2, the first embodiment for Recording Game Controller (RGC) with 3 sets of switches is shown. A first set of Play Switches sw1, sw2, ..., and sw8 which are typical of the buttons existing on many video controllers. A second set of Auxiliary Switches consisting of 2 user function buttons fsw1 and fsw2. And a third set of Mode Select Switches, consisting of a single program on/off switch ps. As with the play switches, we summarize the status of the auxiliary and mode select switches with an Auxiliary Switch Status Vector ASSV = (a1, a2), and a Mode Select Switch Status Vector MSSV = (m), respectively. We note that the play and auxiliary switches are push button on/off switches of non-toggle type, i.e., they return to their idle settings once released, whereas the ps is an on/off toggle switch.

The general operational steps of the proposed first embodiment of the RGC will next be described using the flow charts of FIGS. 3-8 and the list of flow chart variables of Table 1. For clarity and easier referencing we have combined group of boxes with similar tasks into larger units, whenever possible.

Figure 3:
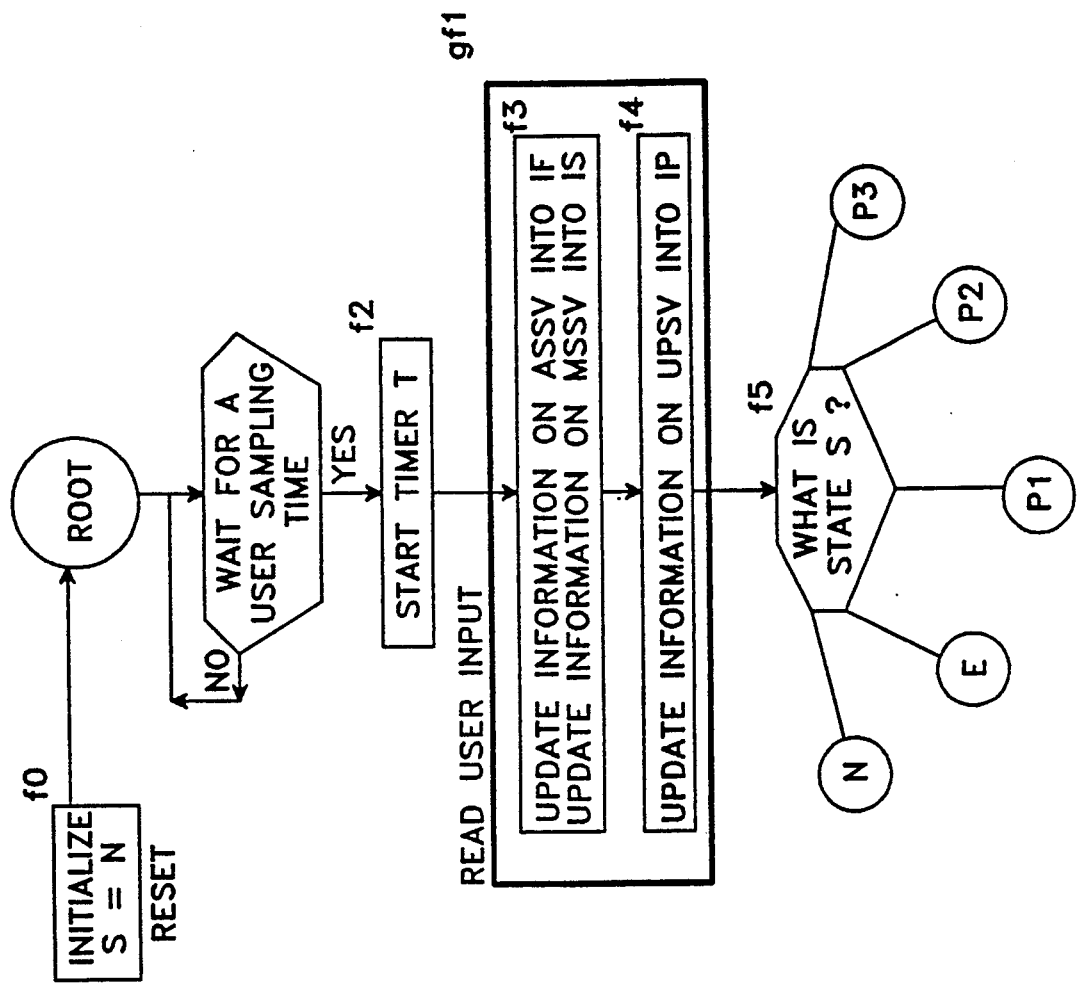
FIGS. 3-8 contain the flow charts 1-6 describing the operational steps of the user controller according to the first embodiment of the invention.

Before describing the flowcharts in detail, it is useful to note several general features of the software. The routines in the flowcharts are carried out by the CPU in response to the signal S/P from the PU. The S/P cycles are long enough for the CPU to carry all the steps in the flowchart. During each cycle, the operation of the software is controlled by the state it is in. As shown in FIG. 3, the RGC may operate in 5 different modes: N, E, P1, P2, P3.

The auxiliary switches fsw1, fsw2 are used both for recording moves and for executing moves, depending on the setting of the program switch ps. This optimizes the use of the switches and makes the system easy to use. The user will require some time to press the appropriate switches before starting to press the play switches that makes up the sequence to be recorded. Thus, a user may ponder upon what sequence to record after the fsw1 or fsw2 switch is pressed. In such event, it is desirable not to record the idle moves; otherwise, such idle moves will be reproduced upon playback and is undesirable. For this reason, the software provides that the CPU does not store any idle play settings that precedes the first non-idle (i.e., active) user play settings. Further, the system of this invention computes the length L* of the stored moves by omitting any idle moves that follow a programmed sequence. The user will require some time to exit from the programming modes once the sequence is completely entered. Furthermore, the variable L* stored is important for implementing the feature of last button hold. Obviously, the system will need to know what the last non-idle move is before this feature can be implemented; for this reason it is important to eliminate the idle moves that follow a sequence to be recorded from the recording.

We start at the Root of the chart in FIG. 3. The RGC awaits for a user status sampling time $t_i$, in a box f1. Upon receiving a $t_i$, the RGC starts a timer T, as shown in box f2. This timer is employed so that RGC could time its PU outputs to occur after a constant delay with respect to $t_i$'s, (a desirable synchronization property for such a device). Next the RGC updates information on all switch status vectors by reading their corresponding switch settings, box gf1. This step involves:

a) (box f3) Updating information on ASSV = (a1, a2) into an 8 bit register IF, the information is mapped as follows

| IF = 0 (decimal), | if (a1, a2) = (1, 1), |
|---|---|
| IF = 1 (decimal), | if a1 = 0, |
| IF = 2 (decimal), | if (a1, a2) = (1, 0). |

Notes:
1) From now on all vectors and variables will be 8 bit registers unless specified otherwise. Further when clear from the context, no distinction will be made between a register and its content.
2) Given a binary register R, R = n (decimal) denotes that R is equal to the binary representation of the decimal number n.
b) (box f3) Updating information on MSSV = (m) into register IS, the information is mapped as follows IS = m.
c) (box f4) Updating information on UPSV = (b1, b2,..., b8) into a register IP, the information is mapped as follows IP = UPSV.

Following these user input read steps, the tasks performed by the RGC is based on its Current Operational Mode (COM), S. This dependency is reflected in box f5 of the chart. The RGC has five basic operational modes, Normal (N), Program1 (P1), Program2 (P2), Program3 (P3), and Execution (E). Note that the RGC initializes the S to N upon reset of the CPU in box f0. Roughly, in mode N, the RGC collects UPSV and provides it to the PU, in modes P1, P2, and P3 RGC collects UPSV, stores it in an efficient way, and provides it to PU on line (31). And in mode E, the RGC executes a stored sequence of UPSV's. To make this precise let us continue the discussion of the flow charts.

Figure 4:
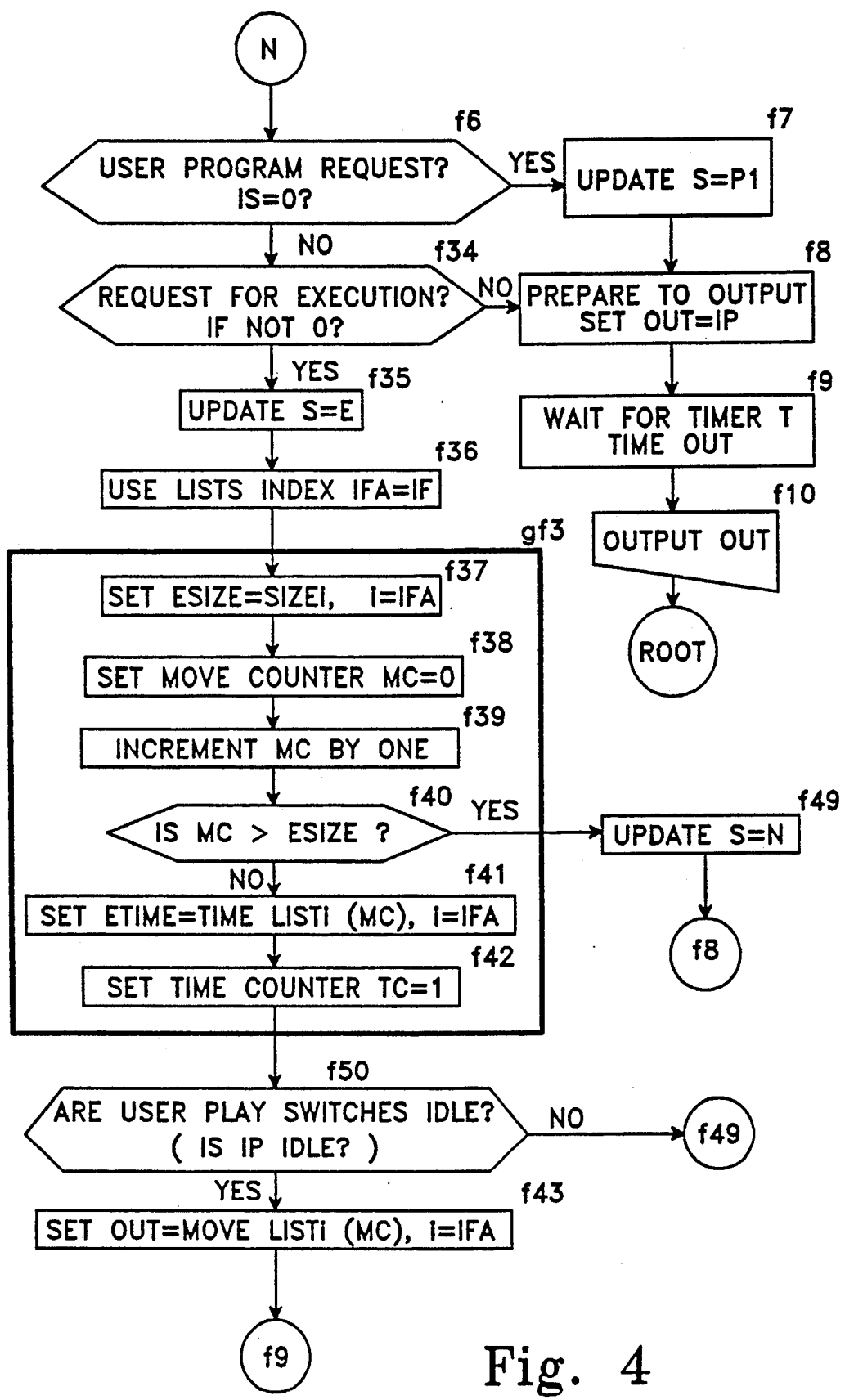

If S is N, the RGC proceeds to box f6 as shown in FIG. 4. Here it checks if there is a user request for programming. To request programming the user ought to turn the ps switch on. Thus, the check is made using IS. More specifically, there is a user program request if and only if IS = 0, in which case, the COM, S, is updated to P1 (box f7), and an output vector OUT is set equal to IP (box f8). OUT is a register used to temporarily hold output vectors. From here the RGC moves to box f9, where it waits for the timer T to stop, at which time it outputs OUT on bus 20, and stores it in register (5) of FIG. 1 (box f10) and returns to the Root.

This embodiment permits programming (storing) of two distinct sequences of UPSV's, or equivalently of two sequences of IP's, one for each function switch fsw. The method used for storing this information play an important role in the structure of the RGC operation and to the rest of the description. Therefore, this issue together with the program modes P1, P2, and P3 are described next prior to completion of the mode N details.

A sequence IP(1), IP(2), IP(3), ..., IP(q), where the index i is incremented by one for each user sampling time $t_i$, starting from some initial time $t_0$, would in general require q registers to store. Considering the fact that, the frequency of the user sampling time $\{t_i\}$i is typically tens of times per second, it would in general demand a large storage to keep this information for a moderate size q. However, since the IP sequence is a user input sequence, it behaves as a slow varying sequence with respect to the indexing parameter $t_i$. This sequence can be parsed into bursts of constant IP's, each burst typically spanning many IP's. In other words, instead of storing too many IP's in a sequence which have the same value, we store such value and the time when IP changes from this value to a different value.

In data memory (4), the move lists and the time lists registers may advantageously be arranged so that the kth register in the L odered registers in the move list for one of the fsw switches is accessed together with the kth register on the L ordered registers in the time list for such switch, where the content of the kth register in the time list indicates the time duration during which the value of the IP vector remains at the value stored in the kth register in the move list. The maximum number of IP vectors that can be stored in any one of the two move lists is L.

In this embodiment, 8 bit registers are used for the move and time lists. For this reason, we test if the value of the IP vector stored in the kth register of the move list stays constant for more than 255 cycles; if this is the case, then 254 is stored in the kth register of the time list, and the same IP vector will be stored in the next (k+1)th register in the L ordered list of registers of the move list.

Thus, the following method of storage is used here to significantly increase the size of the information that can be stored. For each of the function switches fswi (i=1, and 2) there is a Move Listi (i=1, and 2) monitered by move counter MC and a Time Listi (i=1, and 2) monitered by time counter TC. Each list is a table of L ordered registers. The j-th register in a move listi will be denoted by move listi(j). Similarly, the j-th register in a time listi will be denoted by time listi(j). Now given a fswi (fix the i=1 or 2) and a sequence IP(1), IP(2), IP(3), ..., IP(q), the vector IP(1) will be stored in the move listi(1). Next, let j be the first index after 1 such that IP(j) is not equal to IP(1), and let j* be as follows:

j* = j, if j is less than 255,
= 255, if j is not less than 255.
Then,

[time listi(1) = j* − 1, and move listi(2) = IP(j*)].

Continue recursively, for move listi(2), just shift the indexing on the IP's such that the new IP(1) is the old IP(j*), ignoring the old IP(1) through IP(j*−1). Further continue, until either all IP's are processed or the lists are full.

The j*'s are upper bounded (in this case by 255) because of limitations of data memory (4), so that one needs to fix (in this case to 8 bits) the size of the registers that are required to save them (time lists). This condition can of course be relaxed by employing a more dynamical memory structure.

The above method works because there is a great deal of time dependency (redundancy) in user generated IP sequences. To further compress the information of IP sequences, one could exploit the redundancy that exists in the eight bit representation used for each IP. Particullarly, since not all possible (possible) settings: the constraint is that sw1 (move left) and sw2 (move right) cannot both be active, nor can sw3 and sw4, therefore only 7 bits are enough to represent each IP.

Figure 5:
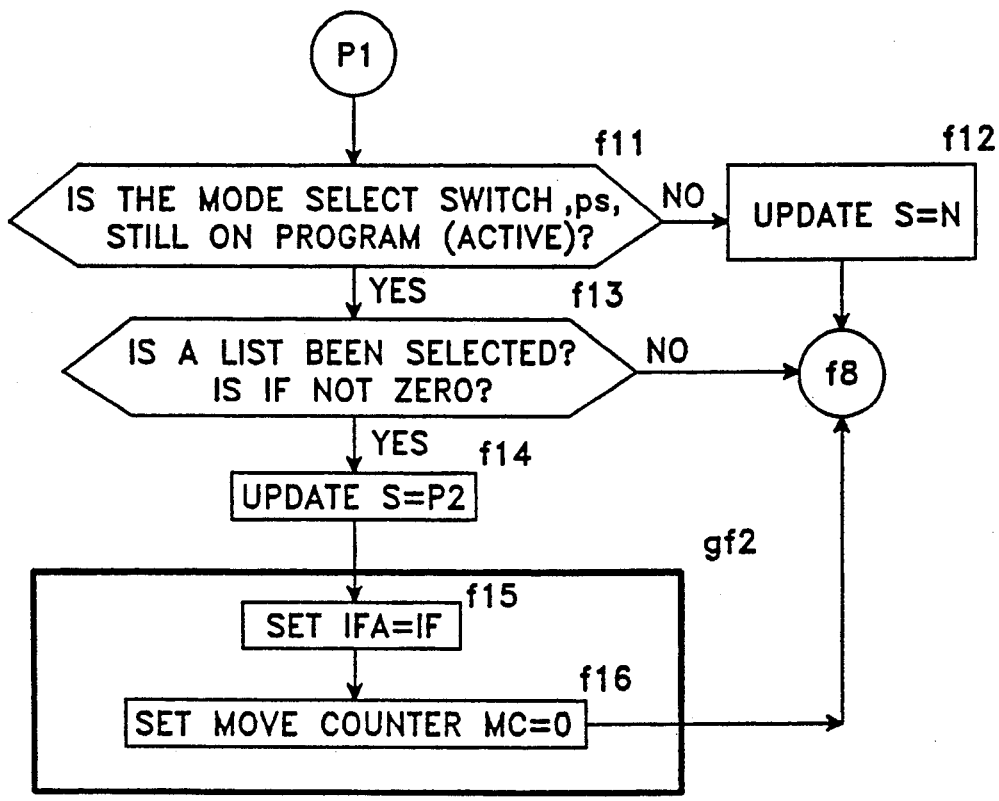

Referring to the flow chart of FIG. 5, a description of the program modes follows.

If S is P1, the RGC proceeds to box f11. Here it checks if the user request for programming is still valid, by testing IS=0 condition. The user request for programming becomes invalid if the ps switch is turned off, (IS=1), in which case, the S is updated to N (box f12), and the RGC moves to the discussed box f8 to prepare an output. On the other hand, if the program request is still valid (IS=0), then the RGC proceeds to the box f13. Here it is checked whether the user has selected a list. The user should select a move and a time listi (i=1 or 2) for programming, by choosing and pressing one of the function buttons fsw1 or fsw2. The check in this box is then made, by testing the condition (is IF not equal to 0?). If IF=0, a selection has not been made and the RGC moves to the box f8. However, if IF is not zero, then a selection has been made, and the next box is f14. In this box the S is set to P2, a state which reflects having a user selected list. From here the RGC goes to box gf2 and initializes program parameters. More specifically, it first stores the active or the selected list index i (i=1 or 2) in a register IFA, by setting IFA equal IF (box f15), and then initializes a move count register MC to zero (box f16). The counter MC will be used to point to the register in the L ordered registers in the active move i (i=IFA) list currently being written. Next RGC jumps to the box f8. During the next cycle initiated by S/P (19) the RGC will detect that S has been set to P2.

Figure 6:
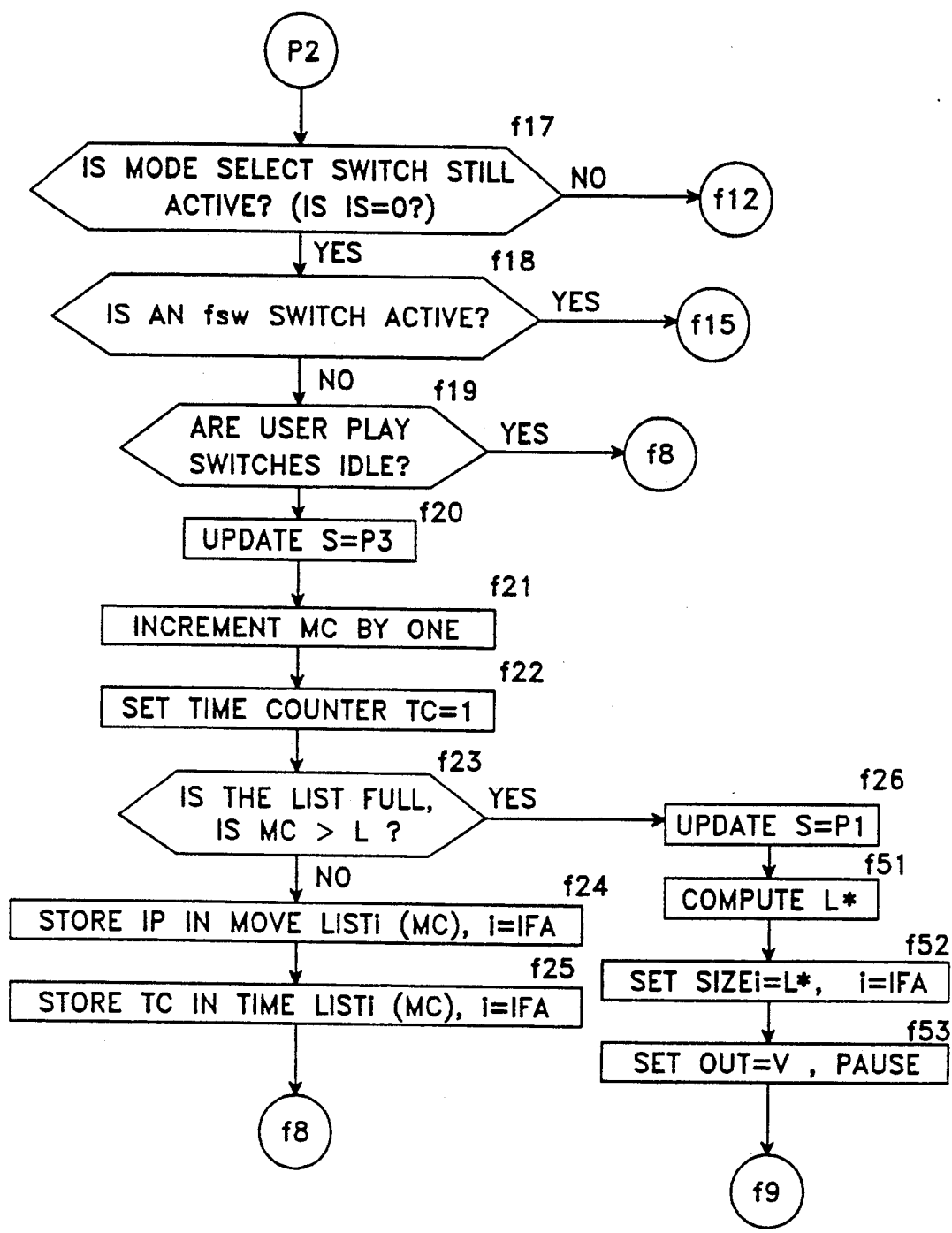

Referring to the flow chart in FIG. 6, if S is P2, the RGC proceeds to box f17 and checks if user program request is still valid, just as in the box f11. If the ps switch is turned off, (IS=1), the RGC jumps to the box f12 to update S and follows along from there. However, if the program request is still valid (IS=0), then RGC proceeds to the box f18. In this box it is checked whether any of the auxiliary switches is active or not. In this mode, the user is allowed to change its list selection by picking and pressing another fsw. This change is detected here by testing the condition (is IF not zero?). If the condition is true, implying an active fsw, it moves RGC to the box gf2 for reinitialization. Accordingly, another consequence of the box f18 is that, when S=P2, before saving any user play requests, the RGC circles a loop (p2, f17, f18, f15, f16, f8, ..., root, ..., p2) waiting for the user to release the selected fsw switch. And once the fsw is idle, implying that the condition of the box f18 is false, (if the other one has not been pressed in the meantime,) the RGC moves to box f19. This box requires a test on IP, if UPSV is idle, or equivalently if IP=(11111111) (IP=255 decimal), the RGC goes to the box f8. Note that, even though ps is on and a list has been chosen, an idle UPSV is not being stored. This useful feature, made possible by the box f19, lets the user to pause and prepare for programming, instead of rushing to enter his/hers settings immediately after a list selection. Hence, after user presses and releases fsw1 or fsw2, and before any play switch is pressed, the RGC simply repeats the loop (p2, f17, f18, f19, f8, ..., p2) and updates the IFA register (f15) without recording any idle moves. If IP is not idle, then RGC continues to box f20. Here the S is updated to P3, a state reflecting a first non-idle user setting and start of the list manipulations. From here the RGC advances to box f21, where it increments the move count register MC. And then to box f22, where it initializes a time count register TC to one. Referring to the discussion on the implemented storing algorithm, the register TC is used to find the parameter j*. The RGC carries on from here to box f23, note that this box is also reached from P3, and it is the place where RGC examines whether the active move list is full or not. The test that accomplishes this is on the following condition, (is MC larger than L?) recall that L is the available size of the either move lists. When, MC is not larger than L, (list not full) the RGC moves to box f24 and stores the IP into the MC-th register of the active move list, in terms of used notations, the RGC sets the move listi(MC) equal to IP, where i=IFA. Next it stores the content of the count register TC into the MC-th register of the active (i=IFA) time listi (box f25). Again in terms of the used notations, the RGC sets the time listi(MC) equal to TC, where i=IFA. Following this the RGC jumps to the box f8.

Referring again to FIG. 6, in the case, MC is larger than L, (list full) (box f23) the RGC proceeds to box f26, and updates the S to P1. Note that since the ps switch is still on, the S is not updated to N, as one might expect.

The RGC next computes a variable L* (box f51). The computational steps of the L* are straight forward, and thus are omitted from the flow charts of FIGS. 6 and 7. The L* is defined as the highest index, over the range of 1 to MC, of a register in the move listi(i=IFA), that is not idle. This variable is introduced to serve the following purpose. From the user's point of view, a programming session generally ends once the last non-idle request has been made. Therefore, execution of a stored sequence need not extend to any of the idle settings which might be in its tail, since they generally correspond to the time it takes the user to set the program switch, ps, to off.

Two variables Size1 and Size2, respectively, save the number of the registers that ought to be used from the move list1 and move list2 during execution. Therefore, in the box f52, sizei (i=IFA) is set to L*. From here RGC could jump directly to the box f8, but the user will not become aware of this change in the S and might still be under the impression that his/her moves are being stored. It is thus desirable to alert the user of this fact. A means toward this is to employ a commonly existing "Pause" feature of the video game systems. Specifically, in most VGS's one of the sw switches, sometimes designated by pause, when activated freezes and unfreezes the game in motion, alternatively. A pause request made by the RGC after the box f52, temporarily stopping the game could be used to alert the user. To continue, the user then can unfreeze the game using the same button. In box f53 the RGC performs precisely this kind of user notification by setting OUT equal to a value V, corresponding to a user pause request. The RGC next jumps to the box f9. Other means that could serve to notify the user that the storage is full are: a Liquid Crystal Display which could indicate this information, a Light Emitting Diode which could blink this information, or a beeper.

The method used in this embodiment is perhaps the most simple and the most effective one.

Figure 7:
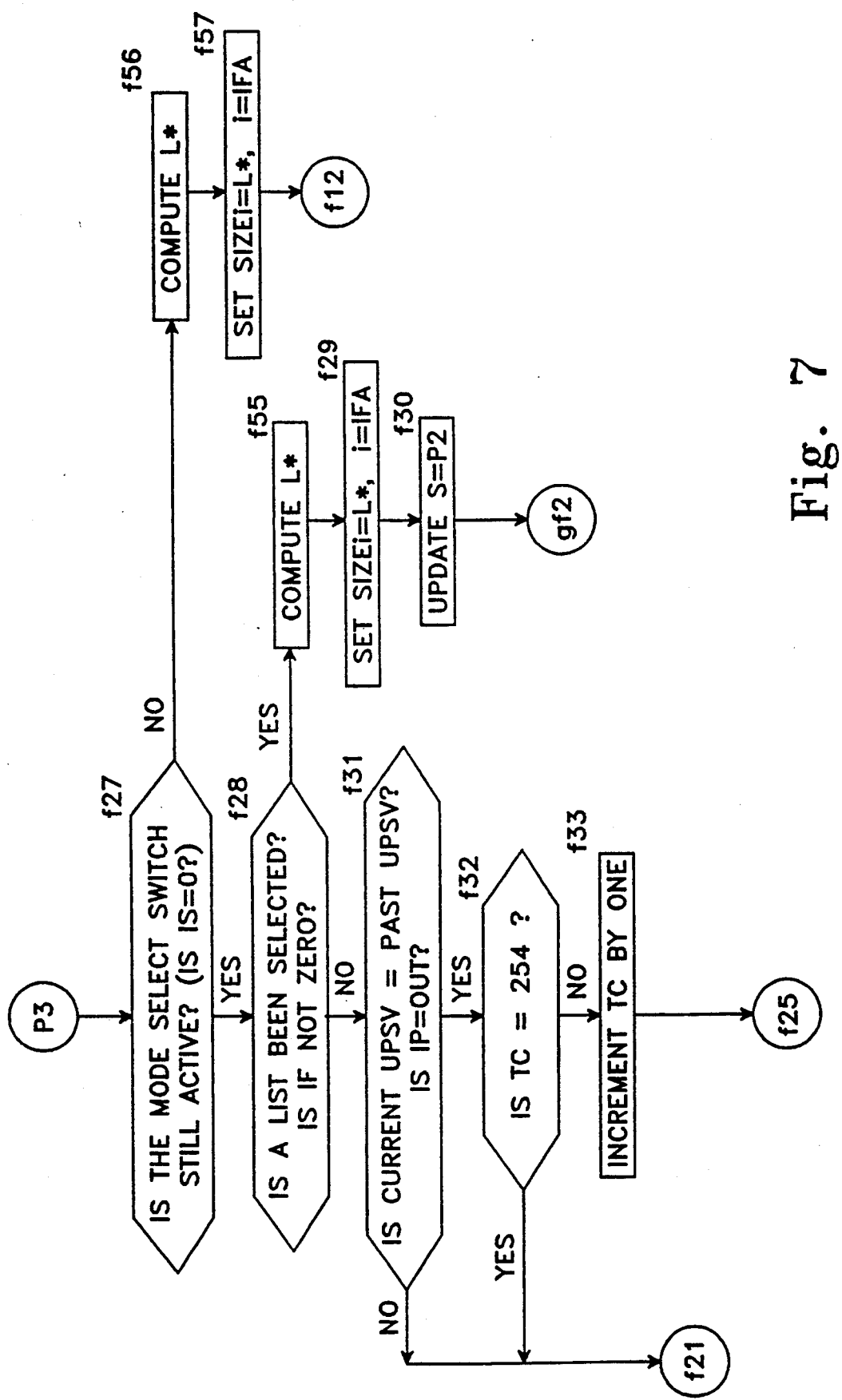

Referring to the flow chart in FIG. 7, if S is P3, the RGC proceeds to box f27 and performs a test on validity of the program request, just as in the boxes f11 and f17. If the ps switch is turned off, (IS=1), the RGC moves to box f56 and computes the used length of the lists and stores it in L*. Then it sets sizei (i=IFA) equal to L* (box f57), and jumps to the box f12 to update S and advances from there. However, if the program request is still valid (IS=0), then the RGC proceeds to box f28. For this box it is checked whether a list selection has been made.

In this mode, the user is allowed to select a new fsw. This change is detected here by testing the condition (is IF not zero?). If the condition is false, it indicates that the user is done with programming into the active (IFA) lists and would like to program another sequence. In addition, the user, if not satisfied with his/her play settings which are being saved, can exercise this option and start writing anew in the same active (IFA) lists, by picking and pressing fswi i=IFA. The RGC terminates its manipulations of the active (IFA) lists by recording their used size in the temporary register L* (box f55). And as in the boxes f52 and f57, update the register sizei (i=IFA) to L* (box f29). Following this, (box f30), the RGC updates S to P2 and jumps to the box gf2 for re-initialization. However, if the condition is false, it moves RGC to box f31. This box tests whether the current and past UPSV settings are similar or not, a required step in the storing algorithm. Since IP and OUT hold the current and the past values of the UPSV, respectively, the RGC examines the condition (is IP equal OUT?). If false, TC=j*−1 (note j* is the time value for the time listi(MC) (i=IFA), according to our storing method discussed earlier), and the RGC jumps to the box f21. Otherwise, the RGC goes to box f32 and tests if the time count TC equals 254. If TC is equal 254, TC=j*−1 again, and the RGC jumps to the box f21. Note that the RGC could jump to the box f8 instead of f21 to limit to one register information kept on time spans of moves. But this would in general make the stored sequence not an exact representation of the user input sequence. But if TC does not exceed 254, the RGC increments TC by one (box f33) and jumps to the box f25.

This completes the description of the program modes P1, P2, and P3, we can now return to mode N, and more specifically to the box f6 of FIG. 4. From here if there is no user request for programming, or is checked if there is a user request for execution. The user requests execution by selecting a desired programed move and time list and by pressing their corresponding fsw. Note, the switches fsw1 and fsw2 are used to indicate both a program as well as an execution request. The RGC makes the distinction based on the IS. for programming, when IS=0. If there is no request for execution, IF=0, the RGC proceeds to the box f8. Whereas if there is such a request, (IF is not zero) it continues to box f35, and updates the S to E. Box f36 is next. Here IFA is set equal to IF. In this mode, the register IFA is used to point to the selected lists for execution.

General execution parameters are initialized in the following global box gf3. In box f37, Esize is set to the size of the move list to be executed. Specifically, RGC sets the esize equal to sizei for i=IFA. The move counter MC is initialized to zero in box f38, and is incremented by one in box f39. In the next box, f40, which is also reached from the mode E, the RGC tests if it could terminate the execution. The test is whether MC is larger than esize. If MC is larger than esize the RGC moves to box f49, updates the S to N and jumps to the box f8. Otherwise, the RGC continues to set the next parameter which is Etime. In box f41, etime is set equal to the content of the register time listi(MC), i=IFA. Therefore, according to the storing algorithm, etime is the number of times OUT must be set to the move listi(MC), i=IFA. Finally, in the box gf3, the time counter TC is initialized to one in box f42. After this, the RGC advances to the box f50. This box provides an interrupt to the execution. If the play switch status is other than idle, the RGC will abort execution from here and jump to the box f49. The condition that is checked in the box f50 is (is IP=11111111?). If the condition is true, the play switches are idle and the RGC carries on to box f43 and set OUT equal to move listi(MC), i=IFA and jumps to the box f9.

Figure 8:
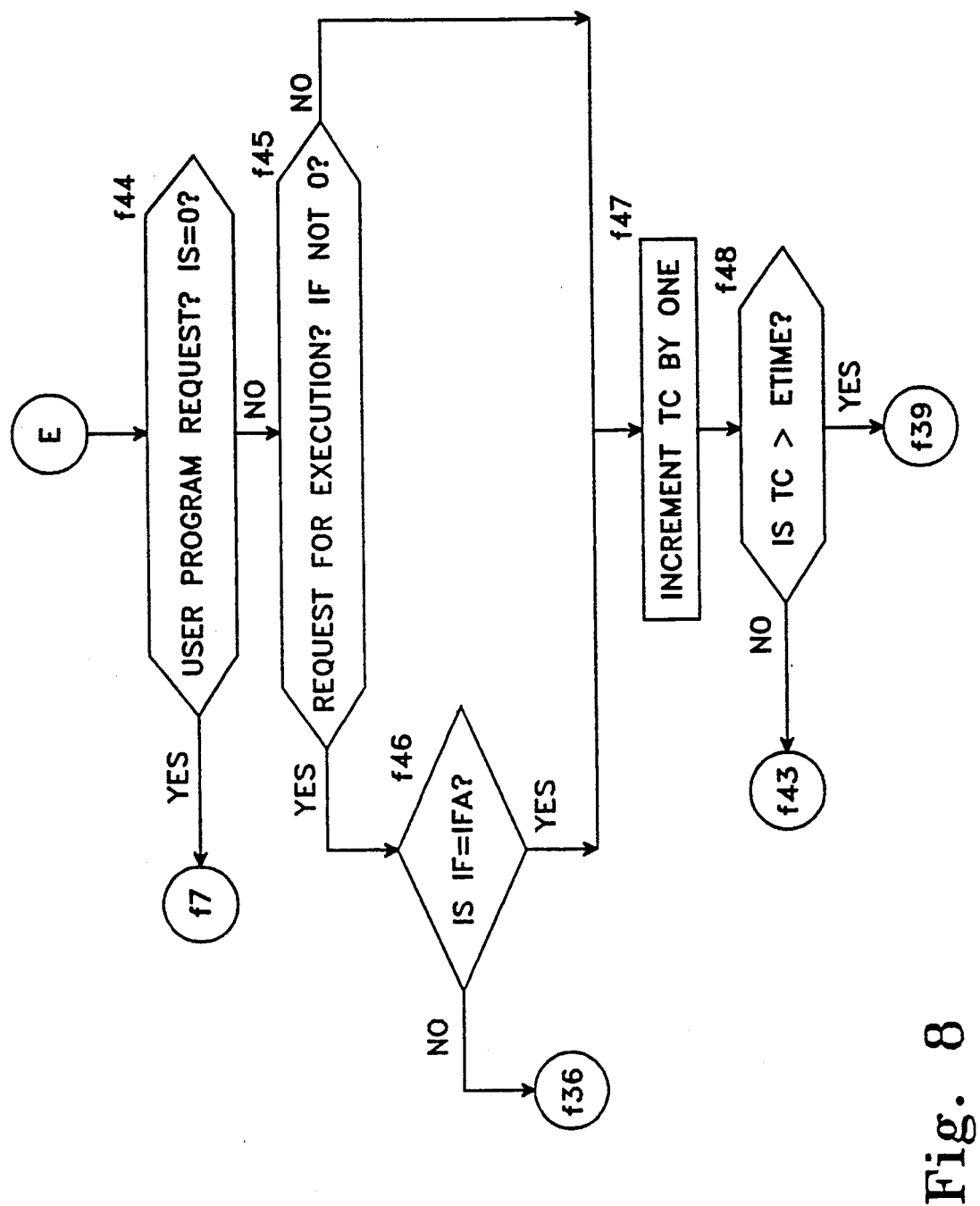

Referring to FIG. 8, if S is E, the RGC proceeds to box f44. Here it checks if there is a user request for programming, as in the box f6. If there is a user program request, IS=0, the RGC jumps to the box f7. Otherwise, it carries on to box f45. This box is for monitoring the auxiliary function switch settings. From the user's point of view, it is desirable to be able to halt the execution of one fsw and begin execution of the other on. One way the user can accomplish this is by pressing a different fsw. Particularly, if IF is not zero, (box f45), the RGC tests whether the user set fsw (IF) is the same as the IFA, in box f46. If they are not the same, it diverts from execution of the current move and time lists and jumps to the box f36 to execute the other lists. On the other hand, if IF and IFA are the same it goes to box f47 to continue execution. Similarly, from the box f45, if IF=0, the RGC advances to the box f47. The time counter TC is incremented by one in this box. And it is compared to etime in the box f48. If TC exceeds etime, the RGC is done with the move listi(MC), i=IFA, and needs to go on to the next move, thus the RGC jumps to the box f39. But if TC does not exceed etime, then it still need to output the move listi(MC), therefore the RGC jumps to the box f43.

This completes the description of the flow charts with respect to our fist preferred embodiment, covering the operation of the RGC. As regard to the user, the following list of "how to's", explain the manner in which to operate the RGC. In this list, each parenthesis gives the "next state S" that is caused by the user action which precedes it.

How to program a sequence: set the ps switch to its active position (S=P1). Select an auxiliary switch fsw1 or fsw2, by pressing and releasing the selected switch (S=P2). Start playing using the play switches (S=P3). The information on the key settings, as they are transmitted to the PU, will be stored under the selected fsw.

How to terminate programming under the selected fsw: this can be accomplished by any of the following.

1) By setting the ps switch to its off setting (S=N). This is the intended normal termination procedure.

2) By making a new auxiliary switch selection (S=P2). The new selection can again be either fsw1 or fsw2, regardless of the previous selection. After this step, the RGC will store the user key settings that follow, starting from the first non-idle setting, and save them under the later selected fsw. Therefore, if the same fsw selection is made here, the old stored sequence will be discarded by the RGC immediately following the first non-idle setting.

3) A third way programming under the selected fsw ends is when the memory lists of the fsw reach their capacity (S=P1). The user becomes aware of this situation, when suddenly the game freezes.

Remark: After 1) the RGC will be in the mode N, and after 2) and 3) it will still remain in the programming modes.

How to execute a stored sequence: this is simply done by pressing and releasing a fsw switch corresponding to the desired stored sequence, when the ps is off (S=E).

How to terminate execution of a selected few: this can be done by any of the following.

1) By pressing any of the play keys (S=N).

2) By setting the ps switch to its on setting. This will force the RGC to abort the execution and move to its first program mode (S=P1).

3) By making a different auxiliary switch selection (S=E). This will make the RGC to end execution of the first selected fsw and start the execution of the other one.

4) Finally, an execution terminates, when all the requests in the selected sequence are executed (S=N).

This now completes the description of the use and operation of the RGC.

Recalling, FIG. 1 depicts the hardware architecture of our preferred first embodiment. The central component of the architecture is the CPU (1). The art and science of microcontrollers are well established, and many articles, handbooks regarding the subject are available. A particularly useful and practical work on the subject is "Microcontroller Handbook" published by Intel. A especially practical microcontroller is 8031, manufactured by Intel. The CPU performs all the processing required in the RGC operation. The operations of the flow charts in FIGS. 3–8 are translated into a list of CPU (1) instructions. This list is referred to as the Firmware. Note that in this context the terms software and firmware are used interchangeably.

The firmware is stored in an external Programmable Read Only Memory; PROM (3).

The variables employed in the implementation are registers, which either reside within the CPU (1), referred to as internal variables or registers, or reside external to the CPU (1). The CPU (1) employed in this embodiment has 96 internal registers, indexed from 31–127.

The data memory (4) is the physical device that stores the ordered set of external registers. The data memory employed in this embodiment has 2048 (2K) indexed registers. The jth register of the data memory is denoted by dm(j). When the CE and OE ports of the data memory are asserted the contents of dm(j), j corresponding to the decimal value of eleven bit (A2, A1) ports of the data memory, is outputted on the eight bit, O port of the data memory. When the CE and WE ports of the data memory are asserted, the eight bit O port of the data memory is written to dm(j), j corresponding to the decimal value of the eleven bit (A2, A1) ports of the data memory.

Table 1 is a list of the variables employed in the flow charts of FIGS. 3–8. A partition of the said list into internal and external variables with respect to the CPU is discussed below.

The list of internal variables is: IF, IS, IP, S, OUT, LH, LL, IFA, MCH, MCL, TC, L*, V, ESIZEH, ESIZEL, and ETIME.

The list of external variables in the data memory is: SIZE1H, SIZE1L, SIZE2H, SIZE2L, and the sets of ordered registers of MOVE LIST1, MOVE LIST2, TIME LIST1, and TIME LIST 2.

These external variables correspond to the following registers of the data memory:

SIZE1H=dm(0),

SIZE1L=dm(1),

MOVE LIST1(j)=dm(2*j+4) for 0<j<498,

TIME LIST1(j)=dm(2*j+5) for 0<j<498,

SIZE2H=dm(1000),

SIZE2L=dm(1001),

MOVE LIST2(j)=dm(2*j+1004) for 0<j<498,

TIME LIST2(j)=dm(2*j+1005) for 0<j<498.

The major features of the CPU are:

Interrupt driven; the operation of the CPU can be suspended upon a set of prioritized external or internal events to execute a set of predefined instructions in real time, referred to as the interrupt service routine. Following the execution of the interrupt service routine the CPU would resume the execution of the suspended program.

Counter/Timer; the CPU instructions allow setting a timeout value and starting an internal timer. Further upon expiration of the said timeout an internal interrupt would be generated.

The CPU organization and instruction set allows the CPU to communicate with external devices.

The CPU communication with external devices is via the ports of the CPU. The CPU comprises of four 8-bit General Purpose Input/Output Ports, P1, P2, P3, and P4. Note that P3 is not used in the first embodiment, and hence not shown in FIG. 1.

The organization and instruction set of the CPU employed in the present embodiment supports three communication methods: General Purpose Input/Output Port Read/Write, External Data Memory Read/Write, External Program Memory Read. The CPU interface comprises of four 8-bit General Purpose Input/Output Ports, P1, P2, P3, and P4. The operation of the above communication methods will be described below:

Read general purpose input/output ports: the CPU instructions allow direct or indirect reference to each bit of the P3 and P4 ports.

Write general purpose input/output ports: the CPU instructions allow setting individual bits of the said general purpose Input/Output P3, and P4 ports.

Read external data memory: based on two 8-bit variables DPTRH, and DPTRL, the CPU can be instructed to sequentially perform the following operation: output the contents of DPTRH on P2 port, and concurrently output the contents of DPTRL onto P1 port, assert Address Latch Enable, ALE, port, negate ALE port, float P1 port, assert RD port, write P1 port into an Accumulator ACC, negate RD port.

Write external data memory: based on two 8-bit variables DPTRH, and DPTRL, the CPU can be instructed to sequentially perform the following operation: output the contents of DPTRH on P2 port, and concurrently output the contents of DPTRL onto P1 port, assert Address Latch Enable, ALE, port, negate ALE port, output ACC onto P1 port, assert WR port, negate WR port, float P1 port.

In the above external data memory read/write operations a 16-bit binary number formed by augmenting the contents of DPTRH and DPTRL is called Address; i.e, Address=(DPTRH, DPTRL). The set of all possible addresses is called the External Address Space. In our embodiments the external address space is the set of all 16 bit binary vectors.

The ALE port of the CPU connected to EN port of the address latch, strobes the value of P1 port of the CPU into the address latch (3), when the ALE port of the CPU is "1". The 8-bit output port of the address latch; O, drives the low address bus (22). The high address bus (21) is driven by P2 port of the CPU.

In should be evident that for CPU external data memory read and write operations the high address bus (21) assumes the value of DPTRH, and the low address bus (22) assumes the value of DPTRL.

Read external program memory: the CPU fetches firmware instructions from program memory for execution every machine cycle comprising of 12 cycles of the crystal oscillator. The CPU sequentially performs the following operations for program memory fetch: output a high byte internal Program Counter, PCH, on P2 port, and concurrently output a low byte internal program counter, PCL, on P1 port, assert ALE port, negate ALE port, float P1 port, assert PSEN, receive instruction byte from program memory on P1 port, negate PSEN. The PC is an internal 16 bit CPU register, comprising of PCH, and PCL, pointing to the program memory location to be fetched for execution by the CPU, and updated by the CPU based on the instructions.

Arithmetic, logic, control transfer, and data transfer operations: the instruction set of the CPU defines arithmetic, logic, control transfer, and data transfer operations.

Hardware support of specific flow chart boxes are:

Box f0; Power on reset, and initialization: A pulse on RST port, causing the CPU reset is generated upon power up by an RC network comprising of resistor 3 (46) and capacitor (47). Upon reset the CPU starts executing a routine that initializes the internal variables.

Box f1; Wait for the user status sampling time event: the user status sampling time events are drived from a pulse train on the S/P signal (19) from PU. The S/P signal is connected to port P4c of the CPU which is an external interrupt source of the CPU. Once interrupted the CPU would exit the wait loop.

Box f2; Start timer T: the CPU sets a timeout value, and starts the internal timer T.

Box f9; Wait for timer T timeout event: the timer T timeout event is an internal interrupt source of the CPU. Upon occurrence of the timeout event the CPU would exit the box f9.

As mentioned earlier the timer T is employed to adjust the outputs to the PU to occur after a constant delay with respect to the discrete user status sampling times $t_i$'s. Another rational for its use is the following. The sampling times $t_i$'s, as noted above, are derived from the S/P signal (19) from PU. The control signal S/P is periodic. Over one period interval, this signal is mostly at a constant voltage level unless over a short span where it rapidly fluctuates to some other voltage level and returns to its original constant level one or more times. The number of the fluctuations is generally constant for each game but could differ from game to game. This number is usually one, but in some games it could be larger than one.

In the preferred embodiments presented here, the discrete user sampling times $t_i$'s are taken to be a time sequence where $t_i$ corresponds to the time of the voltage change in the i-th interval of the S/P control signal, if there is only one fluctuation in each interval. And $t_i$ corresponds to the time of the first voltage change in the i-th interval, if there are more than one fluctuations. An important job of the timer T is therefore to make certain enough time is elapsed from the time of the first voltage change—all voltage changes following the first in the current interval of the S/P control signal have occurred—before returning to the root. This way, when returned to the root, the next voltage change in the control signal will indeed be the fist voltage change in the next interval of the control signal, and hence would correspond to the next $t_i$. It should be pointed out that the discrete user sampling time sequence, used to clock interrupts to the CPU, does not have to correspond to the first voltage changes in the S/P intervals. It does not even have to be based on the S/P signal, since it can be generated inside the user controller, using a timer. In particular, when it is based on the S/P signal, the sampling time $t_i$ can be made to correspond to the first voltage change in the C-th interval of the S/P signal, where C is (c×i), for some integer constant c. This can simply be accomplished by changing the timer T timeout value. Since the S/P signals arrive much faster than user changes of the key settings, the slowing down effect of a small c will not be noticable at all.

Box f3; Update information on ASSV into IF, and MSSV into IS: the user auxiliary switches fsw1 and fsw2, and the mode select switch ps, are connected to ports P4a, and P4b respectively. These ports are part of the CPU general purpose input/output port P4. The CPU accesses these ports through read general purpose input/output port operation, and updates IF and IS through a data transfer operation.

Box f4; Update information on UPSV into IP: the major step of this operation is the CPU read of user play switch status. The CPU update of IP is then performed through a data transfer operation. The CPU read of user play switch status is discussed below. In this present preferred embodiment, in order to easily accommodate additional function keys on the general purpose input-/output P3 and P4 ports, the play key switches sw1, sw2, ..., and sw8 are connected to a tri-state buffer (8) driving the P1 port of the CPU, which can be accessed by the CPU through external data memory read. The CPU external data memory read of address space is decoded by the tri-state buffer enable generator (9), which performs a logical AND operation on RD and P2h signals of the CPU, and when the address is in the space $8000_H$-$FFFF_H$ (the subscript H denotes a number in base 16), the data tri-state buffer is enabled to put the user play switch status onto the P1 port of the CPU, which is then read into the ACC.

The assignment of the address space $8000_H$-$FFFF_H$ simplifies the necessary decoding of the said address space significantly, where only the state of the most significant bit of the high address; P2h port of CPU, suffices for the decoding of the said address space. Nevertheless, such redundant assignments could unnecessarily reduce the address space for data memory, since in general only a single external memory address is sufficient for the said read operation. But this would require the decoding of all address lines. However, since the present embodiment is not using the upper 32K external address space for data memory, in order to simplify the decoding hardware, the CPU read of the external address space $8000_H$-$FFFF_H$ is reserved for the said read of user play switches.

Box f10; Output OUT to PU: the CPU transfers the contents of the internal register OUT to the output holding register (5), the following describes the said transfer operation.

Again in order to keep the general purpose P3 and P4 ports available for additional function keys, the output holding register is connected to port P1 via the address/data bus (20), which can be accessed by the CPU through external data memory write.

The CPU external data memory write is decoded by the output latch clock generator (7), which performs a logical AND operation on WR and P2h signals of the CPU, and when the address is in the space $8000_H$-$FFFF_H$ writes the data on P1 port into the output holding register.

As mentioned above the address space $8000_H$-$FFFF_H$ is not being used for data memory, and the CPU read of the said space is reserved for reading user play switch status. Therefore the above is an efficient use of the same address space for CPU write to the output holding register, which introduces no further restriction on remaining address space for the data memory.

Boxes f24, f25, f29, f37, f41, f43, f52: the major step of these boxes is the CPU access of the external registers, which is either preceded or followed by a CPU update of appropriate internal registers. The following explains how the hardware implements the CPU access of external registers.

The data memory can reside anywhere in the external address space 0-32K. In the first embodiment, the size of the data memory is 2k, and the data memory registers dm(j) (for $0<=j<=2047$) are mapped to the external address sub-space of 0-2K, according to following address function AF.

$$AF[dm(j)] = BIN(j)$$

where BIN(j) is the 16-bit binary representation of the decimal j, and $$AF[dm(j)] = (AF15, AF14, \ldots, AF1, AF0).$$

For the present embodiment that employs a 2K data memory, the most significant five bits of AF[dm(j)]; AF15, AF14, AF13, AF12, AF11, are zero.

The hardware organization for CPU access of data memory will be presented next.

Given a dm(j) (for $0<=j<=2047$) the CPU would form DPTRH=(AF15, AF14, AF9, AF8), and DPTRL=(AF7, AF6, ..., AF1, AF0), where (AF15, AF14, AF1, AF0)=AF[dm(j)]. It should be evident from the discussions that during a CPU external data memory read and write operations, to an address AF[dm(j)], the address high bus (21) and address low bus (22) will assume the values of (AF15, ..., AF8), and (AF7, ..., AF0) respectively. According to FIG. 1, the A1 port of the data memory is connected to the address low bus and the A2 port of the data memory is connected to the lower three bits of the high address bus, therefore the A1 and A2 ports of the data memory will assume the value (AF10, ..., AF0) (which is the binary representation of j.) Further the P2h port of CPU is inverted by inverting buffer1 (10) whose output is connected to CE port of the data memory. The OE and WE ports of data memory are connected to RD and WR ports of the CPU respectively.

With reference to data memory operation, during the CPU external data memory read of AF[dm(j)], the data memory will put dm(j) onto P1 port of CPU via Address/Data bus (20), when the P2h and RD ports of CPU are "0" and "1" respectively. And during the CPU external data memory write to AF[dm(j)], the P1 port of the CPU via the Address/Data bus (20) will be written to dm(j), when P2h and WR ports of CPU are "0" and "1".

Returning to the discussion of hardware implementation of the boxes f37, f41, and f43, of the flow charts, based on the mapping of the external variables to data memory, the CPU would compute the index j, and the AF[dm(j)], of the data memory register corresponding to the external variable, and then performs an external data memory read to address AF[dm(j)], followed by a transfer of ACC to an appropriate internal register. Similarly for hardware implementation of boxes f24, f25, f29, and f52 of the flow charts, the CPU performs an external data memory write to the desired external data memory address after transferring an appropriate internal register to ACC.

In the above operations, the data memory is activated if P2h is a "0", and therefore any CPU access to the $8000_H$-$FFFF_H$ address space will not cause any response from the data memory.

The hardware avoids any conflict in the CPU access of the external devices by using the state of P2h, RD, WR, PSEN ports of the CPU. The following summarizes the state of the said signals for various hardware operations:

data memory read: P2h="0", RD="1"
data memory write: P2h="0", WR="1"
read user play switch status: P2h="1", RD="1"
outputing OUT to PU: P2h="1", WR="1"
program memory read: PSEN="1"

Note that one and only one of the signals RD, WR, and PSEN can be activated at any time by CPU.

Boxes f5-f8, f11-f23, f26-f28, f30-f36, f38-f40, f42, f44-f51, f53, f55: these boxes are CPU arithmetic, logic, control transfer, and data transfer operations on internal variables.

Figure 9:
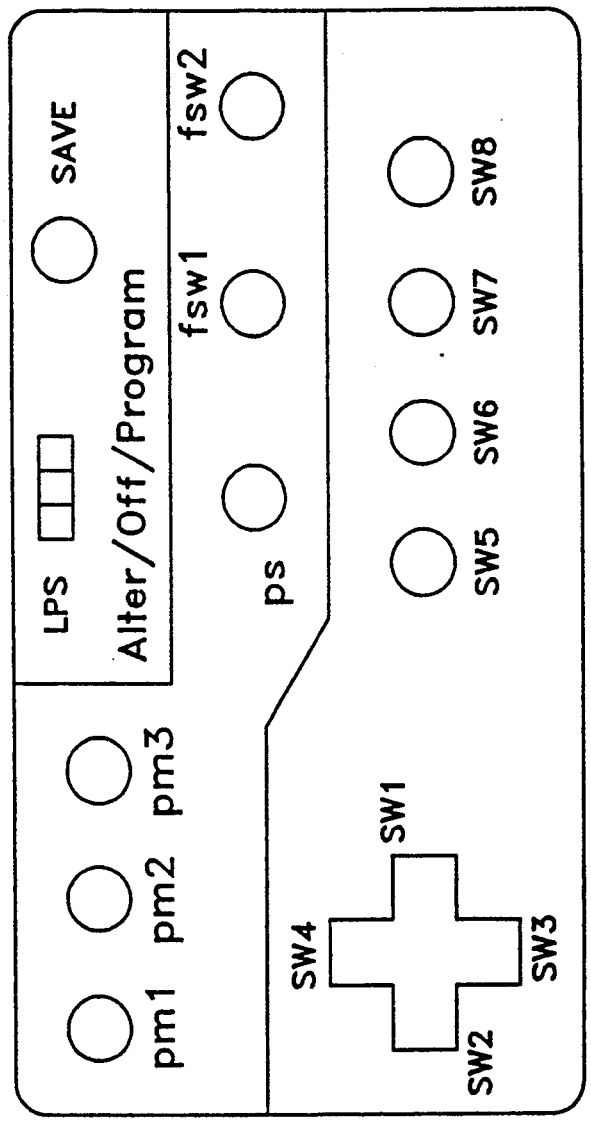
FIG. 9 is a pictorial top view of a user controller switches in the second embodiment of the invention.

Referring to the drawings and to FIG. 9, the second embodiment for RGC with five sets of switches is shown. As illustrated, in addition to the play switches, the auxiliary switches, and mode select switch, which are identical to the corresponding set of switches in the first embodiment, this second RGC has a fourth set of Program Modifying Switches pm1, pm2, and pm3, and a fifth set of Game Save switches which comprise of a three way switch LPS and a push button switch SAVE. The role of the program modifier switches are to allow user to assign modifiers to the selected programming lists. The RGC would then execute each lists based on the specifics of the modifiers which are assigned to it. Roughly, the modifier that is assigned to a list using the switch pm1, directs the RGC to execute the said list with a fast pace. The modifier that is assigned to a list using the switch pm2, directs the RGC to execute the said list over and over in a cyclic manner, for as long as the corresponding fsw is sustained by the user, and to interrupt the execution when the fsw is released. Finally, the modifier assigned to a list using the switch pm3, tells the RGC, during execution of the said list, to merge each request of the list with the current user key setting, prior to sending each to the processing unit interface. The role of the game save switches are to let the user to save relatively long stretches of the game. These switches differ from the auxiliary switches in the sense that while storing a game under the game save the user can execute and program the auxiliary switches. Another major distinction is that a stored game under the game save can be extended and/or revised, using the LPS switch. This switch has three settings ALTER-/OFF/PROGRAM. The user starts to save his/her sequences by setting the LPS switch on program. After this the RGC will store under game save all requests that it sends to the game processing unit, including requests which could come from execution of stored sequences under fsw. If LPS is set on off, or alter, the user can start execution of a stored sequence under the game save by pressing the save switch. If the LPS setting is on alter, the RGC will revise/extend the stored sequence according to current user settings starting from any execution interrupt of a sequence under save. These properties empower the user to keep a first portion of an already stored sequence under game save and extend it by overwriting a second portion of the sequence which might contain erroneous requests, without having to generate the first portion which could correspond to many minutes of playing time. On the other hand, if the stored sequence is good, the same procedure can be used to extend the sequence, to update the progress. These and other changes and additions describe bellow will significantly enlarge the RGC capabilities.

The operation of this RGC will be described with the help of the flow charts 7-14 of FIGS. 10-17.

Figure 10:
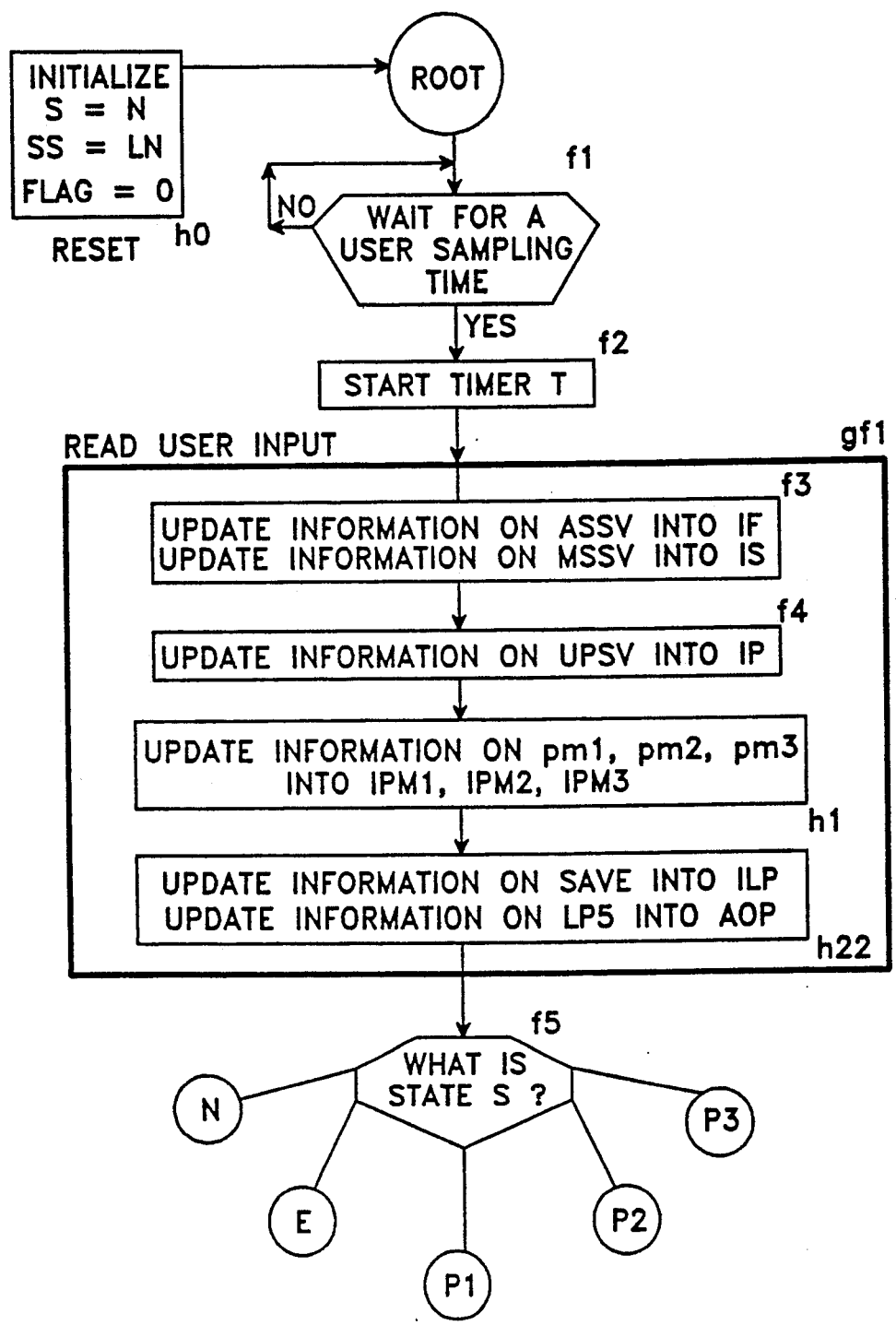
FIGS. 10-17 contain the flow charts 7-14 describing the operational steps of the user controller according to the second embodiment of the invention.
Figure 10A:
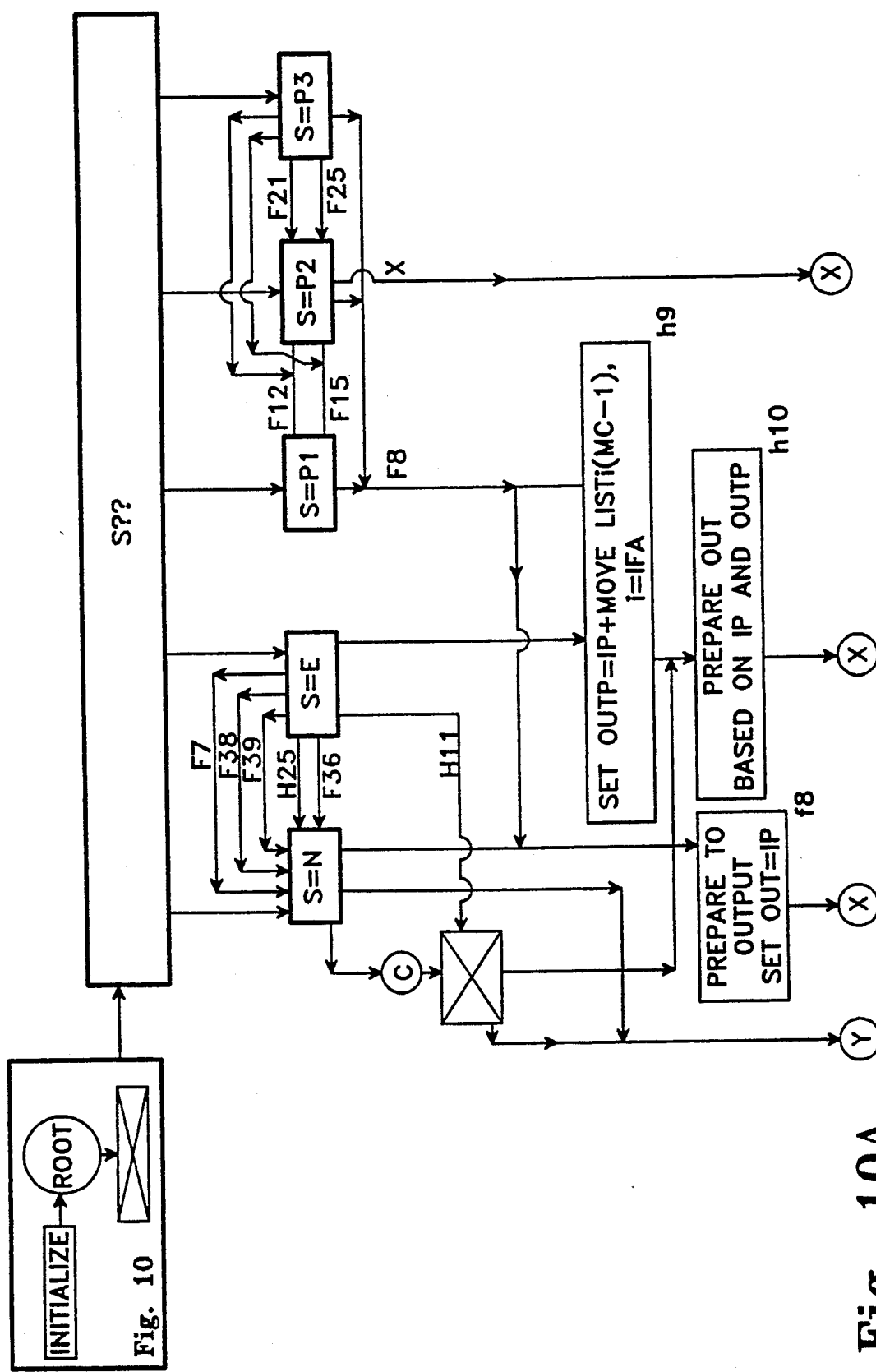
FIGS. 10A-10B contain high level flow charts of the operations of the user controller according to the second embodiment.
Figure 10B:
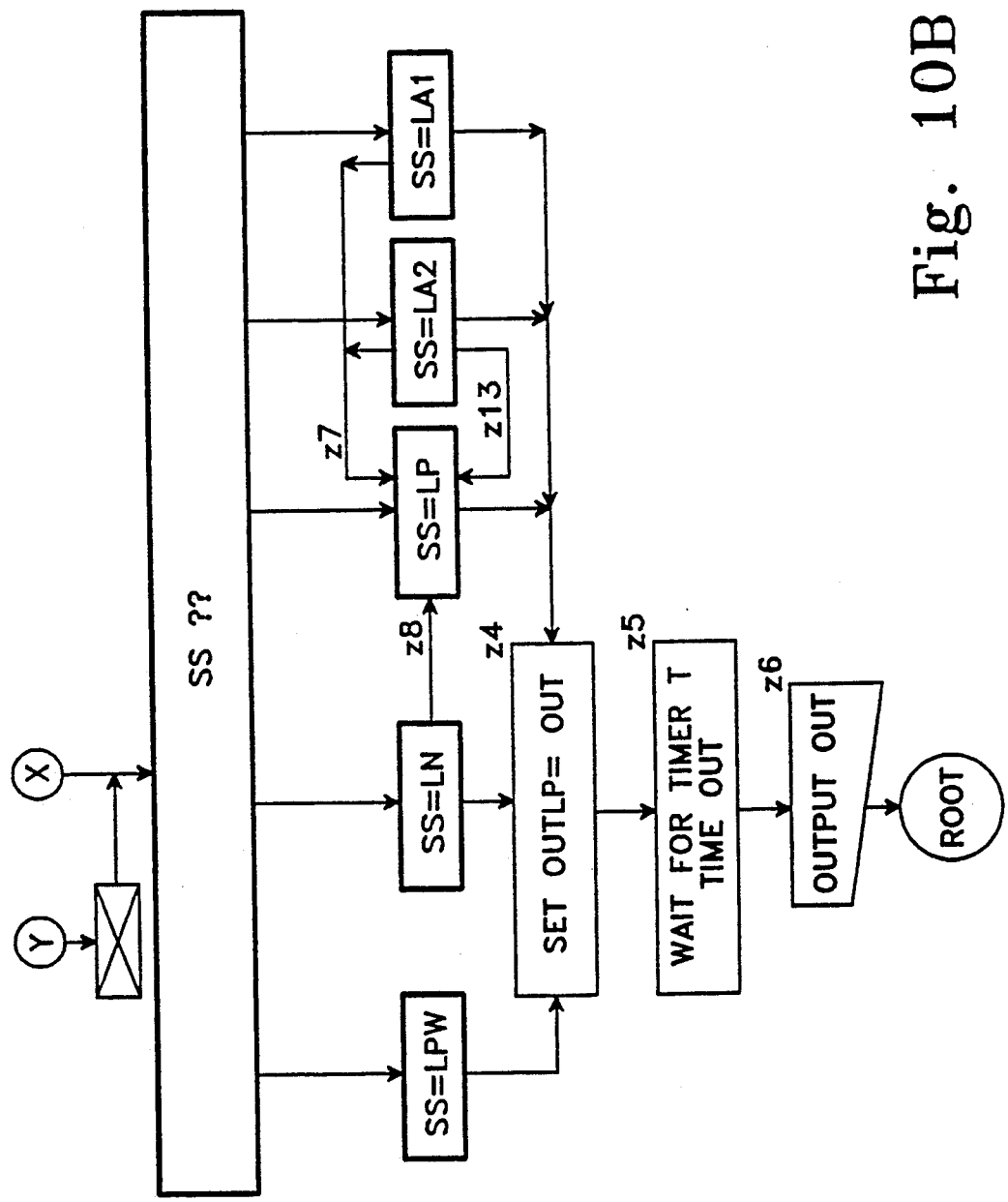
Figure 11:
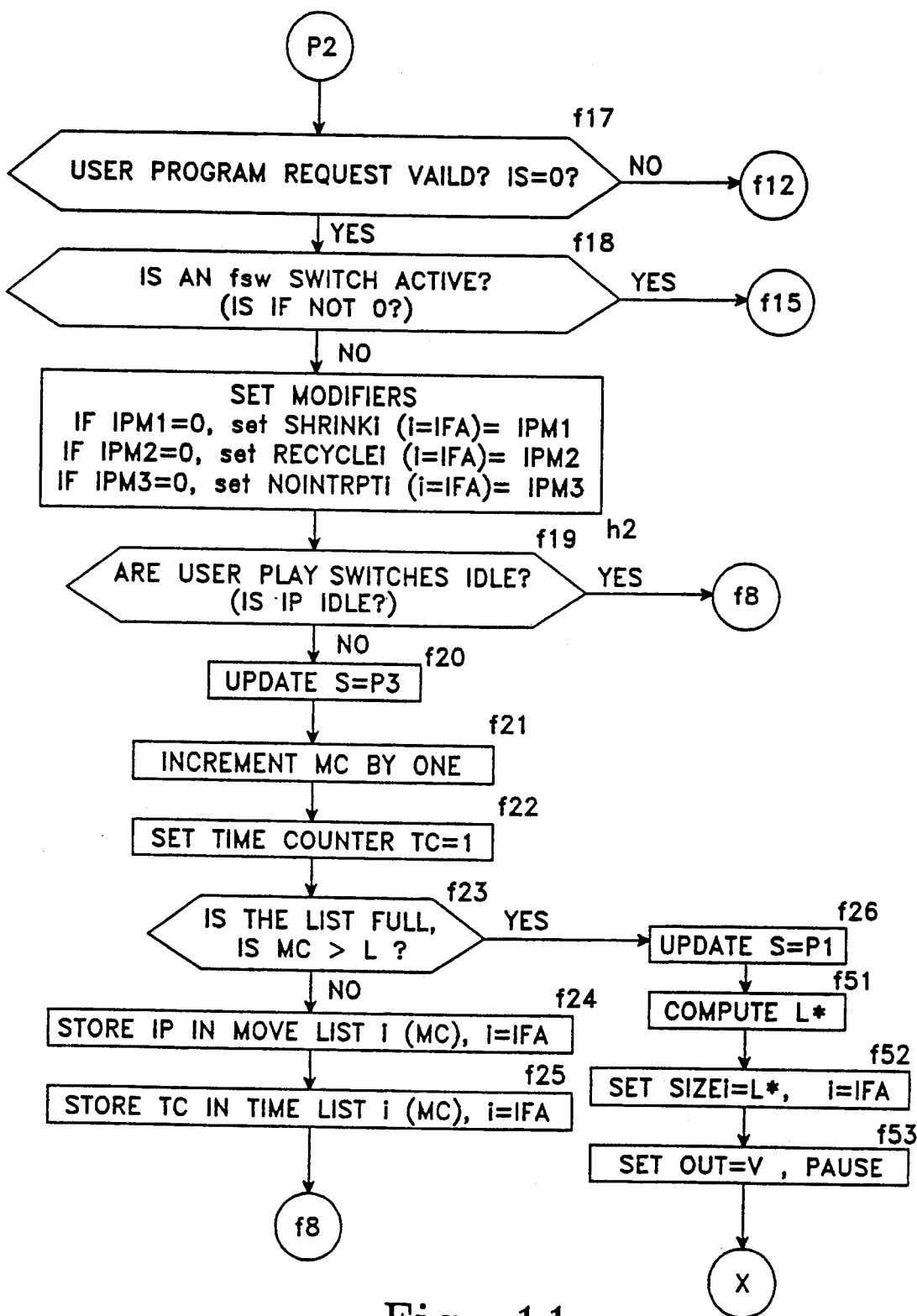

Before discussing these charts, we drive attention to the flow charts of FIGS. 10A and 10B. These charts show an over view of the more detailed flow charts of FIGS. 10-17 and of their interconnections. These charts are very helpful in keeping a high level image of the structure of the RGC operations if used in connection with the more detailed charts. The RGC tasks are broken into two major groups. A first group of tasks, FIG. 10A; referred to as the first stage operations and defined in detail by the flow charts 7-11 concern mostly to the play keys, the auxiliary switches, programming under the auxiliary switches, and the execution of stored lists. Whereas the second group of tasks, FIG. 10B; referred to as the second stage operations and defined in detail by the flow charts 12-14 pertain mostly to the save game feature, involving the LPS and save switches. The first stage operations are based on a variable S, which oversees the states N, P1, P2, P3, and E, as in the first embodiment, and the second stage operations are based on a variable SS overseeing states LN, LP, LA1, LA2, and LPW.

In what follow the reader is guided through the said charts, with the emphases being on the points where this RGC differs from the one in the first embodiment. For consistency with the charts, the save and program modifying switches should be non-toggle, and the LPS should be a three way on/on/on switch which could retain any of its settings.

Starting again at the root of the chart 7, FIG. 10, the first change is an addition of a box h1 in the box gf1. Here, the RGC updates its information on the program modifying switches pm1, pm2, and pm3, by respectively storing the states of the switches in the registers IPM1, IPM2, and IPM3. The next addition is box h22, where the RGC updates information on the save and LPS switches into ILP and AOP, according to the following maps ILP=0, if switch save is not active,
ILP=3, if switch save is active,
AOP=1, ("alter") if LPS is on alter,
AOP=2, ("off") if LPS is on off, and
AOP=3, ("program") if LPS is on program.

Under the program modes, P3 is the same as in the first embodiment, therefore its chart is not repeated here. The only change under P2 is placement of a box h2, after the box f18 in FIG. 11. As should be clear from the description of the first embodiment, reaching the box f19 reflects that the ps switch has been turned on and a fsw switch has been selected. Moreover, being in the mode P2, the RGC is waiting for a non-idle play button setting. And further more, the play button setting have so far been idle under this mode. It is exactly this point; after a fsw selection in the program modes, that the RGC accepts user requests on the modifying switches. Thus, to assign any of the modifiers to his/her selected lists, the user should exercise the program modifying switches now. To record the assignment of the modifiers, the RGC utilizes the following registers. For the move list1, registers SHRINK1 (shrink time), RECYCLE1, (repeat in cycle) and NOINTRPT1 (don't abort execution due to non-idle play key setting, instead merge the two requests) are used to store pm1, pm2, and pm3 assignments, respectively. And for the move list2, registers SHRINK2, RECYCLE2, and NOINTRPT2. Therefore the RGC task performed in the box h2 is to set shrinki(i=IFA)=IPM1, if IPM1=0, recyclei(i=IFA)=IPM2, if IPM2=0, and nointrpti(i=IFA)=IPM3, if IPM3=0.

Figure 13:
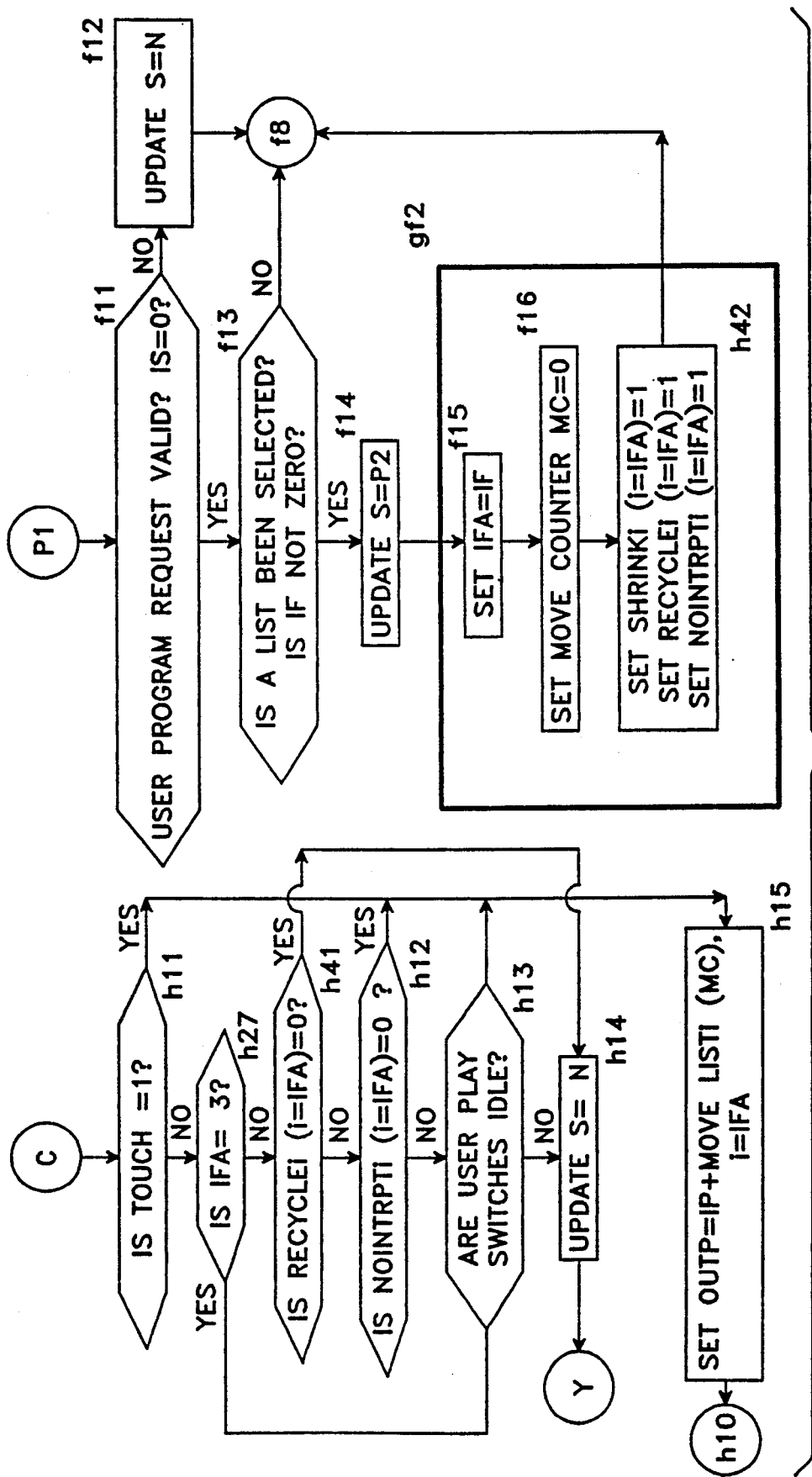

The only change under P1 is the addition of box h42 FIG. 13. In this box the variables shrinki, recyclei, and nointrpti, i=IFA are set to 1.

Figure 12:
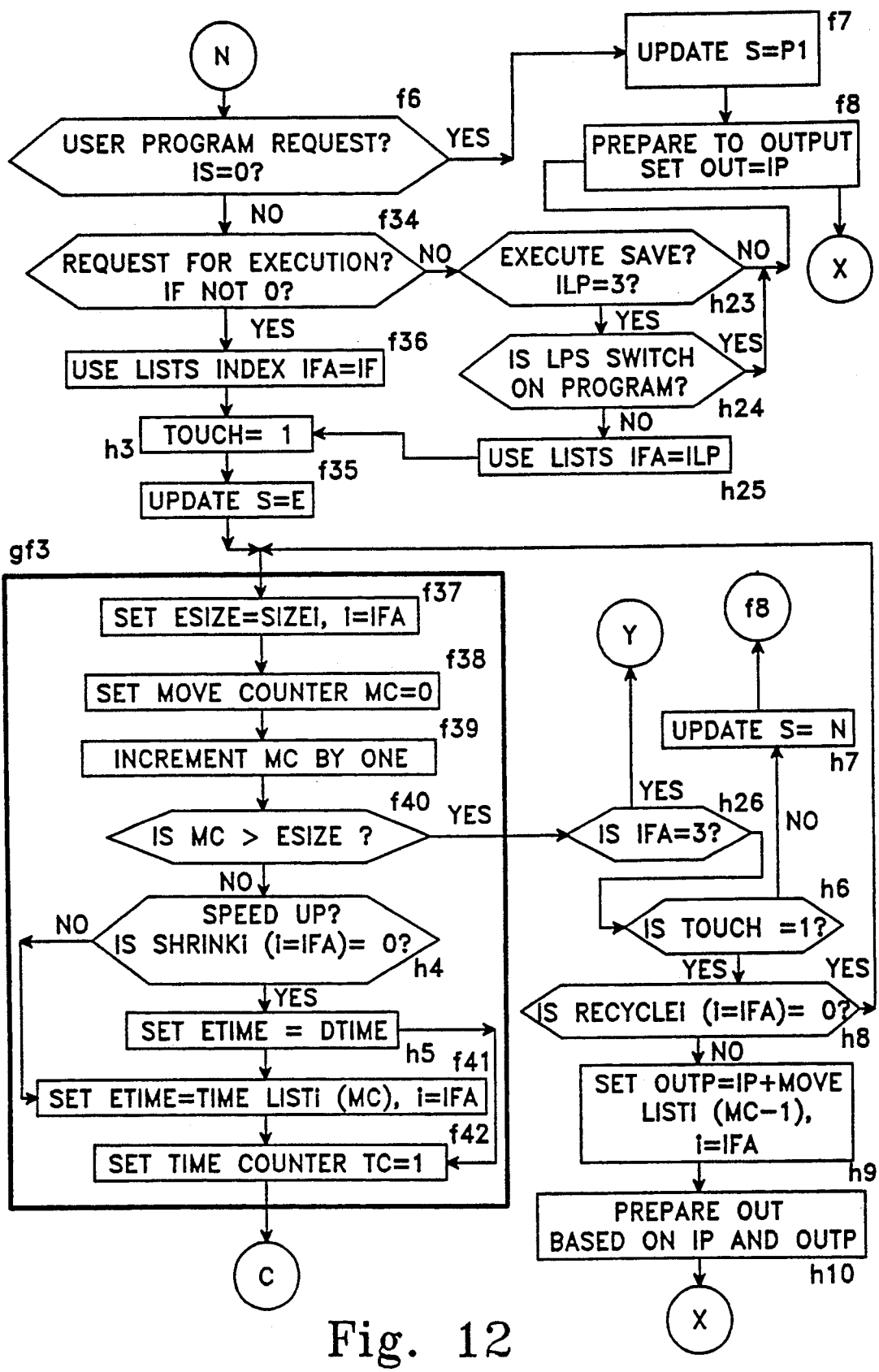

There are several changes under mode N. The first change is the addition of box h23 after the box f34, on the 37 NO" side. In reaching here, the RGC has checked if there is a request for execution of fsw's and has found no such requests (the box f34). In the box h23, the RGC tests if there is a request for execution of the move and time lists 3, which are stored under the save switch. These lists are programmed with the same format as the lists 1 and 2, and will be discussed in detail later. Specifically, the RGC examines if ILP is 3. If not; no execution request for lists 3, it goes to the box f8, followed by a jump to X. The jump points X and Y in FIG. 12 are entering points to the second stage of the RGC operation. The second stage, as noted above, is an additional set of operations related to the game save feature. To complete the description of the first stage, it would suffices to note that, although, the move and time lists 3 have the same basic structure as the other lists, they are not appended by any of the program modifiers. Returning to the box h23, if ILP=3; an execution request for move list 3, the RGC moves to box h24 to check whether the LPS switch is on program or not. The test made here is "is AOP=3?". If it is; LPS is on program, the execution request is denied and the RGC goes to the box f8. But if it isn't, the request is accepted and the RGC advances to box h25 and sets IFA equal to ILP(=3). The variable IFA stores the index of the lists to be executed, as before.

The next change is the addition of box h3, FIG. 12. One way this embodiment differs from the first is that, during execution of a stored sequence; move lists 1, 2, or 3, the RGC can be forced to restart execution of the same sequence by pressing the fsw corresponding to list which is being executed, if the list is 1 or 2, or by pressing the save switch, if the list is 3. The function of the box h3 is to make this possible. A variable Touch is used to keep watch over the status of an execution requesting switch. In particular, as a request is accepted for execution, touch is set to one indicating that an execution requesting switch (fswi i=1,2 or save), has been pressed. The touch will stay one until the requesting switch is released. During which no new execution request will accepted by the RGC. The touch will be set back to zero again when the requesting switch is released. Once touch becomes zero, the RGC is ready to accept new requests for execution. If such a request comes from the user when RGC is still in the mode E, it will halt execution, and start executing the new requested sequence.

The next changes under mode N are boxes h4 and h5. In h4, the condition (is shrinki (i=IFA) zero) is tested. If the condition is false, the RGC moves to the box f41 to set the execution time for move listi(MC), i=IFA. Note that the RGC reaches a false value whenever IFA=3, since as mentioned above the lists 3 do not take the program modifiers. The explicit check on IFA to realize this has not been included in the chart. Nevertheless, if the condition is true, then the time list information is ignored and etime is set to Dtime, in the box h5. The variable dtime holds a predetermined small value, therefore, enabling the RGC to execute the move list with a faster speed. From the box h5 the RGC goes to the box f42.

In this embodiment the box f49 is omitted. When the RGC completes the move list ("yes" side of the box f40), it advances to box h26 instead and tests if IFA=3?. If true, the RGC having executed all the moves in the lists 3 jumps to Y, to start its second stage of operations. But if false, it proceeds to box h6. Here it examines whether touch is one. If it is zero it carries on to box h7 to update the mode S to N, then jumps to the box f8 having completed the execution. However, if touch is one, it moves to box h8. For a stored sequence to be executed in cycles, the user should hold the selected fsw button active. The RGC detects this situation using the box h8. In particular, the RGC tests whether recyclei, i=IFA,( IFA=1 or 2) is zero, in which case it jumps back to the box gf3 to repeat execution. But if recyclei, i=IFA, (IFA=1 or 2) is one it goes to box h9. Here OUTP is set equal to the logical AND of the IP and the move listi(MC-1), i=IFA. This make OUTP to represent a merged request of the move listi(MC-1), i=IFA, and the current user play setting. And hence enables the user to influence the output of the RGC while it is executing a sequence.

This is an improvement over the first embodiment. Another apparent improvement is that the RGC, after executing a move list 1 or 2 with recycle one, continues to output the last request of the sequence in the list for as long as the touch remains one, or equivalently, until the fsw switch is deactivated. This is a very useful function in connection with some of the special moves with a last move hold. From the box h9 the RGC moves to box h10. We pause here to make the following remarks about the vector OUTP.

Since OUTP is the logical AND of IP and move listi(j), for some j, and i=IFA, it could contain contradictory requests. For instance, referring to the illustration of FIG. 9, OUTP(1)=0 (corresponding to an active sw1) and OUTP(2)=0 (corresponding to an active sw2), would be considered as conflicting requests, since generally these are requests for screen movements in opposite directions. Similarly, OUTP(3)=0 and OUTP(4)=0, would also be conflicting. These conflicts which are brought about due to merging are resolved in the box h10. To be able to override the stored requests, conflicts are resolved in the user's (IP) favor.

Returning to the flow chart 9 and to the box h10, the RGC tests whether both OUTP(1) and OUTP(2) are zero. If they are, then the one that is not forced by the IP is set to one. Thus giving priority to the user (IP). Next, the RGC tests whether both OUTP(3) and OUTP(4) are zero. If they are, then again the one that is not forced by the user (IP) is set to one. The resulting vector is placed in OUT. After this the RGC jumps to X.

The last changes under N are the replacements of the boxes f50 and f43 by h11-15, h27, and h41; chart 10 of FIG. 13. This chart is a continuation of the mode N operation of the flow chart in FIG. 12. The connecting point of these charts is the jump point C.

Recall that reaching the box f50 implies that the RGC is preparing to output a request from a move list. In this embodiment, the RGC moves to the box h11 instead, FIG. 13. Similar to the box h6, this box demands a test on the touch. If touch is still one the RGC moves to the box h15. In this box OUTP is set equal to the logical AND of the IP and the move listi(MC), i=IFA. This make OUTP to represent a merged request of the move listi(MC), i=IFA, and the current user play setting. As mentioned earlier, this enables the user to influence the output of the RGC while it is executing a sequence. The RGC then jumps to the box h10. On the other hand, if touch is zero, then the RGC continues to the box h27. In this box, the RGC tests if IFA=3. Since the boxes h41 and h12 are tests on program modifiers, if IFA=3, the RGC by passes them, and moves to the box h13. Here the RGC tests the condition (is IP=11111111?, or is IP idle?). If true, the RGC jumps to the box h15. But if it is false, it interrupts the execution by first updating the mode to N (the box h14) and next jumping to Y. However, if IFA is not 3, the RGC proceeds from the box h27 to h41 to check if recyclei, i=IFA is one. If recyclei=0; repeat cycle, the RGC would terminate the execution; move to the box h14, since touch is zero here. On the other hand if recyclei=1, the RGC carries on to the box h12, and tests whether nintrpti, i=IFA, is zero. If nintrpti, i=IFA, is zero it jumps to the box h15.

A dimension added to the operation by the modifying switch pm3, should become apparent at this point. The user can have his/her play requests merged into the executing request without having to keep the fsw active, if he/she modifies the stored sequence such, using the pm3. A power that is taken away is that the play keys can no longer be used to interrupt the execution.

Nonetheless, if nointrpti, i=IFA, is one the RGC goes to the box h13.

Figure 14:
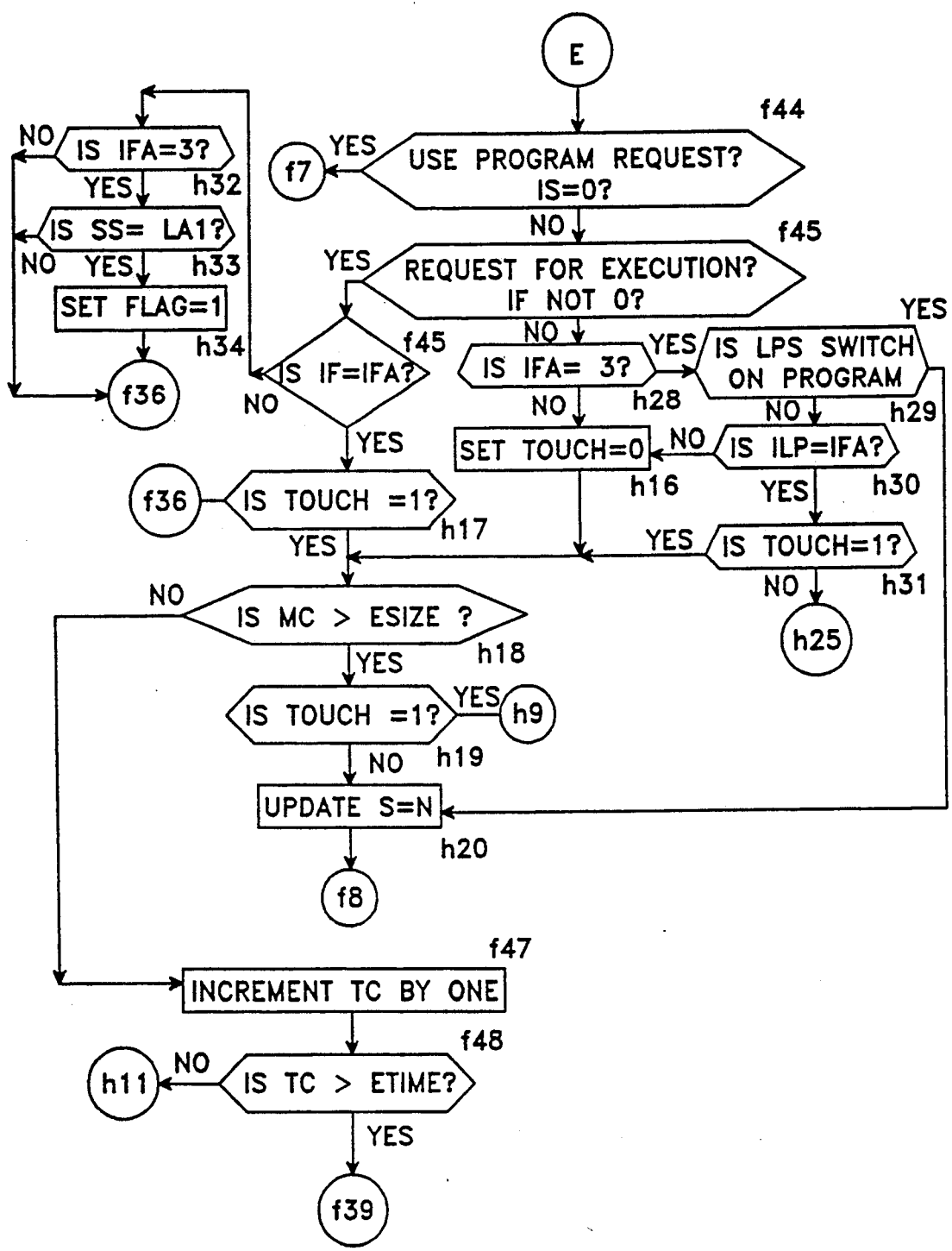

The remaining changes in the first stage are all under the mode E, FIG. 14. Box h28 is reached from the box f45 when IF=0; idle fsw1 and fsw2. In this box, the RGC inspects if IFA=3. If IFA is not 3, it updates touch to zero; the execution requesting switch (at this point either fsw1 or fsw2) is idle, box h16. However, if IFA=3, the RGC moves to box h29, and tests if AOP=3, or equivalently if the LPS switch is on program. If yes, it implies that the user has set the LPS to program, desiring to store in the save game, thus the RGC jumps to box h20; interrupting execution, and updates the S to N, and then jumps to the box f8. But if AOP is not 3, the RGC goes to box h30 and inspects if the save button is still active; ILP=IFA. If false, it goes to the box h16 to update touch. But if true, it proceeds to box h31 and checks if touch is 1. When touch is 0, the RGC jumps to the box h25, FIG. 12, to restart the execution of IFA=3. User actions leading to these are: pressing the save switch while LPS is not on program, releasing the save switch, pressing the save again. The later activation of the save switch while lists 3 are being executed is taken by the RGC as a request to restart execution. Nevertheless, if touch=1, the RGC carries on to box h18. This box is also reached from the box h16.

Another change which should be apparent from chart 11, is the way the "NO" side of the box f46 is extended. This point is reached when a current executing request (an active fsw1, or fsw2) does not match with the lists that are being executed (lists 1, 2, or 3). The RGC first inspects if the lists being executed are 3 or not; is IFA=3? box h32. If not, it jumps to the box f36 (FIG. 12) to service a new execution job. But if IFA=3, it checks if the operational mode of its second stage SS is LA1, box h33. If it is not, the RGC jumps to f36. But if SS=LA1, it sets a variable FLAG equal 1 box h34, before jumping to the box f36. The roles of the boxes h32, h33, and h34 will become clear later. For now, a point to remember is that the variable flag assumed a value one when an execution of the lists 3 was interrupted and the second stage mode was LA1.

The next addition, box h17, which comes after the box f46, is a test on touch similar to the boxes h11, h31, and h6. If touch is zero, execution is interrupted, and the RGC jumps to the box f36 to restart execution of the same sequence. But if touch is one, the RGC continues to box h18. This and boxes h19 and h20 provide the necessary conditions for a "last move hold". The box h18 is a last move test. It is identical to the box f40. If the last move of the move listi, i=IFA is not (already) executed, the RGC moves to the box f47. But if it the last move is already done, then the RGC goes on to the box h19. If touch is zero (box h19), the mode is updated to N (the box h20), and the RGC jumps to the box f20, ending execution. Else (if touch=1), the RGC jumps to the box h9 to repeat the execution of the last move.

This completes description of the flow charts 7-11 which cover the first stage operations; modes N, P1, P2, P3, and E of the RGC. What follows is a description of the flow charts 12-14 which deal with the second stage operation of the RGC.

Figure 15:
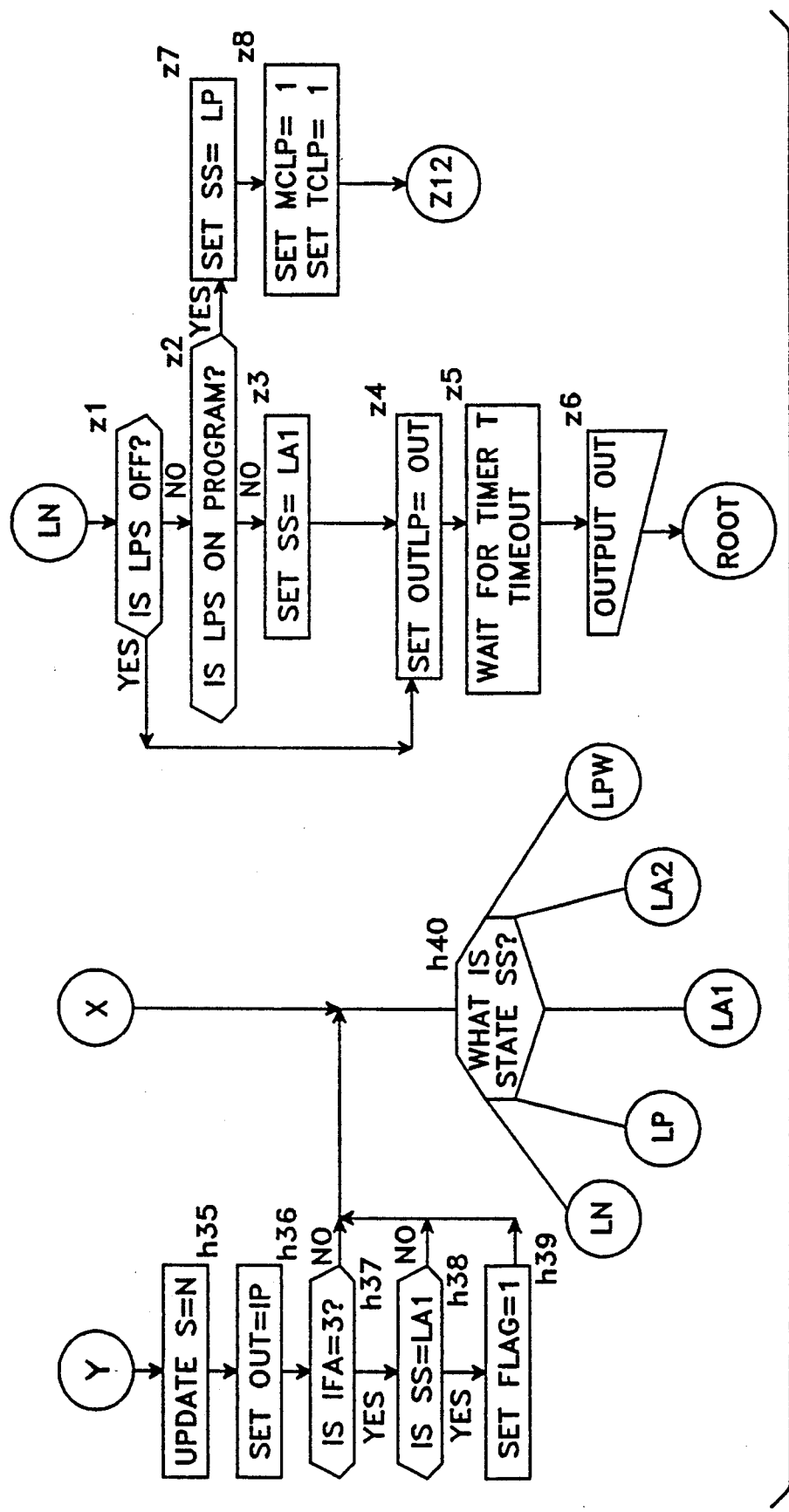

Referring to FIG. 15, the start of the second stage is box h40. This is where the mode or state of the second stage is tested. This mode as already mentioned comprises the five states LN, LP, LA1, LA2, and LPW. Briefly, the mode LN corresponds to an inactive save game situation; when the LPS switch is on off and there is no user request for execution of the lists 3. The mode LP corresponds to a programming condition; when the user puts the LPS switch to the program setting to save a play. The mode LA1 corresponds to an altering situation; the LPS switch has just been set on the alter. To grasp the role of this mode, let's look at the intended use of the alter setting of the LPS switch. Having programmed a sequence under the game save (lists 3), the user might find the stored sequence useful for only up to a certain point, and might desire to alter the sequence from that point on. To this end, he/she should set the LPS switch on the alter setting; indicating to the RGC of this situation. The mode that retains this status is LA1. Next, he/she should press the save switch. The RGC in response will start the execution of the lists 3 from the beginning. The user must allow the RGC to execute the sequence up to the point of interest, at which time he/she must interrupt the execution. There are two ways to make such an interrupt: pressing any of the play switches, and pressing fsw1 or fsw2. Being in mode LA1, the RGC interprets these interrupts correctly, it changes its mode from LA1 to LA2, and starts altering the lists 3 from the time of the interrupt according to current user inputs. Another similar case that the RGC is equipped to handle is when the user is happy with the existing lists 3, and only likes to extend them. The procedure is identical to the above except the RGC should be allowed to complete the execution of the lists 3. Being in LA1, the RGC would take the termination of the execution of the lists 3 as an interrupt, it would change its mode from LA1 to LA2 and start extending the lists 3. Finally, the mode LPW corresponds to end of programming due to full lists. When the RGC is in LP mode and runs out of storage space, it would indicate this to the user by freezing the game. And would move to the mode LPW, idling the second stage operations until the user changes the LPS switch setting from program.

There are two entry points to the second stage X and Y, FIG. 15. In box h35 the state S is updated to N. The RGC then sets OUT=IP, box h36, and tests if IFA is 3, box h37, before entering the stage two. If IFA=3, and SS=LA1 (box h38), the variable flag is set to one (box h39) to enable a transition to the discussed LA2 state.

In the state LN, an inspection is made on the status of the LPS switch (boxes z1 and z2). If LPS is on off, the RGC sets a variable OUTP equal OUT (box z4), and waits for a timer T interrupt (box z5), before outputing OUT to the game processing unit (box z6). If LPS is on program (box z2), the RGC updates the state SS to LP (box z7), initializes a move counter MCLP and a time counter TCLP, (box z8) prior to jumping to box z12, FIG. 16 (this will be discussed under the mode LP). Neverthless, if the LPS switch is on alter, the RGC updates the SS to LA1 (box z3) and enters the box z4.

Figure 16:
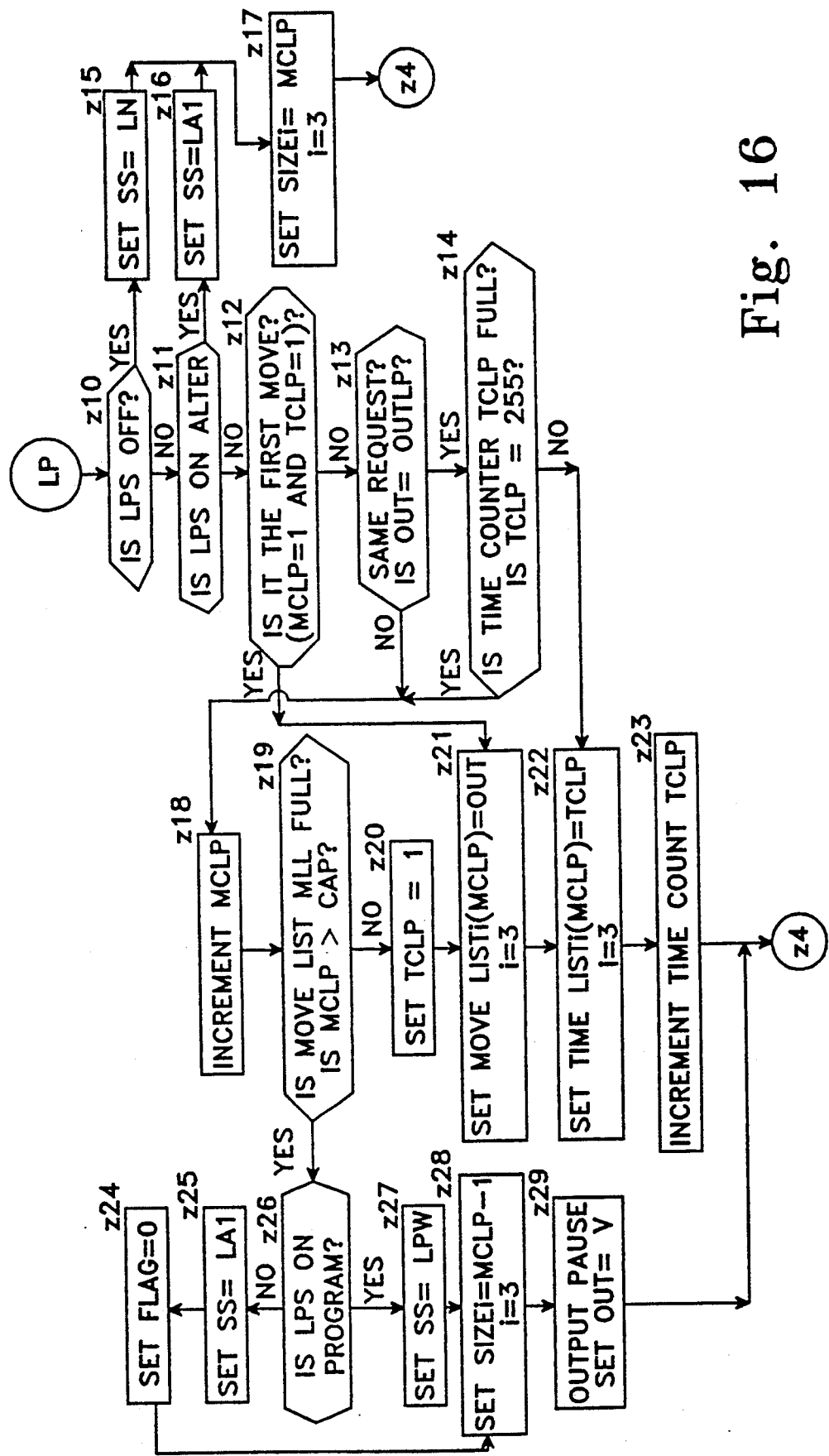

Under the state LP, FIG. 16, the RGC checks on the status of the LPS switch (boxes z10 and z11). If the LPS switch is on off, the state SS is updated to LN (box z15), and a variable SIZE3 is set equal to MCLP (box z17), followed by a jump to the box z4 of the chart 12. The variable size3, like size1 and size2, has the job of keeping the number of the registers that is used in a move list (in this case move list 3). If the LPS switch is on alter, the RGC updates the SS to LA1 (box z16), and moves to the box z17. However if the switch is still on program, the RGC proceeds to program into lists 3. It first examines whether MCLP=TCLP=1 (box z12). If so, it moves to box z21, and set the move list3(MCLP) equal to OUT. Then it writes TCLP into the time list3 (box z22), increments the TCLP (box z23), and jumps to the box Z4. But if MCLP is not 1, or TCLP is not one, the RGC tests if OUT=OUTLP (box z13). This check resembles the one made in the box f31 of FIG. 7; for the move lists 1 and 2. If OUT is not equal OUTLP, the RGC moves to box z18, increments MCLP by one, and enter box z19. Here, the RGC inspects if the move list3 is full or not. This is done by comparing MCLP to a variable CAP which holds the size of the move list3. If the list is not full, the RGC initializes the time count TCLP to one (box z20), and moves to the box z21. Returning to the box z13, if OUT is equal to OUTLP, the RGC tests if TCLP=255. If it is, the RGC goes to the box z18 again, but if it is not, it goes straight to the box z22.

During programming, however, if MCLP exceeds CAP (box z19), the RGC checks whether the LPS switch is on program or alter (box z26). If LPS is on program, the SS is updated to LPW (box z27). In this state, as we will see, the RGC will in effect idle the second stage operations until the LPS setting is changed. After the box z27, the RGC goes to box z28 and sets the size3 to MCLP-1, which should be equal to CAP at this point. Next, it sets OUT equal to V (the vector corresponding to the pause request), so that it could inform the user about the end of the programming. It then jumps to the box z4. Nevertheless, if the LPS switch is on alter (box z26), the RGC moves to box z25 and updates SS to LA1. This will be better understood after the description of the LA1 and LA2 states. What happens here is that the programming was actually going on as part of the alter feature (LA2 state) which also utilizes this part of the flow chart 13. Since the move list3 is full and the RGC is unable to continue programming into that list, it changes its second stage SS back to LA1 (the box z25). It then sets the flag back to zero (box z24) and advances to the box z28.

Figure 17:
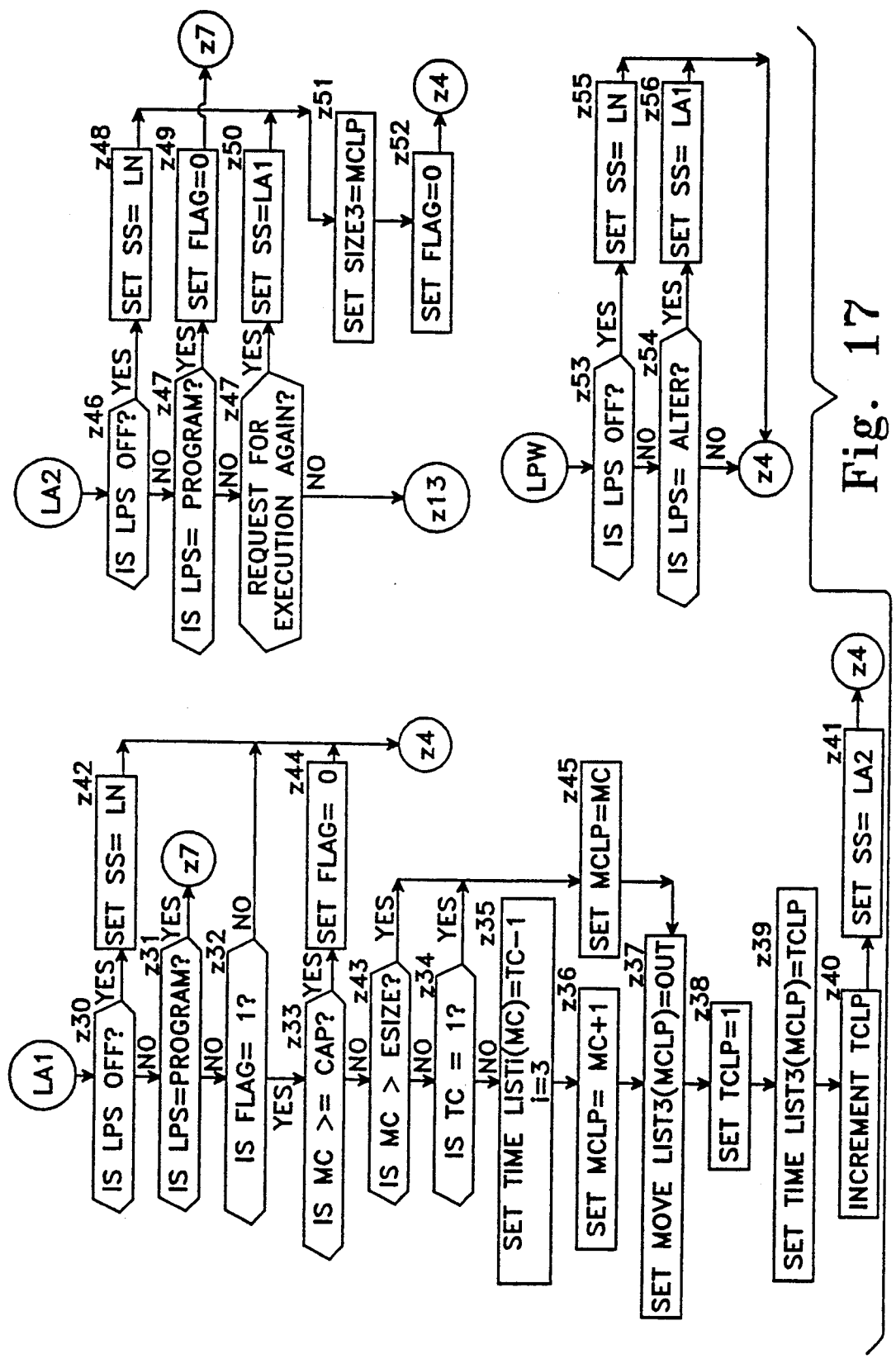

Referring to FIG. 17, the charts of the modes LA1, LA2, and LPW are shown. Under the mode LA1, the RGC checks the switch LPS setting (boxes z30 and z31). If LPS is on off, the variable SS is updated to LN (box z42), followed by a jump to the box z4. If the LPS is on program, the RGC jumps to the box z7 (FIG. 15) to update the SS to LP and continuous from there. However, if the LPS is still on alter, the RGC tests the value of the flag (box z32). If the flag is 0; the lists 3 have either not been executed yet, or their execution has not been interrupted, so the RGC keep the same second stage state; LA1, and jumps to the box z4. On the other hand if the flag is one; indication that the execution of the lists 3 have just been interrupted by the user, the RGC inspects where the interrupt has occurred. Since the lists 3 are executed under the mode E of the fist stage, the interrupt point information is contained in the variables MC and TC. The RGC first examines whether MC equals CAP; the size of the lists 3 (box z33). If it is, there is no room to extend the lists, therefore, the RGC sets the flag back to zero (box z44) and jumps to the box z4. But if MC is less that CAP, the RGC next investigates if MC is greater than esize (box z43). If it is not, then it checks if the TC is one or not (box z34). If TC=1, then the sequence in the lists 3 must be altered starting from the move list3(MC) and time list3(1). Hence, the counter MCLP is set equal to MC (box z45), and the RGC moves to box z37. In the case TC is not one, then the sequence in the lists 3 must be altered starting from the move list3(MC) and time list3(TC), TC>1. Which means the sequence in the lists 3 is good up to and including the move list3(MC) and time list3(TC-1). Therefore, the RGC, first sets the time list3(MC)=TC-1 (box z35), so that the request in the move list3(MC) will not repeat more than TC-1 times.

Then it sets MCLP equal to MC+1 (box z36). This will be the index of first request being augmented to the lists 3. Next, the RGC moves to the box z37. Here, it sets move list3(MCLP) equal to OUT. Following this, it initializes the TCLP to one (box z38), and sets the time list3(MCLP) equal to TCLP (box z39). The RGC then increments TCLP (box z40) and updates the SS to LA2 (box z41). Then it jumps to the box z4. Finally, if MC is larger than esize (box z43), the RGC goes to the box z45.

The modification of the lists 3 continue in the mode LA2. But first, the RGC inspects the LPS switch (boxes z46 and z47). If LPS is on off, the SS is updated to LN (box z48). However, before leaving the mode LA2, the RGC saves the new used length of the lists 3, under the variable size3. This variable is set equal to MCLP (box z51). The flag is set back to zero (box z52), prior to a jump to the box z4. If the LPS is on program, again the RGC terminates the lists 3 modification by setting the flag equal to zero (box z49), and jumping to the box z7 (FIG. 15). The next box is z47. The RGC checks in this box whether there is an execution request for the lists 3, by testing if ILP equals 3; corresponding to an active save switch. If ILP=3, the variable SS is updated to LA1 (box z50), and the RGC moves to the box z51. But if ILP is not 3, the RGC jumps to the box z13 of FIG. 16 to continue the changes in the lists 3.

The last state in the second stage is the LPW. The part this state plays in the operation is the following. When LPS is on program and the RGC runs out of space in the lists3, it updates SS to LPW. This has been noted in the discussion of the box z27 of FIG. 16. In LPW mode the RGC monitors the status of the LPS switch (boxes z53 and z54). It updates the SS to LN, when the LPS is set to off (box z55), updates the SS to LA1, when the LPS is set to alter, otherwise it keeps the same mode and jumps to the box z4.

To complete the description of the flow charts with respect to our second preferred embodiment, covering the operation of the RGC, we note that the variables S, SS, and FLAG are initializes upon a reset of the CPU in box h0 of FIG. 10.

Finally, as regard to the user, the following list of "how to's" explain the manner in which to operate the RGC. As before, each parenthesis gives the "next state S and/or SS" that is cases by the user action which precedes it.

How to program a sequence under the fsw1 and fsw2: the procedure is the same as in the first embodiment.

How to terminate programming under the selected fsw: the same as before.

How to attach a modifier to a sequence under a fsw switch: press the modifying switch of the choice after setting the ps switch to its on position and picking a fsw switch (S=P2).

How to execute a stored sequence under a fsw switch: just as before.

How to terminate execution of a selected fsw: this can be done by any of the following.

1) By pressing any of the play keys (S=N). Unless the modifier do not interrupt is affixed to the list;

2) By releasing the requesting fsw, if the modifier repeat cycle is attached to the list (S=N);

3) By setting the ps switch to its on setting (S=P1). This will force the RGC to abort the execution and move to its first program mode;

4) By pressing any of the auxiliary switches fsw1 or fsw2 (S=E). This will make the RGC to end execution and start the execution of the newly pressed fsw; and 5) Finally, an execution terminates, when all the requests in the selected sequence are executed (S=N).

How to program a sequence under the save button: set the LPS switch to its program setting (SS=LP).

How to execute a sequence under a fsw while programming under the save button: just press the desired fsw switch when the ps switch is off (S=E).

How to terminate programming under the save: change the LPS setting from program (SS=LN if LPS is set to Off, and SS=LA1 if LPS is set to Alter). The RGC also terminates programming under the save when it runs out of space in the lists 3 (SS=LPW).

How to execute a stored sequence under save switch: when the RGC is not executing any of the fsw lists, press the save button when the LPS switch is on alter or off setting (S=E).

How to alter a sequence that is under the save: put the LPS on alter (SS=LA1) and press the save switch (S=E). The RGC will start executing the sequence. When ready, start the change process by interrupting the execution through pressing any of the play or the auxiliary switches (SS=LA2). The RGC will start to update the sequence from the time of the interruption based on the later requests. Note that a press of the save switch does not constitute an interrupt for starting the change process, instead it will be interpreted as a request for re-starting the execution of the sequence under save. The motivation for this is that often a user execution request is not timed exactly with respect to the motions on the screen. This offset which has, in general, little consequence for relatively short sequences, could be very important in reproducing relatively long sequences, such as the ones which might be stored under the save game feature. The significance of these to the alter mode is that the lists 3 must not be altered due to a user offset error in the execution. And the user should be allowed to make such adjustments on the starting of the execution for the lists 3. Without this flexibility the user should wait for the RGC to execute the lists 3 in their entirely before making any adjustments to the starting time.

In addition to execution time offsets, there could be another obstacle to the exact reproduction of long sequences. Game processing units viewed as input/output systems can in general have internal states that might not be observable solely based on the control signals relayed to the user controller. If there is any such internal state dependency, the game processing unit could produce different results in response to a fixed sequence of user inputs depending on its internal states of the time. Although, the discrepancy between the different PU responses corresponding to a fixed input is in general negligible for short sequences of the user inputs, it could be devastating for long sequences. In these situations, to guarantee true reproduction of long sequences, one needs to make certain that at a time of start of an execution of a long sequence under the Save feature, the PU has the same internal state as it had at the time of start of the programming of the sequence. Fortunately there is a simple remedy to this problem. Program long sequences for save starting at a time of a PU power on, and accordingly execute them starting from a PU power on. Clearly since the PU is in some fixed initial state at the time of a power on, the long sequence will be reproduced exactly. (Note that if the RGC power is derived directly from the PU, one needs to use a non-volatile data memory unit in order for the above solution to work.) We remark that when designing a video game system, the problem of un-observable internal states can be avoided by employing an interface between the game processing unit and the user controller that also communicates internal state information.

How to terminate the alteration: put the LPS on off (SS=LN). If the LPS is set on program, this will also interrupt the alteration session, but it would also cause the RGC to start programming in the lists 3 from the beginning, discarding whatever that is under save previously. Another way the alteration process ends is when the RGC runs out of space under the lists3.

How to extend a sequence that is under the save: this is the same the alter process, except wait until the RGC finishes the execution of the lists 3 before entering new request.

How to terminate the process of extending: again this is identical to the procedure for altering the lists 3.

This now completes the description of the use and operation of the RGC. The following example is intended to illustrate some of the advantages of this RGC over existing user controllers in real game situations. A game chosen for this purpose is the very popular Duck Tales, which is designed for Nintando video game systems.

Example. (Combination move with last play buttons hold, including time dependent settings.) In the game Duck Tales, Uncle Scrooge, the main character of the game, could "Pogo-jump" over dangerous ground repelling certain enemies using his cane. Referring to the drawing of FIG. 9, to "Pogo-jump", one must press the sw3 button, press the sw8 button (this makes Uncle Scrooge to jump), and press the sw7 button before he lands. Uncle Scrooge's cane will appear and he will continue to "Pogo-jump" for as long as the sw7 button is pressed. As he is "Pogo-jumping" (sw7 is pressed), Uncle Scrooge can be made to move left or right using sw2 and sw1 buttons, respectively. This tricky move is obviously a combination move. And more specifically, it is a combination move with last buttons hold, since to sustain the move one needs to keep the buttons in the last setting of the requesting sequence, the sw7, pressed. Finally, the requesting sequence for this combination move contains a time dependent button settings. Specifically, if the sw7 button is pressed after Uncle scrooge lands, the cane will not appear and the "Pogo-jump" will not be realized.

Employing the RGC of the second embodiment, a player would once program this move under one of the fsw switches, for example fsw1, and would just press and hold the fsw1 each time the move is wanted.

What make the RGC to suitably handle such complicated moves are that, first, during programming, the RGC does not record the idle settings leading to the first non-idle setting, therefore, if fsw1 is pressed (for execution), the execution will start from the first non-idle move with no delays. Second, during execution, the RGC will reproduce the sequence up to the last non-idle setting of the programed sequence, $L^*$, and then will repeat the last non-idle setting for as long as fsw1 switch is pressed (clearly, a reason for finding $L^*$ is to do exactly the above task). Finally, the merge features of the RGC enable the user to move the character while he is "pogo-jumping."

Recalling, FIG. 18 depicts the hardware architecture of our preferred second embodiment. Again, the central component of the architecture is the CPU (1). This unit performs all the processing required in the RGC operation. The operations of the flow charts in FIGS. 10-17 are translated into a list of CPU (1) instructions. This firmware is stored in the external Programmable Read Only Memory; PROM (3).

Table 2 is a list of the variables employed in the flow charts of FIGS. 10-17. A partition of the said list into internal and external variables with respect to the CPU is discussed below.

The list of internal variables is: IF, IS, IP, S, OUT, LH, LL, IFA, MCH, MCL, TC, $L^*$, V, ESIZEH, ESIZEL, ETIME, IPM1, IPM2, IPM3, ILP, AOP, TOUCH, DTIME, OUTP, SS, FLAG, MCLPH, MCLPL, TCLP, OUPLP, CAP.

The list of external variables in the data memory is: SIZE1H, SIZE1L, SIZE2H, SIZE2L, SIZE3H, SIZE3L, SHRINK1, SHRINK2, RECYCLE1, RECYCLE2, NOITRPT1, NOINTRPT2 and the sets of ordered registers of MOVE LIST1, MOVE LIST2, MOVE LIST3, TIME LIST1, TIME LIST 2, and TIME LIST3.

These external variables correspond to the following registers of the data memory:

$SIZE1H = dm(0)$, $SIZE1L = dm(1)$, $SHRINK1 = dm(2)$, $RECYCLE1 = dm(3)$, $NOITRPT1 = dm(4)$,

MOVE LIST1(j) = $dm(2*j+4)$ for $0 < j < 248$,

TIME LIST1(j) = $dm(2*j+5)$ for $0 < j < 248$, $SIZE2H = dm(0+500)$, $SIZE2L = dm(1+500)$, $SHRINK2 = dm(2+500)$, $RECYCLE2 = dm(3+500)$, $NOITRPT2 = dm(4+500)$, MOVE LIST2(j) = $dm(2*j+4+500)$ for $0 < j < 248$, TIME LIST2(j) = $dm(2*j+5+500)$ for $0 < j < 248$, $SIZE3H = dm(0+1000)$, $SIZE3L = dm(1+1000)$, MOVE LIST2(j) = $dm(2*j+1000)$ for $0 < j < 500$, Hardware support of specific flow chart boxes of the second embodiment are:

The hardware support of the flow chart boxes with labels starting with "f" has already been described above for the first embodiment and is identical for the second embodiment.

The hardware support of the flow chart boxes with labels starting with "h" and "z" will be described below.

Box h1; Update information on user modifying switches pm1, pm2, and pm3 into IPM1, IPM2, and IPM3 respectively. The user modifying switches pm1, pm2 and pm3 are connected to ports P3a, of the CPU. This port is part of the CPU general purpose input/output port P3. The CPU accesses this port through read general purpose input/output port operation, and updates IPM1, IPM2, and IPM3 through a data transfer operation.

Box h22; Update information on Save switch into ILP and information on the LPS switch into AOP. The user Save switch, and LPS switch are connected to ports P3b, and P3c of the CPU respectively. These ports are part of the CPU general purpose input/output port P3. The CPU accesses these ports through read general purpose input/output port operation, and updates ILP and AOP through a data transfer operation.

Boxes h2, h4, h8, h9, h12, h41, h15, z17, z21, z22, z28, z35, z37, z39, z51; the operation of these boxes are CPU access of the external registers, residing in the data memory. In the second embodiment the data memory resides in the same address space as in the first embodiment, and the same address function AF is used to map dm(j) to an address in the external address space. Therefore the hardware support of these operations are identical to the support of boxes f24, f25, f29, f37, f41, f43, f52; which were detailed above.

Box z5; Wait for timer T timeout event: the timer T timeout event is an internal interrupt source of the CPU. Upon occurrence of the timeout event the CPU would exit the box z5.

Box z6; Output OUT to PU: the CPU transfers the contents of the internal register OUT to the output holding register (5), the said transfer operation has been discussed in detail in connection with the operation of box f10 of the first embodiment.

Remaining Boxes of the flow charts 10-17: these boxes are CPU arithmetic, logic, control transfer, and data transfer operations on internal variables.

Figure 20:
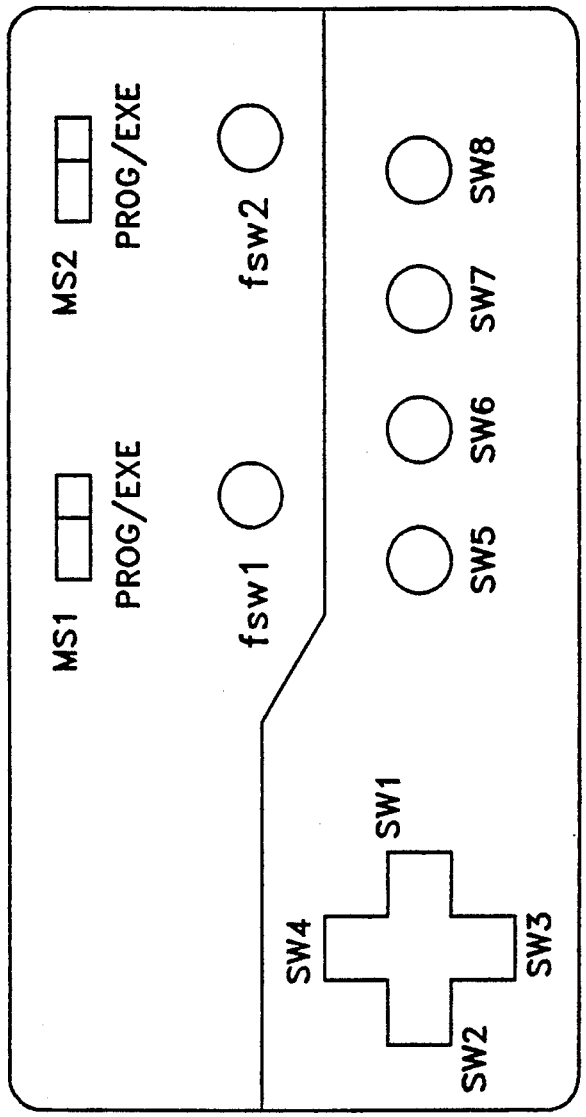
FIG. 20 is a pictorial top view of a user controller switches in the third embodiment of the invention.

Referring to the drawings and to FIG. 20, the third embodiment for RGC with three sets of switches is shown. As illustrated, in addition to the play switches, the auxiliary switches, which are common to the corresponding set of switches in the first and second embodiments, this third RGC has a third set of Mode select Switches MS1 and MS2. Each of these mode select switches have a program setting which is denoted as PROG, and each has an execution setting denoted by EXE. The mode select switches are assumed to be two way on/on type.

The gist of this embodiment is to provide a RGC with fully "nested" auxiliary switch set. From the user's point of view, this means having fsw's with independent modes, in the sense that each auxiliary switch can be in a program or in an execution mode, regardless of the mode of the other switch. This clearly generalizes the concepts behind our first and second embodiments.

Using this third RGC, a user can:
1) start to program a sequence under an fsw while already programming under the other one,
2) start to program a sequence under an fsw while executing the other one,
3) start to execute a sequence under an fsw while already executing the other one, and
4) start to execute a sequence under an fsw while programming under the other one.

In addition, in connection to all of the above, the user can manipulate requests which are either being stored and/or sent to the processing unit interface through the play buttons for all the times.

Note that in the second embodiment a user could program under the save feature while programming or executing the fsw's. However this relationship did not extend to the other direction. In other words we had a unidirectional "nesting" of the fsw's into the programming mode of the save feature. Neither there were any nesting of the executions. To have the readers attention focused on the nesting issues only, this embodiment does not incorporate some of the features which have already been handled in connection with our previous embodiments. For instance, the program modifying switches and the game save features of the second embodiment.

Diverting from our format, instead of beginning with the flow chart description, we start with the following list of "how to's" explain the manner in which to operate this third RGC.

How to program a sequence under a fsw: set its MS switch to the program setting. The RGC will start saving all the requests which it sends to the game processing unit under that fsw.

How to terminate programming under a fsw: set its MS switch to the execute setting.

How to execute a sequence under an fsw: press the fsw switch, when its MS is on execute.

How to program a sequence under an fsw while already programming the other one: the same as normal programming of the second fsw.

How to execute a sequence under an fsw while already executing the other one: the same as normal execution of the second fsw.

How to execute a sequence under an fsw and at the same time have it saved under the other fsw that is being programmed: the same as normal execution of the second fsw.

How to program a sequence under an fsw while the other fsw is being executed: the same as normal programming of the second fsw.

How to manipulate requests which are either being stored and/or sent to the processing unit interface: other than the freedom to execute any fsw having its switch MS on EXE, the user can exercise the play keys.

The operation of this RGC will be described with the help of the flow charts 15-19 of FIGS. 21-25. Again we drive attention to an over view flow chart, FIG. 21A. This chart shows a high level structure of the more detailed flow charts of FIGS. 21-25 and of their interconnections, and can be used as a map to follow the the more detailed charts.

Figure 21:
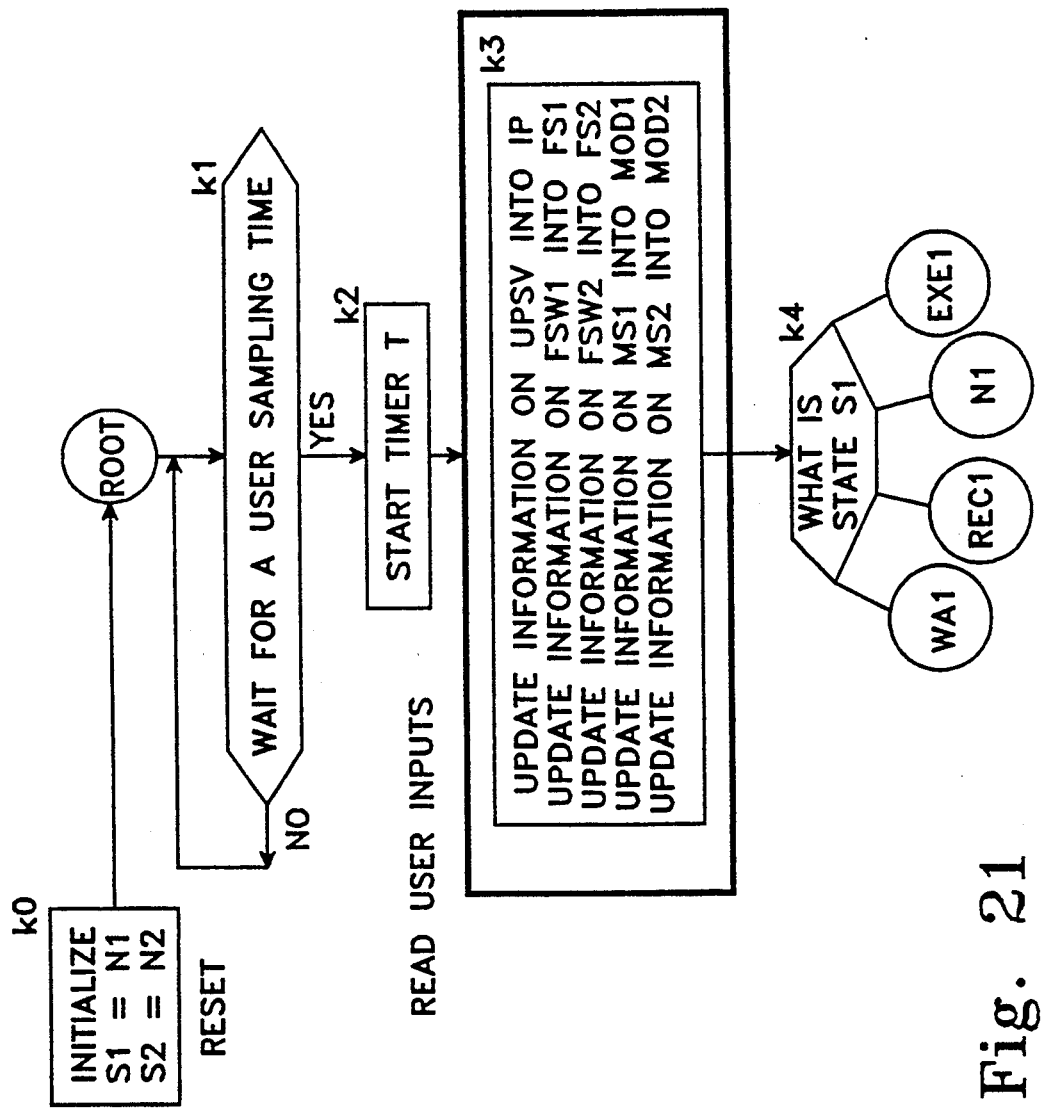
FIGS. 21-25 contain the flow charts 15-19 describing the operational steps of the user controller according to the third embodiment of the invention.
Figure 21A:
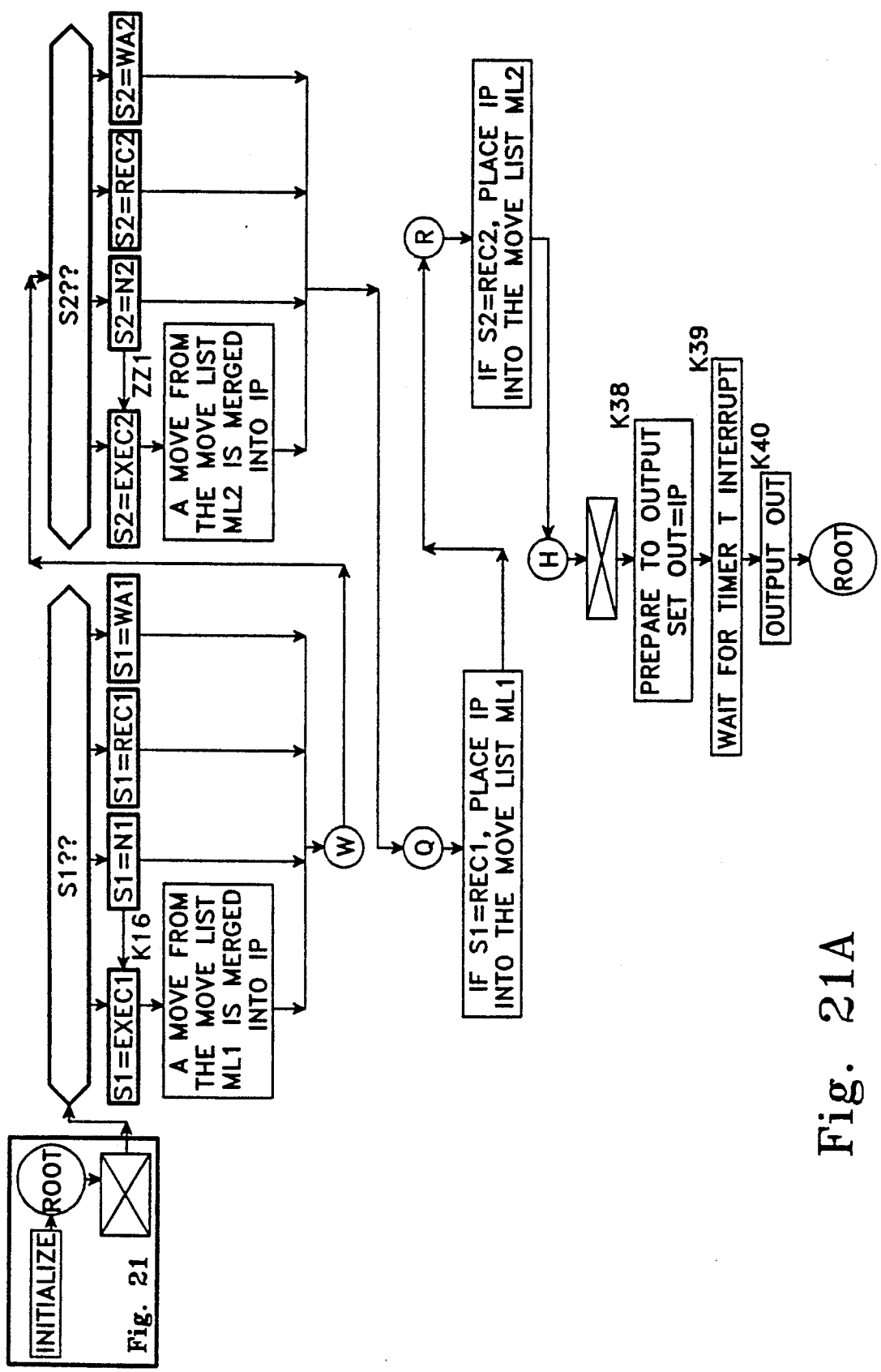
FIG. 21A contains a high level flow chart of the operations of the user controller according to the third embodiment.

Let's start at the Root of the chart 15, of FIG. 21. In box k1 the RGC awaits for a user status sampling time $t_i$. Upon receiving a $t_i$, the RGC starts a timer T as shown by box k2. Next the RGC updates information on all switch statuses (box k3). Specifically, it updates the information of UPSV (user play switch vector), fsw1, fsw2, MS1, and MS2, into the variables IP, FS1, FS2, MOD1, and MOD2, according to the following.

IP=UPSV,

FS1=0, if fsw1 is active,

=1, if fsw1 is not active,

FS2=0, if fsw2 is active,

=1, if fsw2 is not active,

MOD1=0, if MS1 is on PROG

= 1, if MS1 is on EXE

MOD2 = 0, if MS2 is on PROG

= 1, if MS2 is on EXE

Following these user input read steps, the tasks performed by RGC is based on its first state variable S1, which contains the mode information of the fsw1 with respect to the RGC operations. Since the operations of the switches fsw1 and fsw2 are independent, the RGC has a second state variable s2, which does a similar job for fsw2. Each Si (i=1,2) has 4 distinct modes; Ni, EXEi, RECi, and WAi, for i=1 or 2. The variable S1 is inspected in box k4.

Figure 22:
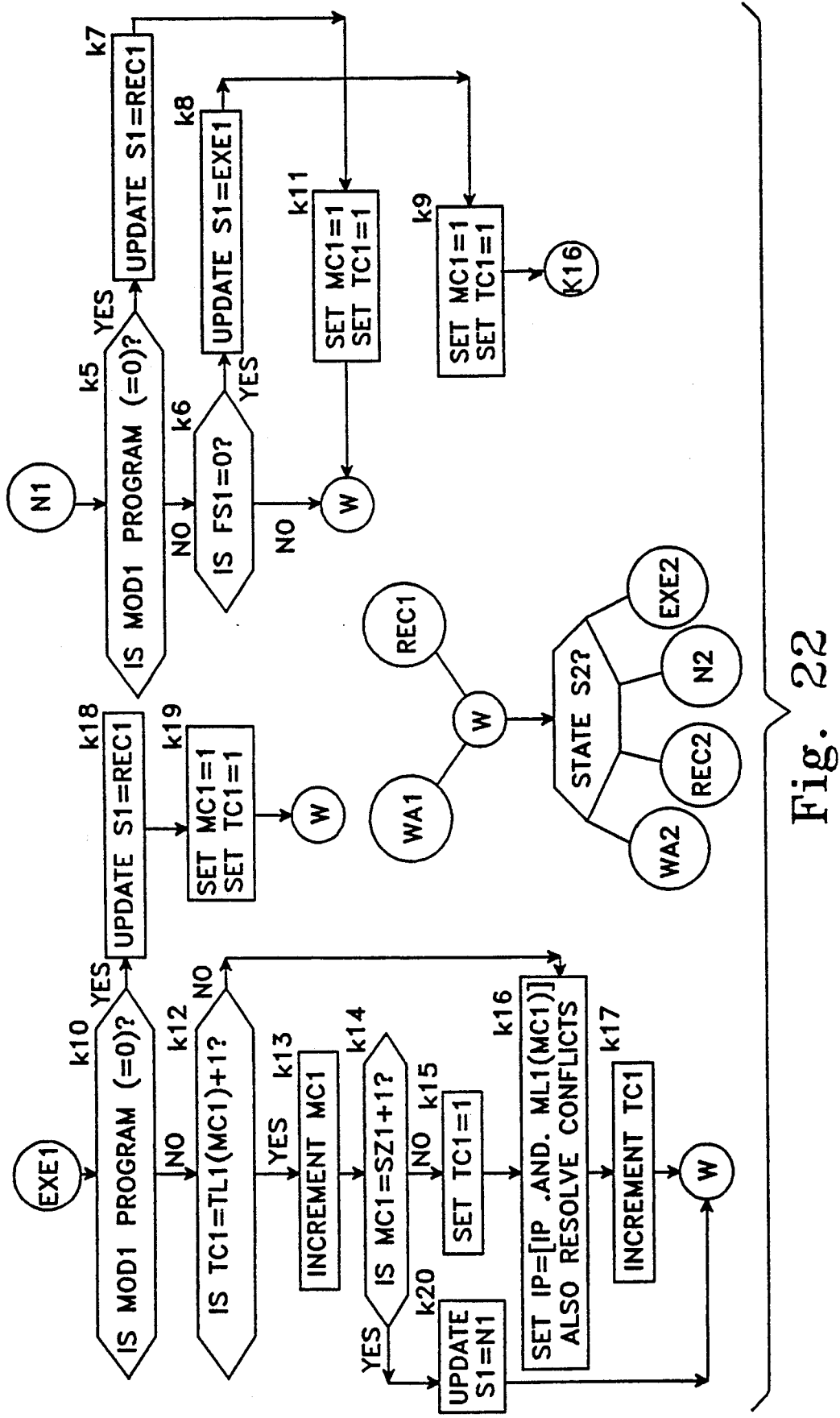

If the S1 is N1, the RGC tests the current setting of the MS1 switch (box k5, chart 16 of FIG. 22). If the switch is still on EXE, the RGC checks if the fsw1 is active (box k6). This is done by testing if FS1 equals zero or not. If fsw1 is not active the RGC jumps to W, but if fsw1 is active; FS1=0, the S1 is updated to EXE1 (box k8), a move count MC1 and a time count TC1 are initialized (box k9), and the RGC jumps to the box k16. However, if the MS1 switch is on PROG, the S1 is updated to REC1 (box k7), the time count TC1 and the move count MC1 are initialized (box k11), and jump point W is reached.

If the S1 is EXE1, the RGC examines the current setting of the MS1 switch (box k10, chart 16 of FIG. 22). If the switch is still on EXE, the RGC advances to box k12. Let's pause to note that, like in the previous embodiments, there is a move list and a time list associated with each of the fsw's. These lists are denoted here by ML1, TL1, ML2, and TL2. In the box k12 the RGC tests if the time count exceeds TL1(MC1)+1. In which case, it increments MC1 (box k13), and checks if the new MC1 exceeds SZ1 (box k14). The variables SZ1 is the size of the ML1, which is used to hold the stored sequence. If MC1 does not exceed SZ1, the RGC continues the execution. It first sets the time count TC1 equal 1 (box k15). Then it sets IP equal to the logical AND of IP and ML1(MC1) (box k16), and resolves any conflicts that might exist between IP and ML1(MC1), and as in the second embodiment the users is given priority (again the details of this process are omitted from the flow chart). The TC1 is incremented (box k17) prior to a jump to W. Under EXE1, if the MOD1 is 0; MS1 on PROG, the RGC updates the S1 to REC1 (box k18), prepares for programming by initializing the MC1 and TC1 (box k19), and jumps to W. Further, if the TC1 does not exceed TL1(MC1) (the box k12), the RGC jumps to the box k16. Lastly under this mode, if MC1 exceeds the SZ1, the RGC updates the S1 to N1 and jumps to W.

Figure 23:
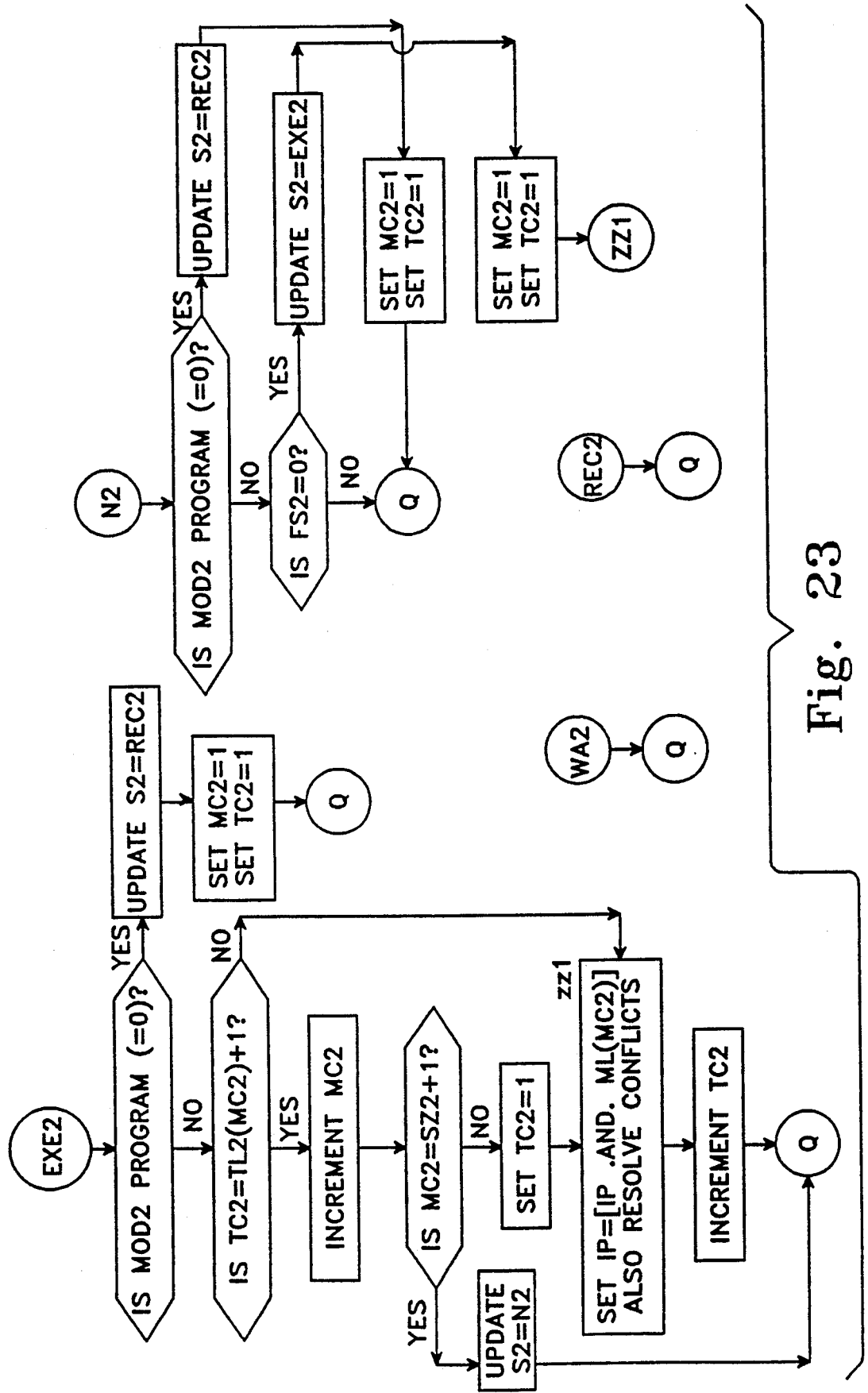

If S1 is REC1 or WA1 (FIG. 22), the RGC moves to W. The jump point W is a starting point for treating the fsw2 switch. The RGC treats fsw2 exactly in the same manner as it treats fsw1; by performing the tasks outlined by the flow chart 17 (FIG. 23). Since this flow chart is similar to the flow chart 16, we do not go into its detail description here. The only distinction that should be made (other than having an index 2 instead of 1 for the variables) is that the jump points W are here replaced by Q. Reaching Q, the RGC has a vector IP which is either:

UPSV, if no stored sequence is being executed, or
UPSV.AND.ML1(MC1), with any conflicts resolved in UPSV's favor, if only fsw1 is being execut( 'O ^ U (UPSV.AND.ML1(MC1).AND.ML2(MC2), with conflicts resolved, (the priority order is, UPSV, ML1(MC1), ML2(MC2)), if both fsw1 and fsw2 are being executed.

Figure 24:
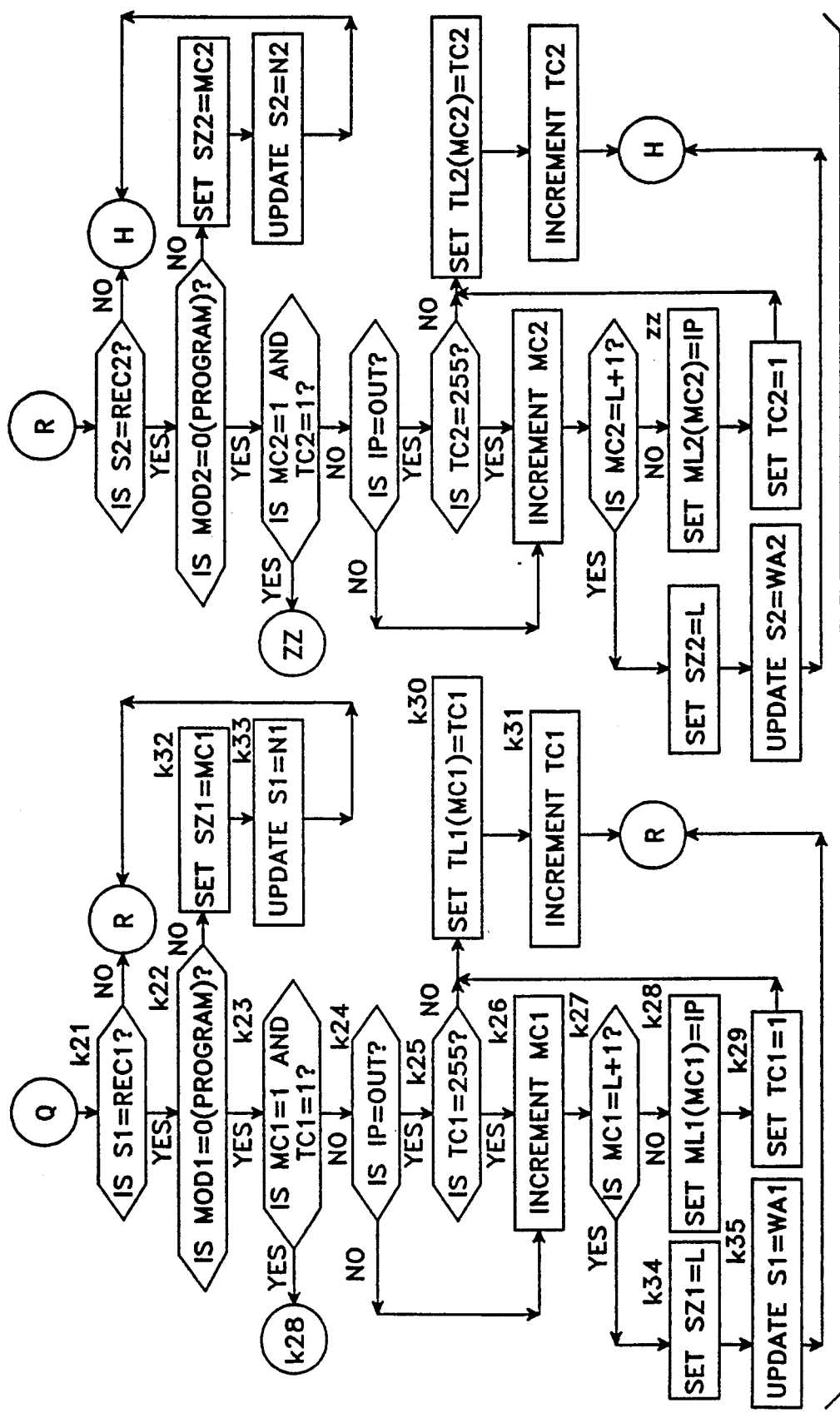
Figure 25:
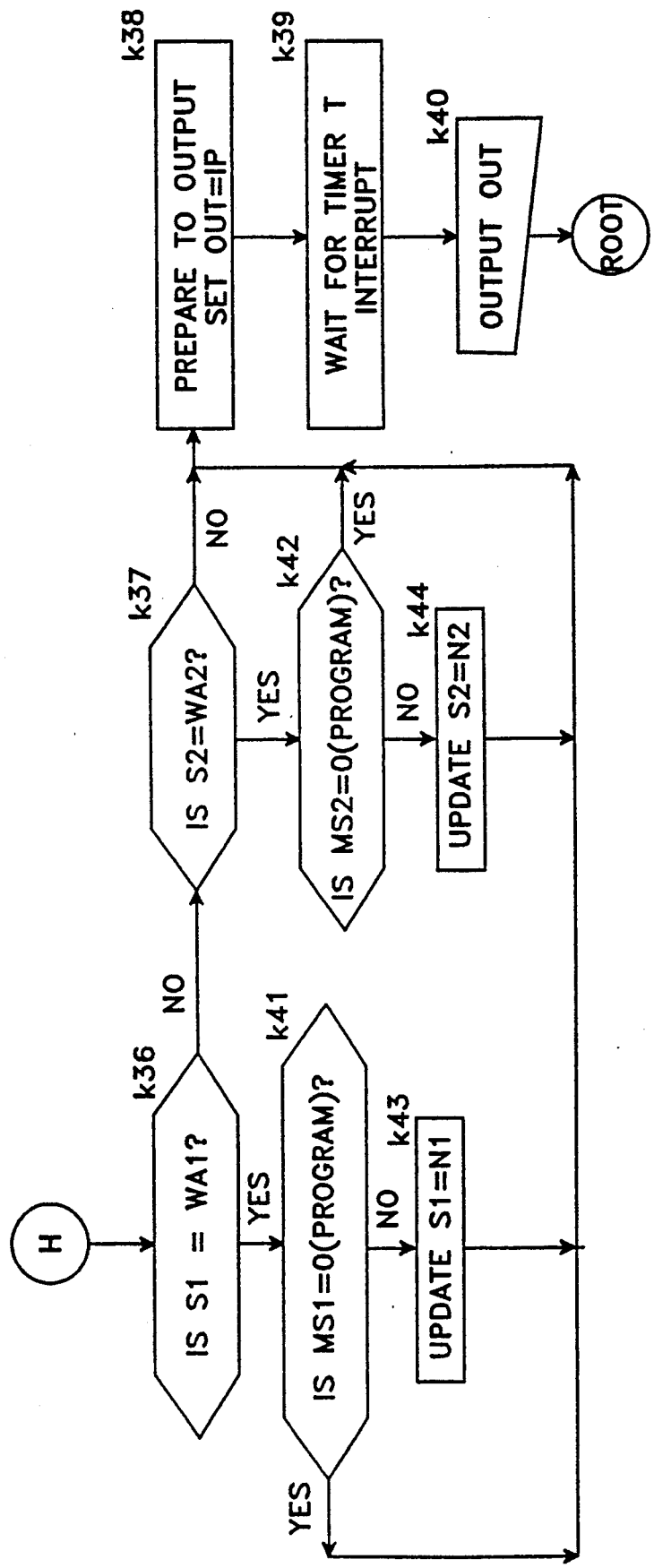

The RGC next carries on from Q (chart 18, FIG. 24). The job of the RGC is to store the obtained IP under any of the fsw switches which are under programming. To this end, it checks whether S1 is REC1 (box k21). If so, it tests if the MS1 is still on PROG (box k22). If MS1 is on PROG, it continues to program for fsw1. But first it examines if MC1=TC1=1 (box k23). If this condition is false, it tests if current IP is the same as previous IP (box k24). The previous IP, as will be seen later is kept in the variable OUT. Therefore, the test in the box k24 is whether IP equals OUT. If it is, the RGC inspects if TC1 has reached 255 (box k25). If TC1=255, the RGC increments MC1 (box k26), and checks if MC1 exceeds L (box k27). The variable L as in the previous embodiments denotes the size of the move and time lists, in this case the size of ML1, ML2, TL1, and TL2. If MC1 does not exceed L, the RGC sets ML1(MC1) equal IP (box k28), initializes TC1 (box k29), and sets TL1(MC1) equal TC1 (box k30). The RGC then increments TC1 (box k31), and jumps to R. Nevertheless, if S1 is not REC1 (box k21), the RGC jumps to R immediately. Further, if MS1 is not on PROG (box k22), the RGC terminates programming. But before leaving here, it records the size of the used portion of the ML1 by setting SZ1 equal MC1 (box k32), and changes S1 to N1 (box k33). Then it jumps to R. From the box k23, if the condition MC1=TC1=1 is true, the RGC jumps to the box k28. Later, if IP is not equal OUT (box k24), the RGC moves to the box k26. And if TC1 is not 255 (box k25), it goes to the box k30. Lastly, if MC1 exceeds L (box k28), the RGC sets SZ1 equals L (box k34), and changes S1 to WA1 before jumping to R. The state WA1 is utilized by the RGC to ignore fsw1 until its MS switch is set back to EXE by the user.

The jump point R, represents the starting point to handle programming under fsw2. What follows R in FIG. 24, is a replica of the tasks performed for fsw1 under Q. The only changes in the two parts are that first, the variable indices are 2 (for fsw2) instead of one, and second, the jump points R are replaced by H. Therefore we omit the description of this section, and continue from the jump point H in flow chart 19 of FIG. 25.

Under H, the RGC tests if S1 and S2 are in their WA states (boxes k37 and k37). If any one is in its WA state, the RGC updates its S variable to N if the MS switch corresponding to that fsw has been set to EXE (boxes k41, k42, k43, and k44). Otherwise, it moves to box k38 to prepare outputing to the game processing unit. The RGC sets OUT equal IP in the box k38, waits for a timer T interrupt in box k39, and outputs OUT to the game processing interface in box k40.

Finally, we note that the variables S1 and S2 are initialized to N1 and N2, respectively, upon a reset of the CPU in box k0 of FIG. 21.

This now completes the description of the use and operation of the third RGC.

As mentioned above FIG. 19 depicts the hardware architecture of our preferred third embodiment.

The list of internal variables is: IP, FS1, FS2, MOD1, MOD2, S1, S2, MC1, MC2, TC1, TC2, OUT, and L.

The list of external variables in the data memory is: SZ1, SZ2, and the sets of ordered registers of ML1, ML2, TL1, and TL2.

Hardware support of specific flow chart boxes of the third embodiment are:

The flow charts of the third embodiment, introduce no additional burden to the hardware. In other words, the boxes in these flow charts demand no new support from the hardware. As long as the same address space and address function AF is used, the complete operational support of the hardware for this embodiment should easily be deduce based on the given details for the previous embodiments.

The followings are some additional comments in the spirit of the present invention.

In regard to the data memory (4), which is utilized in the above embodiments, the content of this device becomes corrupted upon a power off. Therefore, the user need to re-program his/her sequences after each power on. One way to alleviate this problem is to use a non-volatile data memory unit, which has an internal battery to save its contents during power off. Another way is to back up the data memory with an external battery. To this end, there are several practical designs that one might wish to employ. For a simple and easy approach we refer the reader to the following article "Backup batteries", EDN journal, Oct. 30, 1986.

A user controller feature not discussed above is the so called "Rapid Fire". A rapid fire switch corresponding to a user play switch, can generate the effect one gets from repeatedly pressing and releasing of the said play switch. This feature is present in some of the controllers existing in the market. We would like to remark that the second embodiment above could easily accommodate such feature. One way to do this is to omit the boxes f51 and f55 (FIGS. 11 and 7, respectively), and just use L instead of L* in their following boxes. Then, interestingly, if a single request is stored under a fsw using all the program modifiers; pm1, pm2, and pm3, this stored request will be executed by the RGC as a "rapid fire"! Further, this would be an improvement over the existing feature, since one can program a "rapid fire" for any of the user key.

To increase the number of sequences that can be stored in the above embodiments, one can clearly increase the number of the auxiliary switches. Without increasing the size of the data memory, this would obviously reduce the length of the sequences that one can store. In addition, since typically there are only a few combination moves which might be stored per game, only a limited number of the auxiliary switches would be in use for each game. In view of this, a better way to increase the number of the sequences is to keep the number of the auxiliary switches the same, but add a single new switch that could define phases for the auxiliary switches. For each setting of the new switch use a section of the data memory reserved for that phase when storing a sequence for an auxiliary switch. Furthermore for each auxiliary switch, execute a sequence from a section of the data memory that corresponds to the current phase of the new switch. This approach seems advantageous since it cuts down the number of the auxiliary switches. Besides by allocating different phases of the auxiliary switches to different games a user can keep a better account of the stored sequences and their corresponding fsw's.

Yet possibly a better approach toward having more stored sequences is to have replacable non-volatile data memory units, so that each unit can be placed in the RGC and be programmed and used as in any of the described embodiments. Then, when programming for new games, one does not need to erase the old sequences. Instead, one can replace the data memory with a new unit, and save the old memory unit with its current content for later use in games for which it is programmed.

With these minor modifications—making the data memory replaceable and non-volotile—the RGC's could serve yet another purpose, not discussed so far. And that is for each game, pre-programed data memory units could be made avialable for the RGC's to act as a guide to the users for successfully playing that game.

Another point which deserves a mention is that when appling the present invention to video game systems with integrated game processing unit and user controllers, you can program a single central processing unit (CPU) to perform both functions of the game processing unit and a recording game controller according to the present invention. Specifically, the CPU must time share its services between the two functions. And, the time it allocates to the RGC functions must be spent on performing similar jobs as described in the flow charts of the three embodiments of this invention. FIG. 26 illustrates the invention when the PU and UC are integrated, note the figure does not explicitly show a single CPU implementation. Thus even though a CPU is described in all three embodiments for operating the user controller device, it will be understood that the function of the controller may be replaced by the logic gate and certain other components. For example, the controller device of this invention may be constructed with an input device, a storage device, and a logic device for providing information to the game processing unit information based on the stored data.

Throughout the discussions the game processing unit selected to illustrate the invention requires serialized data inputs. To apply the invention to processing units with different interface formats one needs to match the user controller output format to said different interface formats. For example if the PU requires a parallel data input, then the seriallizer in FIG. 1 (and in the other embodiments) can be eliminated and the output can be drived directly from the output holding register (5). Or if the PU requires a time multiplexed data line, then replace the serializer by a multiplexer. Lastly, the PU might require a mixed format (as in the case of Sega Genesis ®), such as a set of time multiplexed data lines and a set of parallel data lines, then a multiplexer should replace the serializer to time multiplex the said set of time multiplexed lines of the output, and the parallel lines can be directly drived from the output holding register (5).

Finally, we would like to comment that the specific switches, keys, and buttons used in the above embodiments have only served an illustrative purpose, and the spirit of this invention includes any kind of switching device for interfacing the user.

APPENDIX

Table 1: List of the Variables of the Flow Charts 1-6.
Note: Often in order to reduce terminology, the term register and register content is used interchangeably. And often a single parameter is used to refer to both a register and to its content, a common abuse of notation.

IF—Stores the current setting of the auxiliary switches fsw1 and fsw2, as in the flow charts.
  If fsw1 is active IF is set to 1,
  if fsw2 is active IF is set to 2,
  if neither is active IF is set to 0.
IS—Stores the current setting of the mode select switch ps.
  If ps is active IS is set to 0,
  If ps is not active IS is set to 1.
IP—Stores the current setting of the play switches, sw1, sw2, . . . , and sw8.
  IP=(Ip1,Ip2, . . . ,Ip8), where Ipi=0, if swi is active, otherwise, Ipi=1.
S—Stores the active operational mode of the RGC.
  S=N, in the normal mode,
  S=E, in the execution mode,
  S=P1, in the program mode 1,
  S=P2, in the program mode 2,
  S=P3, in the program mode 3.
OUT—Stores the request which is sent to the PU.
  MOVE LIST1—A list of ordered registers, used to store a sequence of key settings. This list is associated with the auxiliary switch fsw1.
  MOVE LIST2—A list of ordered registers, used to store a sequence of key settings. This list is associated with the auxiliary switch fsw2.
  TIME LIST1—A list of ordered registers, used to store the time spans of the key setting in the move list1.
The correspondence between the move list1 and the time list1 is one to one with respect to the ordering.
  TIME LIST2—A list of ordered registers, used to store the time spans of the key setting in the move list2.
The correspondence between the move list2 and the time list2 is one to one with respect to the ordering.
L—This 16 bit variable is the size of the above move and time lists. It is formed using two internal registers LH, and LL, i.e., L=(LH,LL).
L*—This 16 bit variable is used to temporarily hold the value that will be stored in size1, or size2. This variable is formed using two internal registers LH*, and LL*, i.e., L*=(LH*,LL*).
V—The pause requesting vector of the video game system.
IFA—Stores the index to the activated auxiliary switch.
  IFA=1, if a fsw1 request is accepted for execution, if IS=1, and for programming, if IS=0
  IFA=2, if a fsw2 request is accepted for execution, if IS=1, and for programming, if IS=0.
MC—A 16 bit pointer used in connection with the move and time lists. This pointer is formed using two internal registers MCH, and MCL, i.e., MC=(MCH,MCL).
TC—Time counter. When IS=0, it is used to count the time for each move stored. And when IS=1, it counts the number of times each stored move is outputted.
  SIZE1—The number of the registers used in the move list1, in the process of storing a sequence of key settings. The number SIZE1 is formed using two internal registers SIZE1H, and SIZE1L, i.e., SIZE1=(SIZE1H,SIZE1L).
  SIZE2—The number of the registers used in the move list2, in the process of storing a sequence of key settings.

The number SIZE2 is formed using two internal registers SIZE2H, and SIZE2L, i.e., SIZE2=(SIZE2H,SIZE2L).
  ESIZE—This 16 bit variable is used to keep a copy of size1, or size2 in the CPU during execution. This variable is formed using two internal registers ESIZEH, and ESIZEL, i.e., ESIZE=(ESIZEH,ESIZEL).
  ETIME—A local register used to hold single registers from the time list1 and time list2.

Table 2: List of the Variables of the Flow Charts 7-14.

The Variables, IF, IS, IP, S, OUT, MOVE LIST1, TIME LIST1, MOVE LIST2, TIME LIST2, L, L*, V, MC, TC, SIZE1, SIZE2, ESIZE, and ETIME are exactly as in the first embodiment. The following is a list of additional variables used in the second embodiment.
  IPM1—Stores the current setting of the program modifying switch pm1.
  If pm1 is active IPM1 is set to 0,
  If pm1 is not active IPM1 is set to 1.
  IPM2—Stores the current setting of the program modifying switch pm2.
  If pm2 is active IPM2 is set to 0,
  If pm2 is not active IPM2 is set to 1.
  IPM3—Stores the current setting of the program modifying switch pm3.
  If pm3 is active IPM3 is set to 0,
  If pm3 is not active IPM3 is set to 1.
  ILP—Stores the current setting of the Save switch.
  If Save is active ILP is set to 3, If Save is not active ILP is set to 0.
  AOP—Stores the current setting of the LPS switch. If LPS setting is Alter AOP is set to 1, If LPS setting is Off AOP is set to 2, If LPS setting is Program AOP is set to 3.
  SHRINK1—Stores the status of the modifier Shrink to the Move List1.
  SHRINK1=0, implies shrink the Move List1,
  SHRINK1=1, implies normal execution of the Move List1, with the Time List1.
  SHRINK2—Stores the status of the modifier Shrink to the Move List2.
  SHRINK2==0, implies shrink the Move List1,
  SHRINK2=1, implies normal execution of the Move List2, with the Time List2.
  RECYCLE1—Stores the status of the modifier Repeat Cycle to the Move List1.
  RECYCLE1=0, implies repeat the Move List1 in cyclic fashion, for as long as the requesting fsw is sustained, further it implies the execution of the Move List1 will be interrupted when the requesting fsw is released, RECYCLE1=1, implies normal execution of the Move List1.
  RECYCLE2—Stores the status of the modifier Repeat Cycle to the Move List2.
  RECYCLE2=0, implies repeat the Move List2 in cyclic fashion, for as long as the requesting fsw is sustained, further it implies the execution of the Move List2 will be interrupted when the requesting fsw is released, RECYCLE2=1, implies normal execution of the Move List2.
  NOINTRPT1—Stores the status of the modifier Do Not Interrupt And Merge With User Keys to the Move List1.
  NOINTRPT1=0, implies do not interrupt the execution of the Move List1 due to current non-idle user key settings, instead merge the stored request with the current user key settings prior to sending it to the processing unit interface, NOINTRPT1=1, implies normal execution of the Move List1.

NOINTRPT2—Stores the status of the modifier Do Not Interrupt And Merge With User Keys to the Move List2.

NOINTRPT2=0, implies do not interrupt the execution of the Move List1 due to current non-idle user key settings, instead merge the stored request with the current user key settings prior to sending it to the processing unit interface, NOINTRPT2=1 implies normal execution of the Move List2.

TOUCH—A variable used to monitor the status of an execution requesting switch (fsw1, fsw2, and save).

TOUCH=1, means the requesting fsw is in active state, and has been in that state since the time of the request, TOUCH=0, means the user has released the requesting switch.

DTIME—A variable used to keep a predetermined number that is used instead of time lists, for executing lists with SHRINK equal 0.

MOVE LIST3—A list of ordered registers, used to store a sequence of key settings. This list is associated with the save switch.

TIME LIST3—A list of ordered registers, used to store the time spans of the key setting in the move list3.

The correspondence between the move list3 and the time list3 is one to one with respect to the ordering.

OUTP—Stores the logical AND of a IP and a move listi(j), for i and j corresponding to a stored request subject to execution.

IFA—Stores the index to the activated auxiliary switch.

IFA=1, if a fsw1 request is accepted for execution, if IS=1 and for programming, if IS=0.

IFA=2, if a fsw2 request is accepted for execution, if IS=1, and for programming, if IS=0, IFA=3, if a save switch request is accepted for execution.

SS—Stores the second stage operational modes of the RGC.

SS=LN, in the normal mode, SS=LPW, in the waiting mode, SS=LP, in the program mode, SS=LA1, in the first alter mode, SS=LA2, in the second alter mode.

FLAG—A variable used to alert the RGC to go to shift to IPS operation mode LA2 from LA1.

FLAG=0, stay in LA1 mode,

FLAG=1, shift to LA2 mode.

MCLP—A 16 bit pointer used in connection with the move and time list3 programming under Save. This pointer is formed using two internal registers MCLPH, and MCLPL, i.e., MCLP=(MCLPH,MCLPL).

TCLP—Time counter. It is used to count the time for each move stored in move list3.

OUTLP—Stores the variable OUT.

CAP—This 16 bit variable is the number of the registers in the move and time list 3. It is formed using two internal registers CAPH, and CAPL, i.e., CAP=(CAPH,CAPL).

SIZE3—The number of the registers used in the move list3, in the process of storing a sequence of key settings.

The number SIZE3 is formed using two internal registers SIZE3H, and SIZE3L, i.e., SIZE3=-(SIZE3H,SIZE3L).

We claim:

1. A user controller device for use with a game processing unit and for providing information to the unit for playing a game, said controller device comprising:
input means having a plurality of inputs for detecting user requests for recording a sequence of one or more user input settings, said settings including at least one non-trivial input setting;
means for storing said sequence;
execution means to provide to the said game processing unit information based on the said stored data, said device further comprising means for sampling at discrete user input sampling times the input means for the current user input settings and providing such settings to the game processing unit at every discrete user input sampling time.

2. A user controller device according to claim 1, wherein the information provided is the most recent information on the user input settings.

3. A user controller device according to claim 1, wherein the execution means provides information to the processing unit at discrete user sampling times, and wherein the data that is stored in said storing means for a time interval is sufficient for reconstruction of the user input settings at every discrete user sampling time in said interval.

4. A user controller device according to claim 3, further comprising means for removing any redundancy in the user input settings prior to storage.

5. A user controller device according to claim 4 wherein said storing means stores the sequence of the user input settings in the interval, wherein the settings are first parsed into bursts of constant user input setting, the user input setting of each burst is stored in a move list and the span of each burst is stored in a time list.

6. A user controller device according to claim 1, wherein said storing means has a move list and a time list, wherein the sequence of the user input settings in an interval is first parsed into bursts of constant user input settings, wherein the user input setting of each burst is stored in a move list, but the span of each burst is truncated to a predetermined length whenever said span exceeds the predetermined length, before it is stored in a time list.

7. A user controller device according to claim 1, further comprising a controller for controlling the storing of the sequence of input settings, wherein said execution means forms a part of said controller.

8. A user controller device of claim 7, wherein said controller is a stored program central processing unit.

9. A user controller device according to claim 1, wherein said input means includes a modifier switch which enables a user to signal a request for cyclic execution of a stored sequence.

10. The device of claim 9, said storing means also storing said request by the user for a repeat cycle execution with a sequence stored and for causing said execution means to cyclically execute said sequence so appended.

11. A user controller device according to claim 1, wherein said input means includes a modifier switch which enables a user to signal a request for a fast pace, or shrink, execution of a stored sequence.

12. The device of claim 11, said storing means also storing said request by the user for a shrink execution with a sequence stored and for causing said execution means to execute said sequence so appended at a fast pace.

13. A user controller device according to claim 1, wherein said input means includes a modifier switch which enables a user to signal a request for an add and override option during the execution of a stored sequence.

14. The device of claim 13, said storing means also storing said request by the user for an add and override option with a sequence stored and for causing said execution means to cause current user input settings to be merged with the stored sequence during execution of a sequence.

15. The device of claim 1, further comprising a controller, wherein said controller instructs the execution means to stop execution when any one of selected user input settings becomes active during execution.

16. A user controller device according to claim 1, wherein said input means includes an alter modifier switch which enables a user to signal a request for altering a stored sequence.

17. The device of claim 16, further including a controller which interrupts the execution o the stored sequence upon detection of user request for altering a sequence and a non-idle user input setting, and which instructs the storing means to alter the stored sequence according to the non-idle user input setting.

18. A user controller device according to claim 1, wherein said input means includes an extend modifier switch which enables a user to signal a request for extending a stored sequence.

19. The device of claim 18, further including a controller which causes the storing means to extend the stored sequence when the execution means has finished execution of the stored sequence, according to the user input settings.

20. A user controller device according to claim 1, wherein said input means includes a program modifier switch which enables a user to signal a program request for storing a sequence of user input settings when said execution means is executing a stored sequence.

21. The device of claim 20, further including a controller which causes the storing means to store user input settings in response to said program request, said settings including a stored sequence executed by said execution means.

22. The device of claim 21, wherein said user settings being stored also includes current user input settings.

23. A user controller device according to claim 1, further comprising a game processing interface which includes a set of data lines and a set of control lines from game processing unit controlling the information flow on the data lines.

24. A user controller device according to claim 23, wherein the game processing unit interface comprises of a serializer that provides information on a single data line, and a set of control lines from the game processing unit controlling the operation of the said serializer.

25. A user controller device according to claim 23, wherein the game processing unit interface comprises of a multiplexer providing information on a set of time-multiplexed data lines, a second set of data lines, and a set of control lines from the game processing unit controlling the operation of the said multiplexer.

26. The user controller device of claim 1, wherein said storing means is non-volatile.

27. The device of claim 1, wherein said storing means is removable.

28. The device of claim 1, said device including a controller for controlling the input detection, storing and execution of the sequence, wherein said input means includes at least a program and a command switch, so that when the program switch is activated by the user, said controller enables the user to command recording of a sequence of user input settings through the command switch.

29. The device of claim 28, wherein said switches and said controller also enable the user to command the execution of the sequence previously recorded when said switch is activated.

30. The device of claim 29, wherein when the user keeps the command switch activated, the controller causes the last setting in the sequence to be repeatedly executed.

31. A user controller device for use with a game processing unit and for providing information to the unit for playing a game, said controller device comprising:
input means having a plurality of inputs for detecting user requests for recording a sequence of one or more user input settings, said settings including at least one non-trivial input setting;
means for storing said sequence;
execution means to provide to the said game processing unit information based on the said stored data, said device further comprising means for sampling at selected regular intervals of discrete sampling times the input means for current user input settings and providing such settings to the game processing unit at discrete user input sampling times.

32. A user controller device according to claim 31 wherein the information provided to the game processing unit at said discrete user input sampling times is the most recent collected information on the user input settings.

33. A method for operating a device which enables a user to control a processing unit for playing a game, comprising:
detecting user requests for recording a sequence of one or more user input setting, said settings including at least one non-trivial input setting; and
storing said sequence, said method further comprising:
detecting whether any of the settings to be stored is an idle setting at the beginning or end of the sequence; and
discarding said idle settings at the beginning or end of the sequence.

34. A method for operating a device which enables a user to control a processing unit for playing a game, comprising:
detecting user requests for recording a sequence of one or more user input settings, said settings including at least one non-trivial input setting; and
storing said sequence, said method further comprising a step of providing data to the processing unit based on the stored sequence for playing the game.

35. The method of claim 34, wherein said data providing step includes:
sensing the current user input settings; and
stopping the provision of data that is based on the stored sequence to the processing unit when a non-idle current user input setting is sensed.

36. The method of claim 34, said device including means for use by the user to indicate that the user wishes to merge current user input settings with those in the stored sequence, wherein said providing step includes:

sensing the current user input settings;

comparing said current user input settings to said stored sequence; and merging the current and stored settings before providing the merged settings to the processing unit.

37. The method of claim 36, wherein the merging step is such that when individual settings in the stored sequence are in conflict with current settings, such settings in the stored sequence are ignored in favor of the conflicting current settings to arrive at the merged settings.

38. A user controller device for use with a game processing unit and for providing information to the unit for playing a game, said controller device comprising:

input means having a plurality of inputs for detecting user requests for recording sequences of one or more user input settings, said settings including at least one non-trivial input setting;

means for storing sequences $STU1, \ldots, STUn$, where $STUi = RQi(1), \ldots, RQi(q)$, where sequence $STUi$ has a mode defined by $EPi$, where $i = 1, \ldots, n$;

execution/program mode select means for selecting between the plurality of modes $EP1, \ldots, EPn$, where $EPi$ defines the mode of $STUi$, execution means to provide to the said game processing unit at a time $t_k$ of the said user sampling times a request generated by integrating a current user input setting to a merged $RQ_j(d_j)$'s for j's in a set J of indices corresponding to $STUj$'s in execution mode, and where $d_j$ is the duration $EPj$ has been in execution mode; and a programming means to replace at a time $t_k$ of the said user sampling times $RQ_m(d_m)$'s by a request generated from combining a current user input setting to a merged $RQ_j(d_j)$'s, where m's are in a set M of indices corresponding to $STUm$'s in program mode, and $d_m$ corresponds to the duration that $EPm$ has been in program mode, and where j's are in a set J of indices corresponding to $STUj$'s in execution mode, and $d_j$ corresponds to the duration that $EPj$ has been in program mode.

39. A user controller device for use with a game processing unit and for providing information to the unit for playing a game, said controller device comprising:

input means having a plurality of inputs for detecting user requests for recording sequences of one or more user input settings, said settings including at least one non-trivial input setting;

means for storing sequences $STU1, \ldots, STUn$, where $STUi = RQi(1), \ldots, RQi(q)$, where sequence $STUi$ has a mode defined by $EPi$, where $i = 1, \ldots, n$;

execution/program mode select means for selecting between the plurality of modes $EP1, \ldots, EPn$, where $EPi$ defines the mode of $STUi$, execution means to provide to the said game processing unit interface information based on a current user input setting and stored sequences $STUj$'s, for j's in a set J of indices corresponding to $STUj$'s in execution mode; and a programming means to replace the stored sequences $STUm$'s based on a current user input setting, and stored sequences $STUj$'s, where m's are in a set M of indices corresponding to $STUm$'s in program mode, and where j's are in a set J of indices corresponding to $STUj$'s in execution mode.

* * * * *